US012022293B2

(12) United States Patent
Wifvesson et al.

(10) Patent No.: US 12,022,293 B2
(45) Date of Patent: Jun. 25, 2024

(54) METHODS FOR INTEGRITY PROTECTION OF USER PLANE DATA

(71) Applicant: Telefonaktiebolaget LM Ericsson (publ), Stockholm (SE)

(72) Inventors: Monica Wifvesson, Lund (SE); Prajwol Kumar Nakarmi, Sollentuna (SE); Karl Norrman, Stockholm (SE); Vesa Torvinen, Sauvo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/095,607

(22) Filed: Jan. 11, 2023

(65) Prior Publication Data

US 2023/0164562 A1 May 25, 2023

Related U.S. Application Data

(63) Continuation of application No. 16/481,351, filed as application No. PCT/EP2018/052285 on Jan. 30, 2018, now Pat. No. 11,558,745.

(Continued)

(51) Int. Cl.
*H04W 36/00* (2009.01)
*H04W 8/24* (2009.01)
(Continued)

(52) U.S. Cl.
CPC .......... *H04W 12/106* (2021.01); *H04W 8/24* (2013.01); *H04W 12/033* (2021.01);
(Continued)

(58) Field of Classification Search
None
See application file for complete search history.

(56) References Cited

U.S. PATENT DOCUMENTS

| 9,276,909 B2 | 3/2016 | Barany et al. |
| 9,344,945 B2 | 5/2016 | Da Silva et al. |

(Continued)

FOREIGN PATENT DOCUMENTS

| CN | 101072092 | 11/2007 |
| CN | 101075865 | 11/2007 |

(Continued)

OTHER PUBLICATIONS

International Search Report and Written Opinion issued in International Application No. PCT/EP2018/056751, dated Jun. 25, 2018, 14 pages.

(Continued)

*Primary Examiner* — Suhail Khan

(57) ABSTRACT

A method for operating a User Equipment (UE) is disclosed, the UE configured to connect to a communication network. The method comprises: indicating to the communication network an Integrity Protection for User Plane (IPUP) mode supported by the UE when requesting registration with the communication network. The IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data.

26 Claims, 21 Drawing Sheets

Related U.S. Application Data

(60) Provisional application No. 62/451,875, filed on Jan. 30, 2017.

(51) Int. Cl.
*H04W 12/033* (2021.01)
*H04W 12/041* (2021.01)
*H04W 12/106* (2021.01)
*H04W 28/18* (2009.01)
*H04W 60/00* (2009.01)

(52) U.S. Cl.
CPC ......... *H04W 12/041* (2021.01); *H04W 28/18* (2013.01); *H04W 60/00* (2013.01)

(56) References Cited

U.S. PATENT DOCUMENTS

| | | |
|---|---|---|
| 9,794,836 B2 | 10/2017 | Liu |
| 11,659,382 B2 | 5/2023 | Torvinen et al. |
| 2009/0086971 A1 | 4/2009 | Grayson et al. |
| 2009/0238195 A1 | 9/2009 | Pyykkonen |
| 2010/0054472 A1 | 3/2010 | Barany et al. |
| 2010/0158044 A1 | 6/2010 | Ray |
| 2010/0235634 A1 | 9/2010 | Fischer |
| 2011/0312299 A1 | 12/2011 | Patil et al. |
| 2012/0315878 A1 | 12/2012 | Deng |
| 2013/0236016 A1 | 9/2013 | Zhang et al. |
| 2014/0355762 A1 | 12/2014 | Zhang et al. |
| 2015/0139156 A1 | 5/2015 | Thakur |
| 2015/0319652 A1* | 11/2015 | Liu ................ H04L 9/0869 455/410 |
| 2017/0012956 A1 | 1/2017 | Lee |
| 2018/0227302 A1 | 8/2018 | Lee |
| 2019/0045341 A1* | 2/2019 | Huang ............ H04L 41/0803 |
| 2020/0100101 A1 | 3/2020 | Torvinen |

FOREIGN PATENT DOCUMENTS

| | | |
|---|---|---|
| CN | 101810017 | 8/2010 |
| CN | 102123391 | 7/2011 |
| CN | 101128066 | 7/2012 |
| CN | 102132541 | 8/2014 |
| EP | 2 293 515 | 3/2011 |
| EP | 2 804 409 | 11/2014 |
| EP | 3 046 384 | 7/2016 |
| RU | 2 523 695 | 7/2014 |
| RU | 2 600 456 | 10/2016 |
| WO | 2010/025280 | 3/2010 |

OTHER PUBLICATIONS

Written Opinion of the International Preliminary Examining Authority issued in International Application No. PCT/EP2018/056751, dated Feb. 11, 2019, 6 pages.

International Preliminary Report on Patentability issued in International Application No. PCT/EP2018/056751, dated Jun. 21, 2019, 9 pages.

3GPP TR 33.899 V1.0.0 (Mar. 2017), 3rd Generation Partnership Project; Technical Specification Group Services and System Aspects; Study on the Security aspects of the next generation system (Release 14), Mar. 2017, 471 pages.

3GPP TS 23.501 V0.3.0 (Feb. 2017), 3rd Generation Partnership Project; Technical Specification Group Services and System Aspects; System Architecture for the 5G System; Stage 2 (Release 15), Feb. 2017, 97 pages.

3GPP TR 33.889 V0.5.0 (Apr. 2015), 3rd Generation Partnership Project; Technical Specification Group Services and System Aspects; Study on Security aspects of Machine-Type Communications (MTC) architecture and feature enhancements (Release 13), Apr. 2015, 25 pages.

3GPP TR 38.804 V0.7.0 (Feb. 2017), 3rd Generation Partnership Project; Technical Specification Group Radio Access Network; Study on New Radio Access Technology; Radio Interface Protocol Aspects, 53 pages.

3GPP TR 33.801 V1.0.0 (Nov. 2005), 3rd Generation Partnership Project; Technical Specification Group Service and System Aspects; Access Security Review (Release 7), Nov. 2005, 41 pages.

3GPP TS 23.502 V0.2.0 (Feb. 2017), 3rd Generation Partnership Project; Technical Specification Group Services and System Aspects; Procedures for the 5G System; Stage 2 (Release 15), Feb. 2017, 71 pages.

Ericsson, Claue 6 (user plane security-security policy), 3GPP TSG SA WG3 (Security) Meeting #90, S3-180286, Gothenburg, Sweden, Jan. 22-26, 2018, 3 pages.

3GPP TR 23.799, V14.0.0, (Dec. 2016), 3rd Generation Partnership Project; Technical Specification Group Services and System Aspects; Study on Architecture for Next Generation System (Release 14), Dec. 2016 (522 pages).

International Search Report and Written Opinion issued in International Application No. PCT/EP2018/052285, dated Mar. 14, 2018, (10 pages).

\* cited by examiner

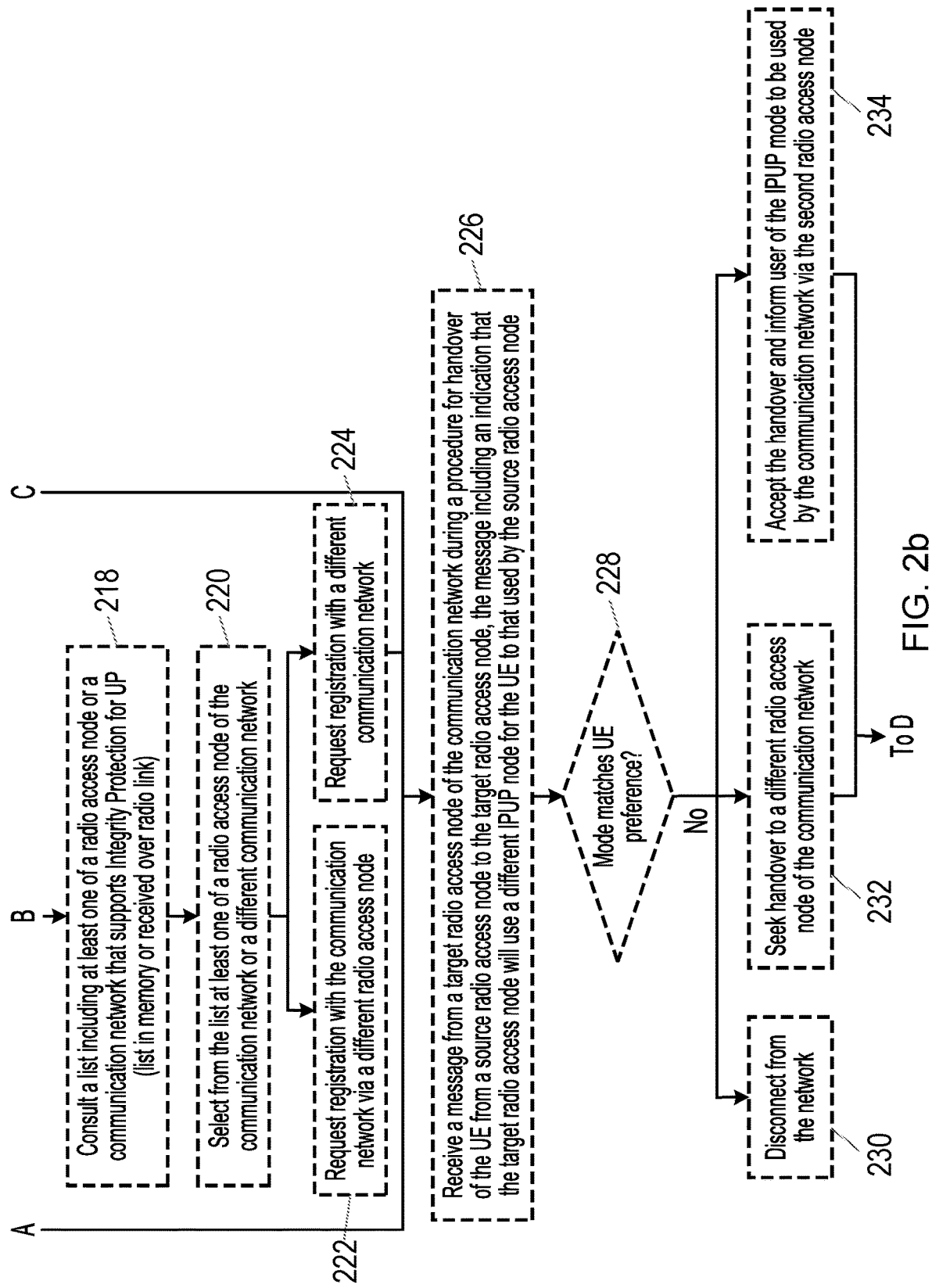

METHODS FOR INTEGRITY PROTECTION OF USER PLANE DATA

CROSS-REFERENCE TO RELATED APPLICATIONS

This application is a continuation of U.S. application Ser. No. 16/481,351, filed on Jul. 26, 2019 (now U.S. Pat. No. 11,558,745, issued on Jan. 17, 2023), which is a 35 U.S.C. § 371 National Stage of International Patent Application No. PCT/EP2018/052285, filed Jan. 30, 2018, which claims priority to U.S. provisional application No. 62/451,875, filed Jan. 30, 2017. The above identified applications are incorporated by this reference.

TECHNICAL FIELD

The present disclosure relates to methods for operating a User Equipment (UE), radio access node and core network node in a communication network. The disclosure also relates to apparatus and to a computer program configured to carry out methods for operating a UE, a radio access node and a core network node.

BACKGROUND

Integrity protection of User Plane (UP) data between a UE and a core network was introduced for enhanced-GPRS for Internet of Things (IoT) devices in 3GPP Rel-13. Support for Integrity protection of UP data was optional both in the UE and the network, with negotiation of implementation of Integrity protection of UP data taking place at the NAS layer (mobility management layer) and integrity protection supported at the LLC layer in the core network.

Negotiation of integrity protection of UP data is not considered in the standards for Long Term Evolution (4G) networks, and integrity protection for UP data is not therefore possible in such networks. Integrity protection of UP data exchanged between a UE and a base station may however be a desirable feature for Next Generation (5G) networks.

In Next Generation networks, the Radio Access Network (RAN) may adopt RAN architecture and interfaces set out in TR 33.801 v1.0.0 [x]. FIG. 1 illustrates the potential new RAN architecture for Next Generation networks. Referring to FIG. 1, it is expected that a gNB 102 and an eLTE eNB 104 may be connected to the same Next Generation Core (NGC) 106. A gNB 102 will be able to connect to other gNBs 102 or (e)LTE eNBs 104 over a new RAN interface named the Xn interface 108.

BRIEF DESCRIPTION OF THE DRAWINGS

For a better understanding of the present disclosure, and to show more clearly how it may be carried into effect, reference will now be made, by way of example, to the following drawings, in which:

FIGS. 2A, 2B, and 2C show a flow chart illustrating process steps in a method for operating a User Equipment (UE);

SUMMARY

Figure 1:
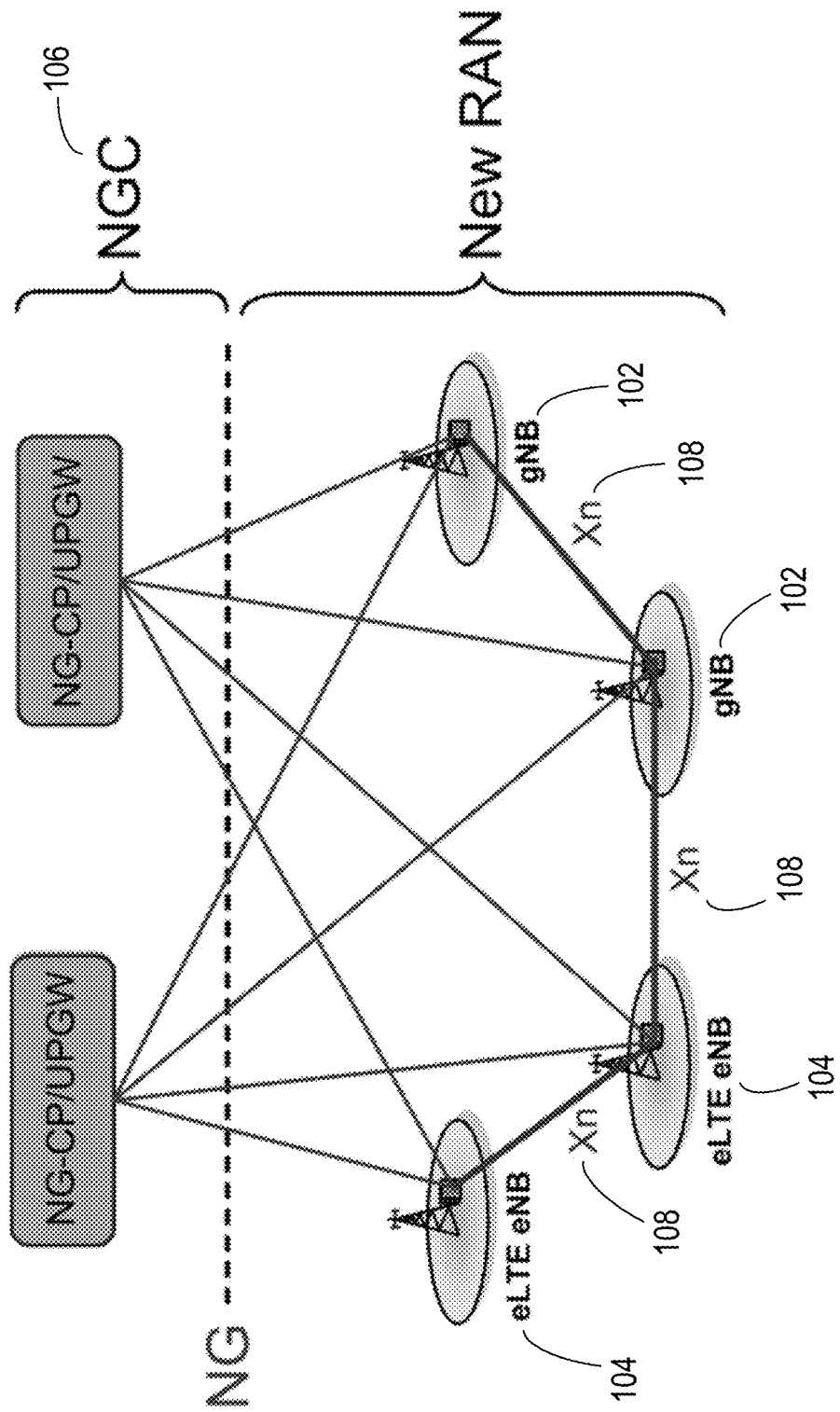
FIG. 1 is a representation of a potential RAN architecture for Next Generation networks.

Examples of the present disclosure provide methods addressing the operation of a UE, a radio access node and a core node in a communication network. The methods relate to the use of Integrity Protection for User Plane data exchanged between a UE and a communication network.

According to an aspect of the present disclosure, there is provided a method for operating a User Equipment, UE, which UE is configured to connect to a communication network. The method comprises indicating to the communication network an Integrity Protection for User Plane, IPUP, mode supported by the UE when requesting registration with the communication network. The IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data.

The method may further comprise indicating to the communication network a UE preference as to the IPUP mode to be used by the communication network for the UE. The indicated UE preference may apply to at least one of all data exchanged with the communication network, or data exchanged with a specific slice or plurality of slices of the communication network.

The method may further comprise receiving from the communication network an indication of an IPUP mode that shall be used by the communication network for the UE. The indication may apply to at least one of all data exchanged with the communication network, or data exchanged with a specific slice or plurality of slices of the communication network.

Indicating to the communication network an IPUP mode of use of Integrity Protection for User Plane data exchanged with the UE or use of Integrity Protection for User Plane data, and non-use of Confidentiality Protection for User Plane data may comprise indicating to the communication network a maximum data rate of user plane data for which integrity protection may be applied. The data rate may be a maximum aggregate data rate. The method may further comprise informing a user of the UE of the IPUP mode to be used by the communication network for the UE. The method may further comprise, if the IPUP mode indicated by the communication network does not match a UE preference as to which IPUP mode should be used by the communication network for the UE, performing at least one of refusing connection to the network, disconnecting from the network, informing a user of the UE that the IPUP mode indicated by the communication network does not match a UE preference as to which IPUP mode should be used by the communication network for the UE. The method may further comprise, if the UE performs at least one of refusing connection to the network or disconnecting from the network, performing at least one of requesting registration with the communication network via a different radio access node of the communication network, or requesting registration with a different communication network. The method may further comprise consulting a list including at least one of a radio access node or a communication network that supports Integrity Protection for User Plane data, and selecting from the list at least one of a radio access node of the communication network or a different communication network for requesting registration. The list may be configured in a memory of the UE. The list may be received over a radio link.

The method may further comprise receiving a message from a target radio access node of the communication network during a procedure for handover of the UE from a source radio access node to the target radio access node, the message including an indication that the target radio access node will use a different IPUP mode for the UE to that used by the source radio access node.

The method may further comprise, if the indication from the target radio access node is that the IPUP mode to be used by the communication network via the target radio access node does not match a UE preference as to which IPUP mode should be used by the communication network for the UE, performing at least one of disconnecting from the network, accepting the handover and informing a user of the UE of the IPUP mode to be used by the communication network via the target radio access node, or seeking handover to a different radio access node of the communication network.

The method may further comprise receiving from a radio access node of the communication network, during a procedure for secondary radio access node addition, secondary radio access node modification requiring key update, or Data Radio Bearer offload, an indication of the IPUP mode to be used by the communication network for the UE, and, if the indicated IPUP mode involves use of Integrity Protection for User Plane Data, deriving and using a key for Integrity Protection of User Plane data. The indication of the IPUP mode to be used by the communication network for the UE may be received with an RRC Reconfiguration Request.

According to another aspect of the present disclosure, there is provided a method for operating a radio access node of a communication network. The method comprises receiving, from a User Equipment, UE, requesting registration with the communication network, an indication of an Integrity Protection for User Plane, IPUP, mode supported by the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is received from the UE via the communication network.

The method may further comprise receiving from the UE a UE preference as to the IPUP mode to be used by the communication network for the UE. The indicated UE preference may apply to at least one of all data exchanged with the communication network, or data exchanged with a specific slice or plurality of slices of the communication network.

Receiving from a UE an indicated IPUP mode of use of Integrity Protection for User Plane data exchanged with the UE or use of Integrity Protection for User Plane data, and non-use of Confidentiality Protection for User Plane data may comprise receiving from the UE a maximum data rate of user plane data for which integrity protection may be applied. The data rate may be a maximum aggregate data rate. The method may further comprise receiving from a core node of the communication network an indication of an IPUP mode to be used by the communication network for the UE. The method may further comprise, if the radio access node supports the indicated IPUP mode, sending to the core node an indication that the radio access node will enable the IPUP mode to be used by the communication network for the UE.

The method may further comprise, if the indicated IPUP mode received from the core node of the communication network is not supported by the radio access node, performing at least one of rejecting the request for registration received from the UE, or omitting to send to the core node an indication that the radio access node will enable the IPUP mode to be used by the communication network for the UE. The method may further comprise sending to the UE an indication of an IPUP mode to be used by the communication network for the UE.

If the IPUP mode to be used by the communication network for the UE involves use of Integrity Protection for User Plane Data, the indication of an IPUP mode to be used by the communication network for the UE may comprise an identifier of an algorithm for Integrity Protection of UP data. The IPUP mode indicated by the radio access node to the UE may be the IPUP mode received from the core node of the communication network. The IPUP mode indicated to the UE may be selected by the radio access node in accordance with a policy hosted at the radio access node.

According to another aspect of the present disclosure, there is provided a method for operating a radio access node of a communication network, the radio access node comprising a source radio access node. The method comprises, during a procedure for handover of a User Equipment, UE, from the source radio access node to a target radio access node, sending an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The method may further comprise checking for receipt from the target radio access node of an indication that the target radio access node will enable the IPUP mode to be used by the communication network for the UE. The method may further comprise, if an indication that the target radio access node will enable the IPUP mode to be used by the communication network for the UE is not received, assuming that the target radio access node will not enable the IPUP mode to be used by the communication network for the UE.

According to another aspect of the present disclosure, there is provided a method for operating a radio access node of a communication network, the radio access node comprising a target radio access node. The method comprises, during a procedure for handover of a User Equipment, UE, from a source radio access node to the target radio access node, receiving an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication of an IPUP mode to be used by the communication network for the UE may be received from at least one of the source radio access node or a core node of the communication network. The method may further comprise deciding whether or not to use the indicated IPUP mode, and if it is decided not to use the indicated IPUP mode, sending to the UE an indication that the target radio access node will use a different IPUP mode for the UE to that used by the source radio access node. The indication of an IPUP mode to be used by the communication network for the UE may be received from the source radio access node, and the method may further comprise sending to a core node of the communication network an indication of the IPUP mode received from the source radio access node. The method may further comprise, if the target radio access node supports the indicated IPUP mode, sending to at least one of the source radio access node or a core node of the communication network an indication that the target radio access node will enable the IPUP mode to be used by the communication network for the UE. The method may further comprise, if the target radio access node does not support the received indicated IPUP mode, performing at one of rejecting handover of the UE, or accepting handover of the UE and omitting to send an indication that the target radio access node will enable the IPUP mode to be used by the communication network for the UE.

According to another aspect of the present disclosure, there is provided a method for operating a radio access node of a communication network, the radio access node comprising a master radio access node. The method comprises sending to a secondary radio access node an indication of an Integrity Protection for User Plane, IPUP, mode to be used by the communication network for a UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is sent to the secondary radio access node during a procedure for at least one of secondary radio access node addition, secondary radio access node modification requiring key update, Data Radio Bearer, DRB offload. If the IPUP mode indicated to the secondary radio access node involves use of Integrity Protection for User Plane Data, the indication of an IPUP mode to be used by the communication network for the UE may comprise a list of supported algorithms for Integrity Protection of UP data. The method may further comprise checking for receipt from the secondary radio access node of an indication that the secondary radio access node will enable the IPUP mode to be used by the communication network for the UE. The method may further comprise, if an indication that the secondary radio access node will enable the IPUP mode to be used by the communication network for the UE is not received, assuming that the secondary radio access node will not enable the IPUP mode to be used by the communication network for the UE. The method may further comprise, if the indication of an IPUP mode to be used by the communication network for the UE is sent to the secondary radio access node during a DRB offload procedure, sending to the UE an RRC Reconfiguration Request including an indication of the IPUP mode to be used by the communication network for the UE. The RRC Reconfiguration Request may include a selected integrity algorithm identifier to be used for UP integrity protection.

According to another aspect of the present disclosure, there is provided a method for operating a radio access node of a communication network, the radio access node comprising a secondary radio access node. The method comprises receiving from a master radio access node an indication of an Integrity Protection for User Plane, IPUP, mode to be used by the communication network for a UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is received from the master radio access node during a procedure for at least one of secondary radio access node addition, secondary radio access node modification requiring key update, Data Radio Bearer, DRB offload.

If the IPUP mode indicated by the master radio access node involves use of Integrity Protection for User Plane Data, the indication of an IPUP mode to be used by the communication network for the UE may comprise an identifier for an integrity algorithm to be used for UP integrity protection.

The method may further comprise, if the secondary radio access node supports the indicated IPUP mode, sending to the master radio access node an indication that the secondary radio access node will enable the IPUP mode to be used by the communication network for the UE.

The method may further comprise, if the secondary radio access node does not support the received indicated IPUP mode, performing at least one of rejecting the requested procedure from the master radio access node, or accepting the requested procedure from the master radio access node and omitting to send to the master radio access node an indication that the secondary radio access node will enable the IPUP mode to be used by the communication network for the UE.

The method may further comprise, if the indication of an IPUP mode to be used by the communication network for the UE is received from the master radio access node during a procedure for secondary radio access node addition or secondary radio access node modification requiring key update, and if the IPUP mode indicated by the master radio access node involves use of Integrity Protection for User Plane Data, deriving and using a key for Integrity Protection of User Plane data exchanged with the UE.

According to another aspect of the present disclosure, there is provided a method for operating a core node in a communication network. The method comprises sending to a radio access node of the communication network an indication of an Integrity Protection for User Plane, IPUP, mode to be used by the communication network for a User Equipment, UE, requesting registration with the communication network. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

The method may further comprise checking for receipt from the radio access node of the communication network of an indication that the radio access node of the communication network will enable the IPUP mode indicated to the radio access node of the communication network.

The method may further comprise, if an indication that the radio access node will enable the IPUP mode indicated to the radio access node is not received, assuming that the radio access node will not enable the IPUP mode to be used by the communication network for the UE.

The core network node may be a new core network node for the UE and the method may further comprise sending to an old core network of the UE an information request relating to the UE, and receiving from the old core network node an indication of the IPUP mode to be used by the communication network for the UE.

The method may further comprise, during an Update Location procedure, receiving from a subscription management node corresponding to the UE an indication of an IPUP mode to be used by the communication network for the UE.

The method may further comprise deciding on an IPUP mode to be used by the communication network for the UE.

The method may further comprise, if the IPUP mode decided by the core network node does not match a preference communicated by the UE for an IPUP mode to be used by the communication network for the UE, performing one of rejecting the request from the UE to register with the communication network, or accepting the request from the UE to register with the communication network and informing the UE of the IPUP decided by the core network node.

The decided IPUP mode applies to at least one of all data exchanged between the UE and the communication network, or data exchanged between the UE and a specific slice or plurality of slices of the communication network.

The method may further comprise indicating to the UE the decided IPUP mode to be used by the communication network for the UE.

According to another aspect of the present disclosure, there is provided a method for operating a core node in a communication network, the core network node comprising an old core network node for a User Equipment, UE, requesting registration with the communication network. The method comprises receiving from a new core network for the UE an information request relating to the UE, and sending to the new core network node an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

The indicated IPUP mode may apply to at least one of all data exchanged between the UE and the communication network, or data exchanged between the UE and a specific slice or plurality of slices of the communication network.

According to another aspect of the present disclosure, there is provided a method for operating a core node in a communication network. The method comprises receiving from a target radio access node an indication of an Integrity Protection for User Plane, IPUP, mode to be used by the communication network for a User Equipment, UE, to be handed over to the target radio access node, verifying that the IPUP mode indicated by the target radio access node is the same as an IPUP mode stored by the core network node for the UE, and, in the event of a mismatch between the indicated and stored IPUP modes, performing at least one of logging the mismatch as an event, or triggering an alarm. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided a method for operating a core node in a communication network. The method comprises sending to a target radio access node an indication of an Integrity Protection for User Plane, IPUP, mode to be used by the communication network for a User Equipment, UE, to be handed over to the target radio access node. The IPUP mode comprises one of use of Integrity Protection for User Plane data exchanged with the UE, non-use of Integrity Protection for User Plane data exchanged with the UE or use of Integrity Protection for User Plane data, and non-use of Confidentiality Protection for User Plane data.

The method may further comprise checking for receipt from the target radio access node of an indication that the target radio access node will enable the IPUP mode to be used by the communication network for the UE.

According to another aspect of the present disclosure, there is provided a computer program comprising instructions which, when executed on at least one processor, cause the at least one processor to carry out a method according to any one of the preceding aspects of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided apparatus for operating a User Equipment, UE, which UE is configured to connect to a communication network, the apparatus comprising a processor and a memory, the memory containing instructions executable by the processor such that the apparatus is operable to indicate to the communication network an Integrity Protection for User Plane, IPUP, mode supported by the UE when requesting registration with the communication network. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a radio access node of a communication network, the apparatus comprising a processor and a memory, the memory containing instructions executable by the processor such that the apparatus is operable to receive, from a User Equipment, UE, requesting registration with the communication network, an indication of an Integrity Protection for User Plane, IPUP, mode supported by the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is received from the UE via the communication network.

According to another aspect of the present disclosure, there is provided apparatus for operating a radio access node of a communication network, the radio access node comprising a source radio access node, the apparatus comprising a processor and a memory, the memory containing instructions executable by the processor such that the apparatus is operable to, during a procedure for handover of a User Equipment, UE, from the source radio access node to a target radio access node, send an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a radio access node of a communication network, the radio access node comprising a target radio access node, the apparatus comprising a processor and a memory, the memory containing instructions executable by the processor such that the apparatus is operable to, during a procedure for handover of a User Equipment, UE, from a source radio access node to the target radio access node, receive an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a radio access node of a communication network, the radio access node comprising a master radio access node, the apparatus comprising a processor and a memory, the memory containing instructions executable by the processor such that the apparatus is operable to send to a secondary radio access node an indication of an Integrity Protection for User Plane, IPUP, mode to be used by the communication network for a UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is sent to the secondary radio access node during a procedure for at least one of secondary radio access node addition, secondary radio access node modification requiring key update, Data Radio Bearer, DRB offload.

According to another aspect of the present disclosure, there is provided apparatus for operating a radio access node of a communication network, the radio access node comprising a secondary radio access node, the apparatus comprising a processor and a memory, the memory containing instructions executable by the processor such that the apparatus is operable to receive from a master radio access node an indication of an Integrity Protection for User Plane, IPUP, mode to be used by the communication network for a UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is received from the master radio access node during a procedure for at least one of secondary radio access node addition, secondary radio access node modification requiring key update, Data Radio Bearer, DRB offload.

According to another aspect of the present disclosure, there is provided apparatus for operating a core node in a communication network, the apparatus comprising a processor and a memory, the memory containing instructions executable by the processor such that the apparatus is operable to send to a radio access node of the communication network an indication of an Integrity Protection for User Plane, IPUP, mode to be used by the communication network for a User Equipment, UE, requesting registration with the communication network. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a core node in a communication network, the core network node comprising an old core network node for a User Equipment, UE, requesting registration with the communication network, the apparatus comprising a processor and a memory, the memory containing instructions executable by the processor such that the apparatus is operable to receive from a new core network for the UE an information request relating to the UE, and send to the new core network node an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a core node in a communication network, the apparatus comprising a processor and a memory, the memory containing instructions executable by the processor such that the apparatus is operable to receive from a target radio access node an indication of an Integrity Protection for User Plane, IPUP, mode to be used by the communication network for a User Equipment, UE, to be handed over to the target radio access node, verify that the IPUP mode indicated by the target radio access node is the same as an IPUP mode stored by the core network node for the UE; and, in the event of a mismatch between the indicated and stored IPUP modes, perform at least one of: log the mismatch as an event, or trigger an alarm. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a core node in a communication network, the apparatus comprising a processor and a memory, the memory containing instructions executable by the processor such that the apparatus is operable to send to a target radio access node an indication of an Integrity Protection for User Plane, IPUP, mode to be used by the communication network for a User Equipment, UE, to be handed over to the target radio access node. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a User Equipment, UE, which UE is configured to connect to a communication network, the apparatus configured to indicate to the communication network an Integrity Protection for User Plane, IPUP, mode supported by the UE when requesting registration with the communication network. The IPUP mode comprises one of, use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a radio access node of a communication network, the apparatus configured to receive, from a User Equipment, UE, requesting registration with the communication network, an indication of an Integrity Protection for User Plane, IPUP, mode supported by the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data, The indication is received from the UE via the communication network.

According to another aspect of the present disclosure, there is provided apparatus for operating a radio access node of a communication network, the radio access node comprising a source radio access node, the apparatus configured to, during a procedure for handover of a User Equipment, UE, from the source radio access node to a target radio access node, send an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a radio access node of a communication network, the radio access node comprising a target radio access node, the apparatus configured to, during a procedure for handover of a User Equipment, UE, from a source radio access node to the target radio access node, receive an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a radio access node of a communication network, the radio access node comprising a master radio access node, the apparatus configured to send to a secondary radio access node an indication of an Integrity Protection for User Plane, IPUP, mode to be used by the communication network for a UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is sent to the secondary radio access node during a procedure for at least one of secondary radio access node addition, secondary radio access node modification requiring key update, Data Radio Bearer, DRB offload.

According to another aspect of the present disclosure, there is provided apparatus for operating a radio access node of a communication network, the radio access node comprising a secondary radio access node, the apparatus configured to receive from a master radio access node an indication of an Integrity Protection for User Plane, IPUP, mode to be used by the communication network for a UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is received from the master radio access node during a procedure for at least one of secondary radio access node addition, secondary radio access node modification requiring key update, Data Radio Bearer, DRB offload.

According to another aspect of the present disclosure, there is provided apparatus for operating a core node in a communication network, the apparatus configured to send to a radio access node of the communication network an indication of an Integrity Protection for User Plane, IPUP, mode to be used by the communication network for a User Equipment, UE, requesting registration with the communication network. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a core node in a communication network, the core network node comprising an old core network node for a User Equipment, UE, requesting registration with the communication network, the apparatus configured to receive from a new core network for the UE an information request relating to the UE, and send to the new core network node an indication of an Integrity Protection for User Plane, IPUP, mode to be used by the communication network for the UE The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a core node in a communication network, the apparatus configured to receive from a target radio access node an indication of an Integrity Protection for User Plane, IPUP, mode to be used by the communication network for a User Equipment, UE, to be handed over to the target radio access node, verify that the IPUP mode indicated by the target radio access node is the same as an IPUP mode stored by the core network node for the UE, and, in the event of a mismatch between the indicated and stored IPUP modes, performing at least one of log the mismatch as an event, or trigger an alarm. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a core node in a communication network, the apparatus configured to send to a target radio access node an indication of an Integrity Protection for User Plane, IPUP, mode to be used by the communication network for a User Equipment, UE, to be handed over to the target radio access node. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a User Equipment, UE, which UE is configured to connect to a communication network, the apparatus comprising a transmission module for indicating to the communication network an Integrity Protection for User Plane, IPUP, mode supported by the UE when requesting registration with the communication network. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a radio access node of a communication network, the apparatus comprising a receiving module for receiving, from a User Equipment, UE, requesting registration with the communication network, an indication of an Integrity Protection for User Plane, IPUP, mode supported by the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is received from the UE via the communication network.

According to another aspect of the present disclosure, there is provided apparatus for operating a radio access node of a communication network, the radio access node comprising a source radio access node, the apparatus comprising a transmission module for, during a procedure for handover of a User Equipment, UE, from the source radio access node to a target radio access node, sending an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a radio access node of a communication network, the radio access node comprising a target radio access node, the apparatus comprising a receiving module for, during a procedure for handover of a User Equipment, UE, from a source radio access node to the target radio access node, receiving an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a radio access node of a communication network, the radio access node comprising a master radio access node, the apparatus comprising a transmission module for sending to a secondary radio access node an indication of an Integrity Protection for User Plane, IPUP, mode to be used by the communication network for a UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is sent to the secondary radio access node during a procedure for at least one of secondary radio access node addition, secondary radio access node modification requiring key update, Data Radio Bearer, DRB offload.

According to another aspect of the present disclosure, there is provided apparatus for operating a radio access node of a communication network, the radio access node comprising a secondary radio access node, the apparatus comprising a receiving module for receiving from a master radio access node an indication of an Integrity Protection for User Plane, IPUP, mode to be used by the communication network for a UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication is received from the master radio access node during a procedure for at least one of, secondary radio access node addition, secondary radio access node modification requiring key update, Data Radio Bearer, DRB offload.

According to another aspect of the present disclosure, there is provided apparatus for operating a core node in a communication network, the apparatus comprising a transmission module for sending to a radio access node of the communication network an indication of an Integrity Protection for User Plane, IPUP, mode to be used by the communication network for a User Equipment, UE, requesting registration with the communication network. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a core node in a communication network, the core network node comprising an old core network node for a User Equipment, UE, requesting registration with the communication network, the apparatus comprising a receiving module for receiving from a new core network for the UE an information request relating to the UE, and a transmission module for sending to the new core network node an indication of an Integrity Protection for User Plane, IPUP, mode to be used by the communication network for the UE. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a core node in a communication network, the apparatus comprising a receiving module for receiving from a target radio access node an indication of an Integrity Protection for User Plane, IPUP, mode to be used by the communication network for a User Equipment, UE, to be handed over to the target radio access node, and a processing module for verifying that the IPUP mode indicated by the target radio access node is the same as an IPUP mode stored by the core network node for the UE, and in the event of a mismatch between the indicated and stored IPUP modes, performing at least one of logging the mismatch as an event, or triggering an alarm. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

According to another aspect of the present disclosure, there is provided apparatus for operating a core node in a communication network, the apparatus comprising a transmission module for sending to a target radio access node an indication of an Integrity Protection for User Plane, IPUP, mode to be used by the communication network for a User Equipment, UE, to be handed over to the target radio access node. The IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data.

DETAILED DESCRIPTION

Aspects and examples of the present disclosure enable the use of Integrity Protection for User Plane data exchanged between a UE and a communication network. The communication network may for example be a 4G LTE network or a 5G Next Generation network, although it will be appreciated that aspects and examples of the present disclosure may also apply to other networks. Methods of operation of a UE, radio access node and core network code according to examples of the present disclosure may together enable functionality for the negotiation and application of Integrity Protection for the User Plane during initial UE registration, handover, dual connectivity etc.

According to examples of the present disclosure, a UE may indicate its support of UP integrity to the network. The UE may indicate as a capability a maximum data rate for integrity protection of UP data. For example, if the UE indicates 64 kbps as its maximum data rate, the network may be assumed to turn UP integrity protection on only for data rates equal or lower than 64 kbps. Higher data rates would not use UP integrity. Indication of this capability may be used as the UE indication of support of UP integrity to the network. The UE may indicate its UE preference as to whether or not UP integrity protection should be used. A subscriber's preference for using integrity protection of UP may be stored in the Subscriber Data Management (SDM)/Home Subscriber Service (HSS) and in the UE. A home network may thus indicate to a serving network that UP integrity "shall" or "must not" be turned on.

A visited network may make a policy decision as to whether UP integrity is required for a UE based on an indication received from the home network and a policy configured for the visited network (Access Management Function (AMF)/Mobility Management Entity (MME)). The core network may indicate to the UE in the NAS layer, based on the policy decision, whether UP integrity shall be used or not.

The core network may inform a base station or RAN (gNB or eNB) whether or not to use integrity protection of UP data. This indication or reference may be sent on the NG2 interface or S1 interface between the core network and the base station (RAN).

In other examples, the RAN may decide whether or not to use UP integrity protection, without being told by the core network whether or not to use UP integrity protection. Other options may include the gNB/eNB deciding whether or not to use UP integrity protection based on the UE's preference received from core network and possibly other information. A gNB or eNB may have a local policy whether to activate UP integrity or not for UEs that support it (based on UE 5GS security capabilities).

If the UE does not obtain desired UP integrity protection it may take a responsive action. The action may be to connect to another gNB/eNB, or the UE could refrain from using a certain application.

The user of a UE may dynamically configure and change the UE's preference as to whether or not to use UP integrity via the UE GUI (User Interface). It may be possible to configure the UE's preference for all UP data, or per network slice type (e.g. Network Slice Selection Assistance Information, NSSAI) or per network slice identifier (e.g. Data Network Name, DNN). When a registration procedure with the communication network is finalized, then the UE may indicate to the user whether UP integrity has been enabled or disabled by the network. This indication could be for all data, per type of slice or slice identifier.

A UE may be able to detect networks with sub-par security and apply a user-configured policy how to react, for example only connecting to networks providing integrity protection for UP. This is beneficial for security for IoT devices where the subscriber trusts the operator, but requires stronger security than today's networks providers. It may be possible for the user to configure other PLMNs to choose in case the preferred PLMN is not using UP integrity protection.

Another option may be to have a new list on the USIM or in ME which could contain PLMN's that support UP integrity protection. This list may be provided and configured by the operator of the Home PLMN to the UE over-the-air. The Home PLMN knows which operators the Home PLMN has roaming agreements with and which operators support UP integrity protection.

In X2-handover or Xn-handover between two base stations, the source base station may inform the target base station whether to enable integrity protection of UP data or not. This indication or reference may be sent on the Xn interface or the X2 interface from the source node to the target node.

It may be possible for a user to configure a policy in UE GUI whether to accept non-integrity protected UP traffic (for example, at handovers) automatically without asking the user.

It may also be possible for the user to be notified after handover to a new gNB or eNB that the new gNB or eNB does not support integrity protection and the user may be asked whether to continue the connection with the network or not.

It may be possible to configure the UE to try to re-connect to a different gNB or eNB of the same PLMN in case a gNB or eNB does not activate integrity protection in hope that the other gNB or eNB is updated with UP integrity algorithms and support of UP integrity protection.

In dual connectivity between two base stations, the master base station may inform the secondary base station whether to enable integrity protection of UP data or not. This indication or reference may be sent on the Xn interface or the X2 interface from the master base station to the secondary base station.

The above discussed and additional functionality may be realized via methods carried out at each of the entities involved in the relevant procedures. Examples of such methods are discussed below with reference to FIGS. 2A to 11. The examples are described with reference to 4G and 5G networks, although it will be appreciated that this is merely for the purposes of illustration.

Figure 2A:
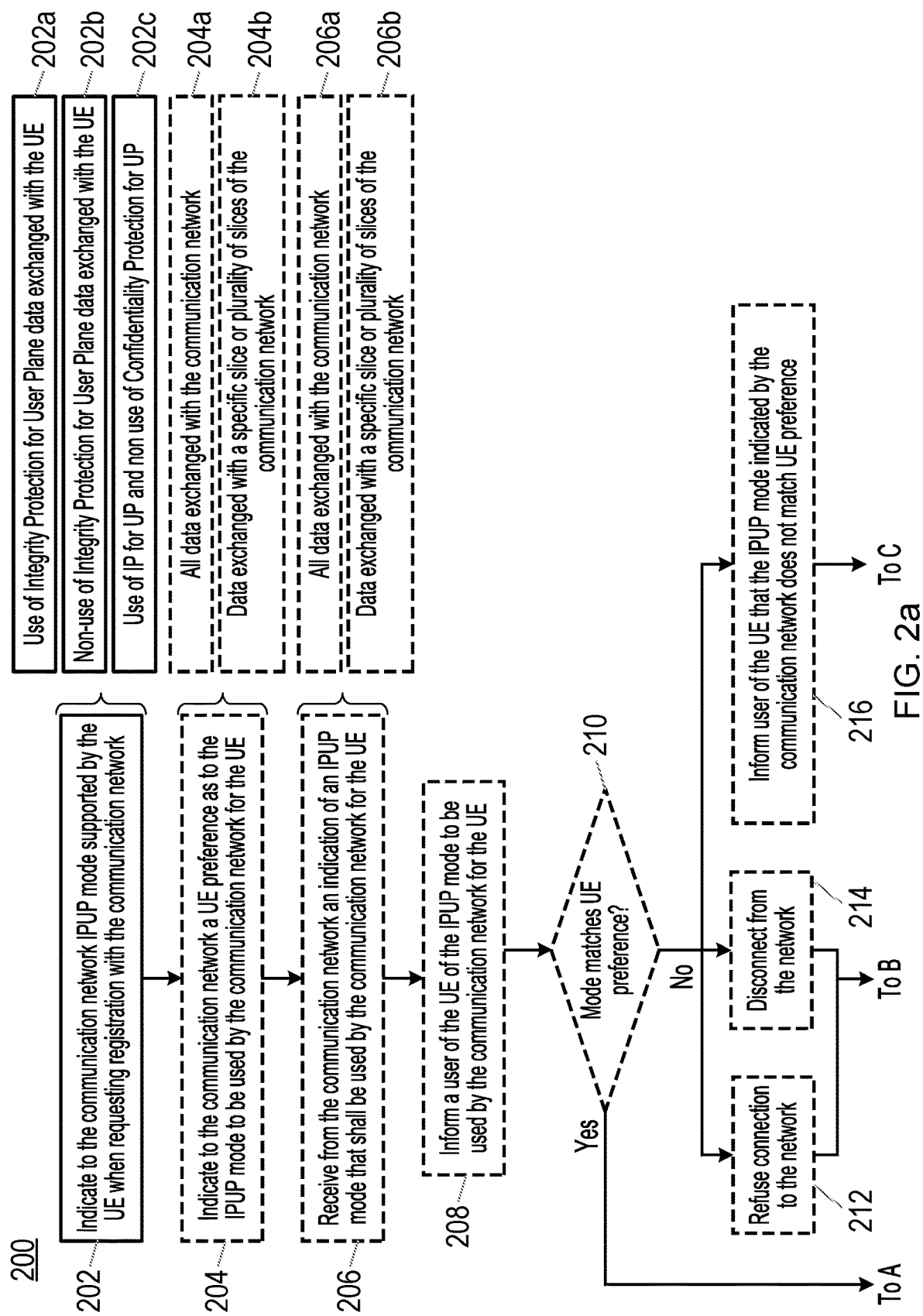
Figure 2C:
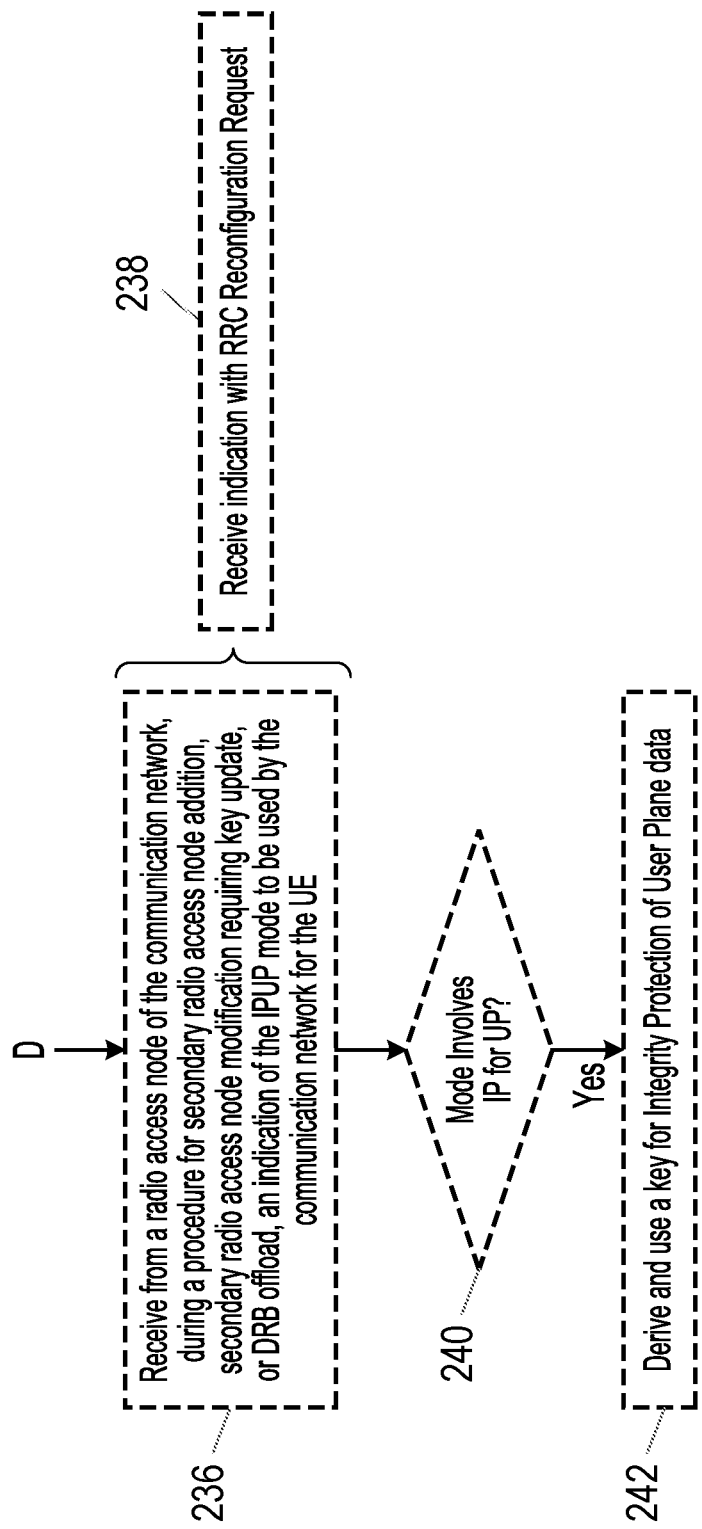

FIGS. 2A to 2C illustrate an example method 200 for operating a User Equipment (UE) according to the present disclosure. The UE is configured to connect to a communication network, which communication network may for example comprise a fourth or fifth generation communication network. The method may be performed by an apparatus for operating a UE, which may be incorporated into the UE itself. With reference to FIG. 2A, in a first step 202 the method comprises indicating to the communication network an Integrity Protection for User Plane (IPUP) mode supported by the UE when requesting registration with the communication network. The IPUP mode comprises one of: "use of Integrity Protection for User Plane data exchanged with the UE" 202a, "non-use of Integrity Protection for User Plane data exchanged with the UE" 202b, or "use of Integrity Protection for User Plane data, and non-use of Confidentiality Protection for User Plane data" 202c.

According to examples of the present disclosure, fourth and fifth generation communication networks refer to the network generations according to 3GPP specifications. According to examples of the present disclosure, "requesting registration" may comprise sending an Attach request or Tracking Area Update Request in a 4G network. Message names for requesting registration in a 5G network are not yet defined.

According to examples of the present disclosure when the IPUP mode supported by the UE is "non-use of Integrity Protection for User Plane data", the indication may be an absence of a specification that the IPUP mode "use of Integrity Protection for User Plane data" or "use of Integrity Protection for User Plane data, and non-use of Confidentiality Protection for User Plane data" is supported.

According to examples of the present disclosure, the IPUP mode "use of Integrity Protection for User Plane data, and non-use of Confidentiality Protection for User Plane data" may enable a UE to specify that if Integrity Protection for UP data is turned on then Confidentiality protection for UP data may be turned off. Some very small UEs, including for example those related to devices in an Internet of Things deployment, may have very limited access to power sources, and in order to extend battery lifetime, it may be useful for the UE to be able to turn off encryption relating to Confidentiality protection if the UE knows that encryption relating to Integrity Protection will be applied at an upper protocol layer.

According to examples of the present disclosure, the step of indicating to the communication network an IPUP mode of use of Integrity Protection for User Plane data exchanged with the UE or use of Integrity Protection for User Plane data, and non-use of Confidentiality Protection for User Plane data, may comprise indicating to the communication network a maximum data rate of user plane data for which integrity protection may be applied. In such examples, the UE indicates its support for UP integrity by indicating a maximum data rate for which UP integrity should be used. The network would be assumed to turn UP integrity protection on for data rates up to the indicated maximum, and higher data rates would not use UP integrity protection. This may allow for situations for example in which integrity protection for UP data is desirable for certain applications, such as Internet of Things applications, but not for other applications, including for example mobile broadband.

Referring again to FIG. 2A, the method may then comprise, in step 204, indicating to the communication network a UE preference as to the IPUP mode to be used by the communication network for the UE. The indicated UE preference may apply to at least one of: all data exchanged with the communication network 204a, or to data exchanged with a specific slice or plurality of slices of the communication network. The network slice or plurality of network slices may be identified by slice type and/or by slice identity. "Network slice" refers to the concept defined in literature relating to next Generation networks.

The method 200 may then comprise, in step 206, receiving from the communication network an indication of an IPUP mode that shall be used by the communication network for the UE. This indication may apply to at least one of all data exchanged with the communication network 206a or to data exchanged with a specific slice or plurality of slices of the communication network 206b. The indication may be received in an AS security mode command, for example by listing the supported algorithms for UP data, or as a general indication that UP integrity is supported (assuming that same algorithms that are used for control plane integrity protection is used for user plane integrity protection). Alternatively, the indication may be received in an RRC Connection Reconfiguration message.

In step 208, the method may further comprise informing a user of the UE of the IPUP mode to be used by the communication network for the UE. This informing step may be performed during registration with the communication network or may be performed after registration with the communication network is complete, and may enable a user to take appropriate action if the IPUP mode to be used is not appropriate for the user'[s intended communication with the network.

In step 210, the method 200 may comprise checking whether or not the IPUP mode indicated by the communication network matches a UE preference as to which IPUP mode should be used by the communication network for the UE. If the indicated mode does not match a UE preference as to which IPUP mode should be used by the communication network for the UE, the method 200 may comprise performing at least one of: refusing connection to the network at step 212, disconnecting from the network at step 214, or informing a user of the UE that the IPUP mode indicated by the communication network does not match a UE preference as to which IPUP mode should be used by the communication network for the UE at step 216.

If the UE performs at least one of refusing connection to the network at step 212 or disconnecting from the network at step 216, the method may further comprise performing at least one of: requesting registration with the communication network via a different radio access node of the communication network at step 222, or requesting registration with a different communication network at step 224. Before performing either of steps 222 or 224, the method may comprise consulting a list including at least one of a radio access node or a communication network that supports Integrity Protection for User Plane data at step 218 and selecting from the list at least one of a radio access node of the communication network or a different communication network for requesting registration at step 220. The list may be configured in a memory of the UE or may be received over a radio link. The list may for example be received from a home communication network of the UE, e.g. a home PLMN.

Following steps 222, 224, or if the check at step 210 shows that the indicated IPUP mode matches a UE preference, the method 200 may further comprise, at some later time, receiving, in step 226, a message from a target radio access node of the communication network during a procedure for handover of the UE from a source radio access node to the target radio access node, the message including an indication that the target radio access node will use a different IPUP mode for the UE to that used by the source radio access node. The indication may be received in an AS security mode command. Alternatively, the indication may be received in an RRC Connection Reconfiguration message.

In step 228, the method 200 may further comprise checking whether the indication from the target radio access node is that the IPUP mode to be used by the communication network via the target radio access node does not match a UE preference as to which IPUP mode should be used by the communication network for the UE. If the check indicates that the IPUP mode to be used does not match a UE preference, the method 200 may further comprise performing at least one of disconnecting from the network at step 230, accepting the handover and informing a user of the UE of the IPUP mode to be used by the communication network via the target radio access node at step 232, or seeking handover to a different radio access node of the communication network at step 234.

Referring now to FIG. 2C, the method 200 may further comprise, at step 236, receiving from a radio access node of the communication network an indication of the IPUP mode to be used by the communication network for the UE. The radio access node may be an eNB or gNB. The radio access node may be the radio access node via which the registration request was transmitted by the UE to the communication network, or may be a different radio access node. The indication may be received during a procedure for secondary radio access node addition, secondary radio access node modification requiring key update, or Date Radio Bearer (DRB) offload. As illustrated in step 238, the indication may be received with an RRC Reconfiguration request. If the indicated IPUP mode involves use of Integrity Protection for User Plane Data, as determined by a check at step 240, the method may further comprise deriving and using a key for Integrity Protection of User Plane data at step 242.

It will be appreciated that certain of the steps outlined above with reference to FIGS. 2A to 2C may be performed in a different order to that illustrated in the figures.

According to another aspect of the present disclosure, there is provided another method for operating a User Equipment (UE). The UE is configured to connect to a communication network, which communication network may for example comprise a fourth or fifth generation communication network. The method may be performed by an apparatus for operating a UE, which may be incorporated into the UE itself. The method comprises receiving a message from a target radio access node of the communication network during a procedure for handover of the UE from a source radio access node to the target radio access node, the message including an indication that the target radio access node will use a different IPUP mode for the UE to that used by the source radio access node. The method may further comprise, if the indication from the target radio access node is that the IPUP mode to be used by the communication network via the target radio access node does not match a UE preference as to which IPUP mode should be used by the communication network for the UE, performing at least one of: disconnecting from the network, accepting the handover and informing a user of the UE of the IPUP mode to be used by the communication network via the target radio access node, or seeking handover to a different radio access node of the communication network.

Figure 3:
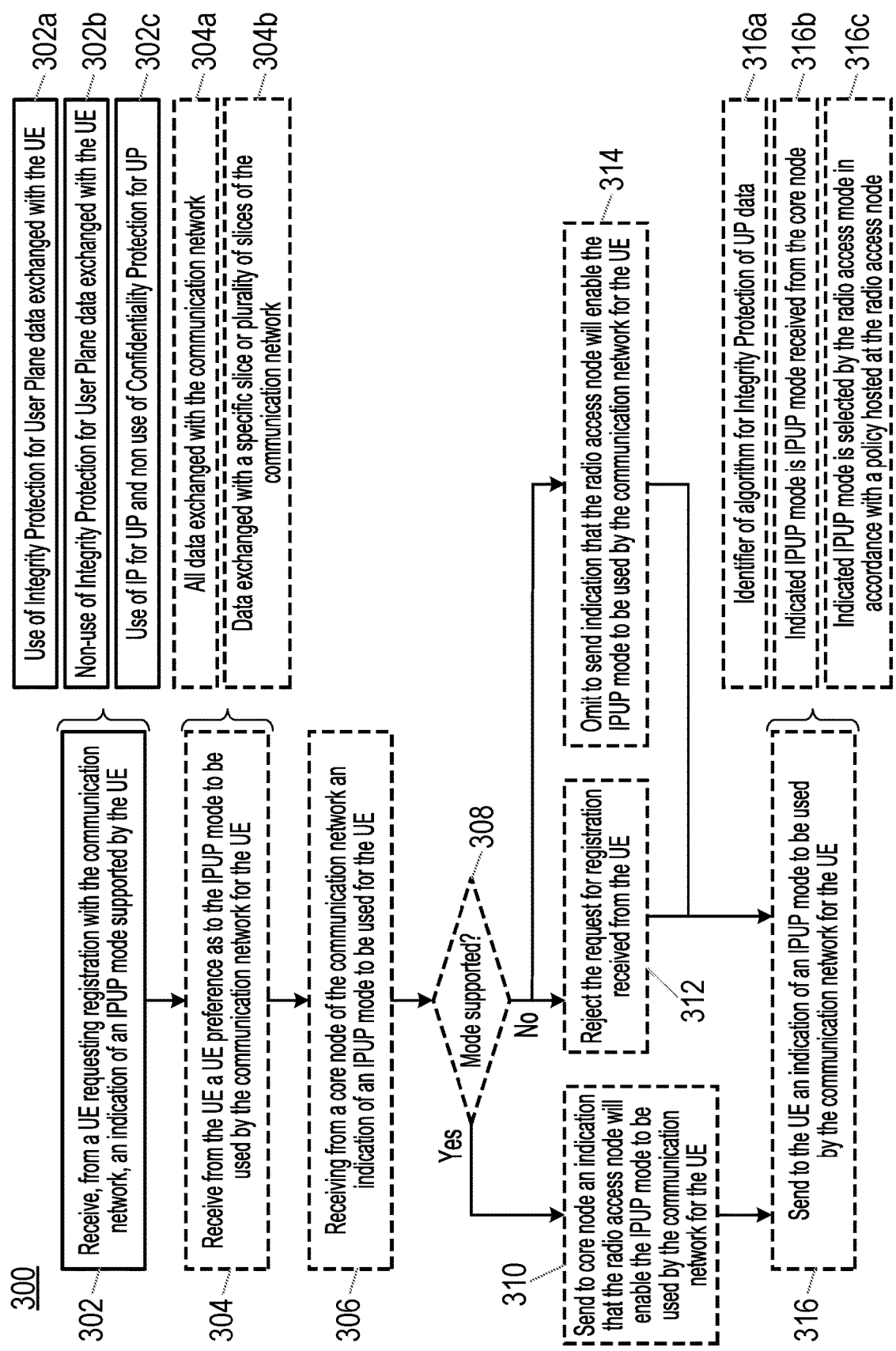
FIG. 3 is a flow chart illustrating process steps in a method for operating a radio access node in a communication network.

FIG. 3 illustrates an example method 300 for operating a radio access node of a communication network according to the present disclosure. The communication network may for example comprise a fourth or fifth generation communication network. The method may be performed by an apparatus for operating a radio access node, which may be incorporated into the radio access node itself and/or may be hosting a suitable function for operating a radio access node, which may be a Virtualised Network Function. The radio access node may be an eNodeB or a gNodeB.

Referring to FIG. 3, in a first step 302, the method comprises receiving, from a UE requesting registration with the communication network, an indication of an IPUP mode supported by the UE. The IPUP mode comprises one of "use of Integrity Protection for User Plane data exchanged with the UE" 302a, "non-use of Integrity Protection for User Plane data exchanged with the UE" 302b, or "use of Integrity Protection for User Plane data, and non-use of Confidentiality Protection for User Plane data". The indication is received from the UE via the communication network. For example the message may be sent to a core network of the communication network in a manner transparent to the radio access node and may then be forwarded from the core network to the radio access node.

According to examples of the present disclosure, the step 302 of receiving, from a UE requesting registration with the communication network, an indication of an IPUP mode of use of Integrity Protection for User Plane data exchanged with the UE or use of Integrity Protection for User Plane data, and non-use of Confidentiality Protection for User Plane data, may comprise receiving from the UE a maximum data rate of user plane data for which integrity protection may be applied. In such examples, the UE indicates its support for UP integrity by indicating a maximum data rate for which UP integrity should be used. The network would be assumed to turn UP integrity protection on for data rates up to the indicated maximum, and higher data rates would not use UP integrity protection. This may allow for situations for example in which integrity protection for UP data is desirable for certain applications, such as Internet of Things applications, but not for other applications, including for example mobile broadband.

The method 300 may further comprise, at step 304, receiving from the UE a UE preference as to the IPUP mode to be used by the communication network for the UE. The indicated UE preference may apply to at least one of: all data exchanged with the communication network as shown at step 304a, or data exchanged with a specific slice or plurality of slices of the communication network as shown at step 304b. The network slice or plurality of network slices may be identified by slice type and/or by slice identity.

The method 300 may further comprise, in step 306, receiving from a core node of the communication network an indication of an IPUP mode to be used by the communication network for the UE. The indication may include security capabilities and supported integrity algorithms for Integrity Protection of UP data. The core node may for example be a Mobility Management Entity (MME) in an LTE network or an Access Management Function (AMF) in a Next Generation Network.

The method 300 may further comprise checking whether the indicated IPUP mode is supported by the radio access node in step 308. If the radio access node supports the indicated IPUP mode, the method may further comprise, in step 310, sending to the core node an indication that the radio access node will enable the IPUP mode to be used by the communication network for the UE.

If the indicated IPUP mode received from the core node of the communication network is not supported by the radio access node, the method may further comprise performing at least one of rejecting the request for registration received from the UE in step 312 or omitting to send to the core node an indication that the radio access node will enable the IPUP mode to be used by the communication network for the UE in step 314.

In step 316, the method 300 may further comprise sending to the UE an indication of an IPUP mode to be used by the communication network for the UE. If the IPUP mode to be used by the communication network for the UE involves use of Integrity Protection for User Plane Data, the indication of an IPUP mode to be used by the communication network for the UE may indicate the integrity algorithm selected by the radio access node to be used for Integrity Protection of UP data, as shown at step 316a. This identifier may be included only if the algorithm differs from that to be used for protection of Control Plane data.

The indication sent to the UE in step 316 may apply to at least one of all data exchanged with the communication network, or data exchanged with a specific slice or plurality of slices of the communication network. In some examples, the indication may be sent in an AS security mode command. Alternatively, the indication may be sent in an RRC Connection Reconfiguration message.

The IPUP mode indicated by the radio access node to the UE may be the IPUP mode received from the core node of the communication network, as shown in step 316b, or may be selected by the radio access node in accordance with a policy hosted at the radio access node. The policy may take account of both a preference received from the UE and an IPUP mode received from a core network node.

It will be appreciated that certain of the steps outlined above with reference to FIG. 3 may be performed in a different order to that illustrated in the figure.

Figure 4:
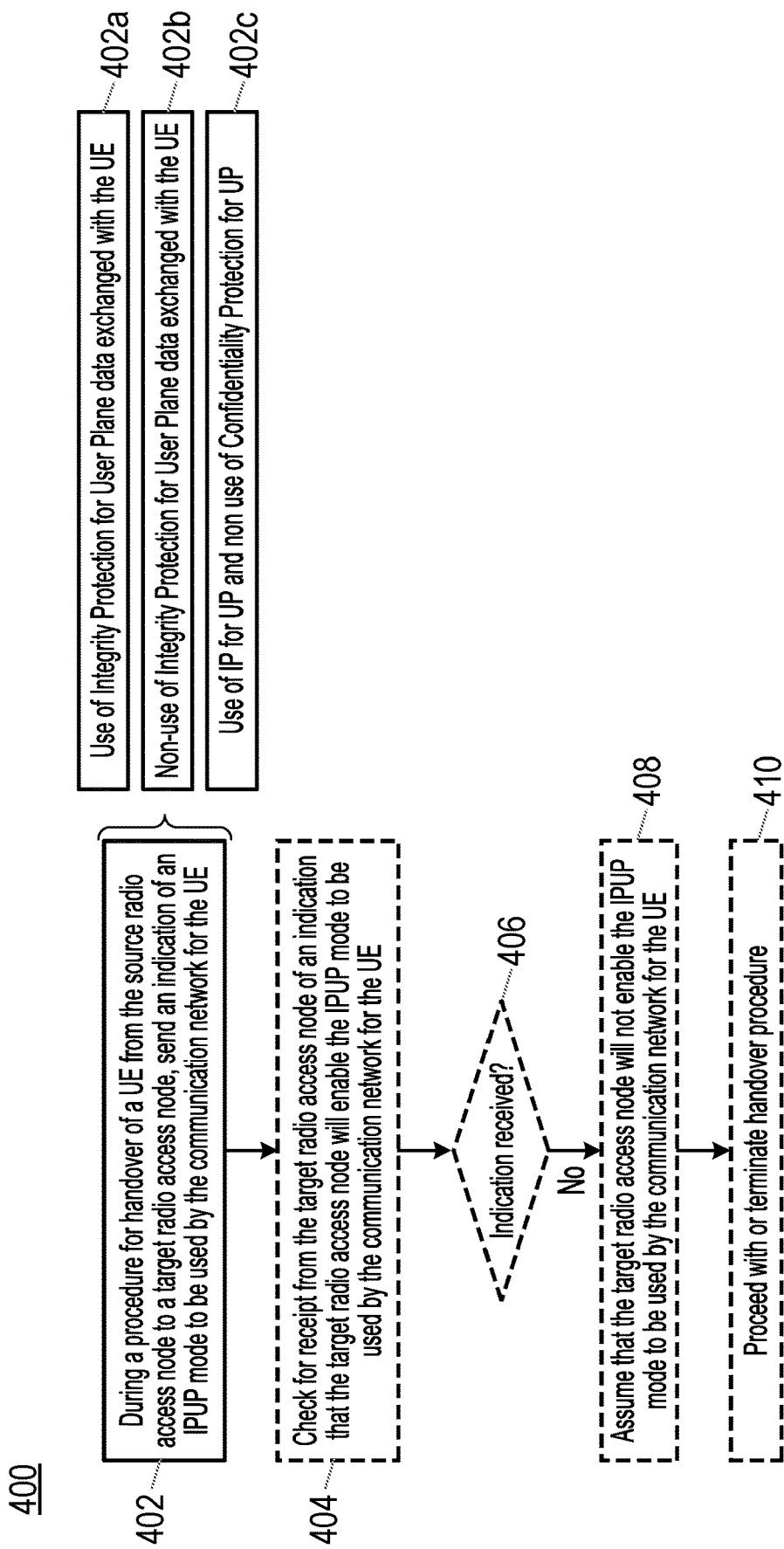
FIG. 4 is a flow chart illustrating process steps in another example of method for operating a radio access node.

FIG. 4 illustrates another example method 400 for operating a radio access node of a communication network according to the present disclosure. The communication network may for example comprise a fourth or fifth generation communication network. The method may be performed by an apparatus for operating a radio access node, which may be incorporated into the radio access node itself and/or may be hosting a suitable function for operating a radio access node, which may be a Virtualised Network Function. The radio access node may be an eNodeB or a gNodeB.

Referring to FIG. 4, the radio access node comprises a source radio access node, and the method comprises, in a first step 402, during a procedure for handover of a UE from the source radio access node to a target radio access node, sending an indication of an IPUP mode to be used by the communication network for the UE. The IPUP mode comprises one of "use of Integrity Protection for User Plane data exchanged with the UE" 402a, "non-use of Integrity Protection for User Plane data exchanged with the UE" 402b, or "use of Integrity Protection for User Plane data, and non-use of Confidentiality Protection for User Plane data" 402c. The indication of IPUP mode may in some examples be sent with a handover request message to the target radio access node. According to examples of the present disclosure, the step of sending an indication of an IPUP mode may comprise sending a maximum data rate of user plane data for which integrity protection may be applied.

The method may further comprise, at step 404, checking for receipt from the target radio access node of an indication that the target radio access node will enable the IPUP mode to be used by the communication network for the UE. If, in step 406, it is determined that an indication that the target radio access node will enable the IPUP mode to be used by the communication network for the UE has not been received, the method may further comprise assuming that the target radio access node will not enable the IPUP mode to be used by the communication network for the UE. Failure to receive the indication of enablement from the target node may in some examples be the result of a legacy target node or a target node that for any other reason does not understand the indication from the source target node. The method may further comprise, in such a situation, either proceeding with or terminating the handover procedure in step 410. The decision to proceed with or terminate the handover procedure may be based on a policy hosted at the source radio access node, which procedure may take account of a received UE preference and/or subscription information for the UE received from a core network node such as an MME or AMF.

Figure 5:
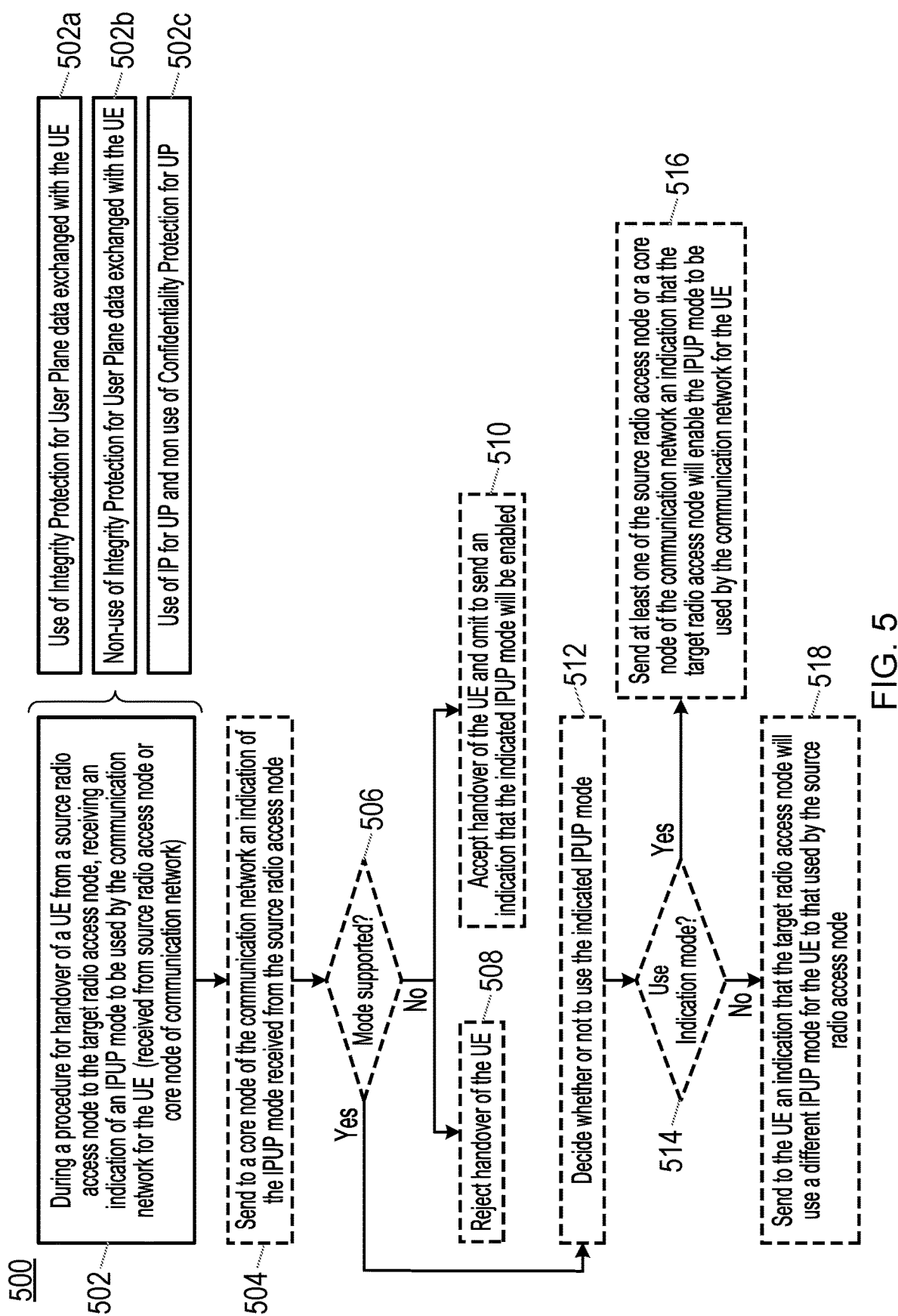
FIG. 5 is a flow chart illustrating process steps in another example of method for operating a radio access node.

FIG. 5 illustrates another example method 500 for operating a radio access node of a communication network according to the present disclosure. The communication network may for example comprise a fourth or fifth generation communication network. The method may be performed by an apparatus for operating a radio access node, which may be incorporated into the radio access node itself and/or may be hosting a suitable function for operating a radio access node, which may be a Virtualised Network Function. The radio access node may be an eNodeB or a gNodeB.

Referring to FIG. 5, the radio access node comprises a target radio access node, and the method comprises, in a first step 502, during a procedure for handover of a UE from a source radio access node to the target radio access node, receiving an indication of an IPUP mode to be used by the communication network for the UE. The IPUP mode comprises one of "use of Integrity Protection for User Plane data exchanged with the UE" 502a, "non-use of Integrity Protection for User Plane data exchanged with the UE" 502b", or "use of Integrity Protection for User Plane data, and non-use of Confidentiality Protection for User Plane data" 502c. According to examples of the present disclosure, the step of receiving an IPUP mode may comprise receiving a maximum data rate of user plane data for which integrity protection may be applied.

The indication of an IPUP mode to be used by the communication network for the UE may be received from at least one of the source radio access node or a core node of the communication network. The core node may for example be an MME in a 4G network or an AMF in a 5G network.

In step 504, and if the indication of an IPUP mode to be used by the communication network for the UE is received from the source radio access node, the method may further comprise sending to a core node of the communication network an indication of the IPUP mode received from the source radio access node. The core node may for example be an MME or AMF.

In step 506 the method may comprise checking whether the target radio access node supports the indicated IPUP mode, and, if the target radio access node does not support the received indicated IPUP mode, the method may comprise performing at one of rejecting handover of the UE at step 508, or accepting handover of the UE and omitting to send an indication that the target radio access node will enable the IPUP mode to be used by the communication network for the UE.

In step 512 the method may comprise deciding whether or not to use the indicated IPUP mode, and, if it is decided not to use the indicated IPUP mode 514, sending to the UE an indication that the target radio access node will use a different IPUP mode for the UE to that used by the source radio access node at step 518. The indication may be sent in an AS security mode command. Alternatively, the indication may be sent in an RRC Connection Reconfiguration message.

If the target radio access node supports the indicated IPUP mode, the method may further comprise, at step 516, sending to at least one of the source radio access node or a core node of the communication network an indication that the target radio access node will enable the IPUP mode to be used by the communication network for the UE. This sending may be dependent upon the target radio access node deciding to use the indicated IPUP mode at step 512, as illustrated in FIG. 5. The indication of enablement of the indicated IPUP mode may be sent to the entity from which the indication of IPUP mode was received, that is to the source radio access node or to the core radio access node.

It will be appreciated that certain of the steps outlined above with reference to FIG. 5 may be performed in a different order to that illustrated in the figure.

Figure 6:
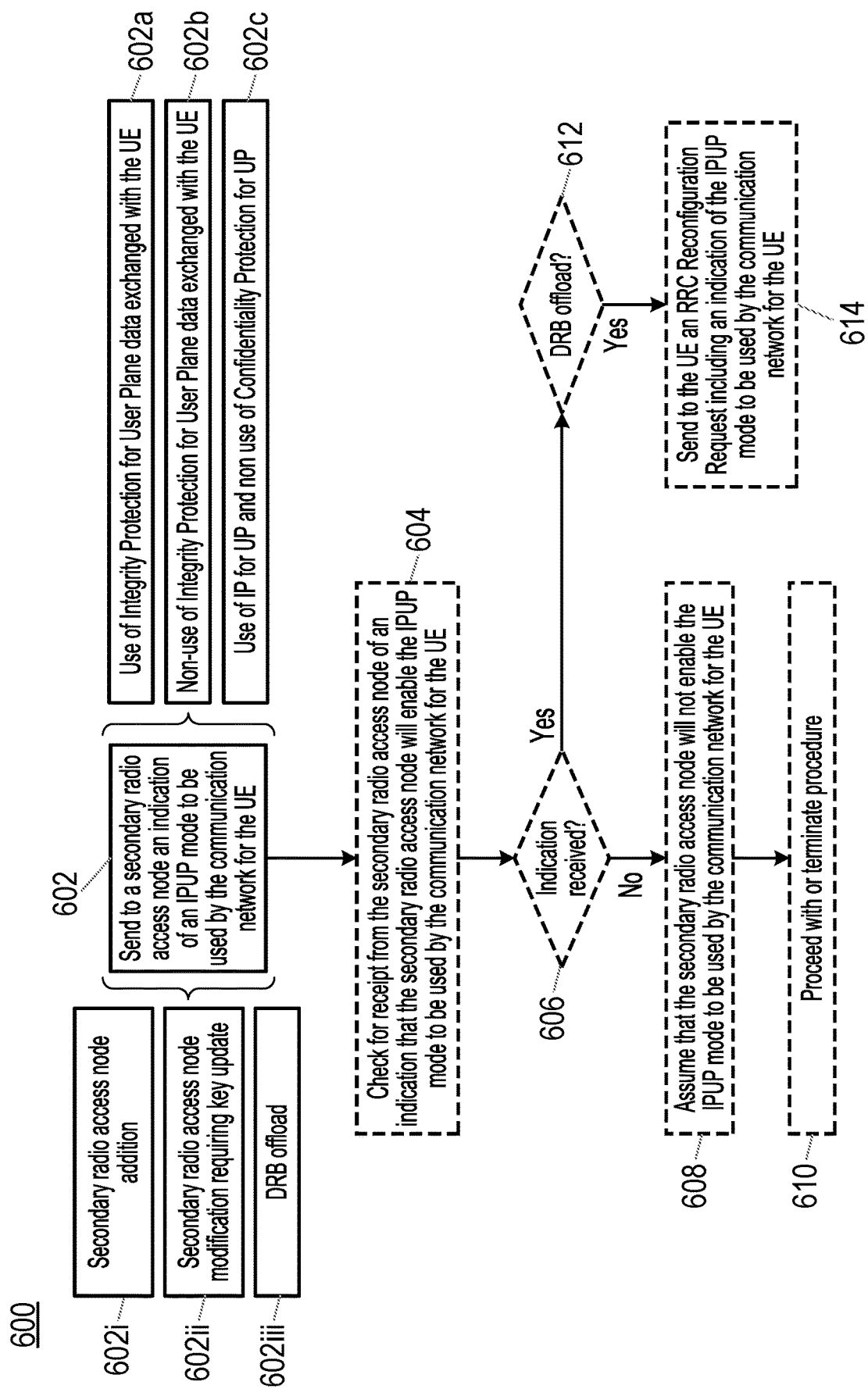
FIG. 6 is a flow chart illustrating process steps in another example of method for operating a radio access node.

FIG. 6 illustrates another example method 600 for operating a radio access node of a communication network according to the present disclosure. The communication network may for example comprise a fourth or fifth generation communication network. The method may be performed by an apparatus for operating a radio access node, which may be incorporated into the radio access node itself and/or may be hosting a suitable function for operating a radio access node, which may be a Virtualised Network Function. The radio access node may be an eNodeB or a gNodeB.

Referring to FIG. 6, the radio access node comprises a master radio access node, and the method comprises, in a first step 602, sending to a secondary radio access node an indication of an IPUP mode to be used by the communication network for a UE. The IPUP mode comprises one of "use of Integrity Protection for User Plane data exchanged with the UE" 602a, "non-use of Integrity Protection for User Plane data exchanged with the UE" 602b, or "use of Integrity Protection for User Plane data, and non-use of Confidentiality Protection for User Plane data" 602c. The indication is sent to the secondary radio access node during a procedure for at least one of secondary radio access node addition 602i, secondary radio access node modification requiring key update 602ii, or Data Radio Bearer, (DRB) offload 602iii, all within the context of dual connectivity. According to examples of the present disclosure, the step of sending an IPUP mode may comprise sending a maximum data rate of user plane data for which integrity protection may be applied.

If the IPUP mode indicated to the secondary radio access node involves use of Integrity Protection for User Plane Data, (that is modes "use of Integrity Protection for User Plane data exchanged with the UE" or "use of Integrity Protection for User Plane data, and non-use of Confidentiality Protection for User Plane data"), the indication of an IPUP mode to be used by the communication network for the UE may comprise a list of supported algorithms for Integrity Protection of UP data. In some examples, the list of supported algorithms for IPUP may be identical to the list for Integrity Protection of Control Plane data, and not indicated separately. In further examples, the list may comprise a single identified integrity algorithm.

In step 604, the method may further comprise checking for receipt from the secondary radio access node of an indication that the secondary radio access node will enable the IPUP mode to be used by the communication network for the UE. If an indication that the secondary radio access node will enable the IPUP mode to be used by the communication network for the UE is not received (step 606), the method may further comprise assuming that the secondary radio access node will not enable the IPUP mode to be used by the communication network for the UE in step 608. Failure to receive the indication of enablement from the secondary node may be the result of a legacy secondary node or a secondary node that for any other reason does not understand the indication from the source target node. The method may further comprise, in such a situation, either proceeding with or terminating the procedure at step 610. The decision to proceed with or terminate the procedure may be based on a policy hosted at the radio access node, which procedure may take account of a received UE preference and/or subscription information for the UE received from a core network node such as an MME or AMF.

If an indication that the secondary radio access node will enable the IPUP mode to be used by the communication network for the UE is received, the method may further comprise, if the indication of an IPUP mode to be used by the communication network for the UE is sent to the secondary radio access node during a DRB offload procedure (step 612), sending to the UE an RRC Reconfiguration Request including an indication of the IPUP mode to be used by the communication network for the UE at step 614. The RRC Reconfiguration Request may include an algorithm identifier for the algorithm selected for integrity protection of the UP. This identifier may be included only if the selected algorithm differs from that used to protect the control plane. If the indication of the IPUP mode in RRC Reconfiguration Request indicates that IPUP mode will be enabled and used then the UE will calculate a new key for Integrity Protection of User Plane data, the key associated with the DRB to be offloaded.

It will be appreciated that certain of the steps outlined above with reference to FIG. 6 may be performed in a different order to that illustrated in the Figure.

Figure 7:
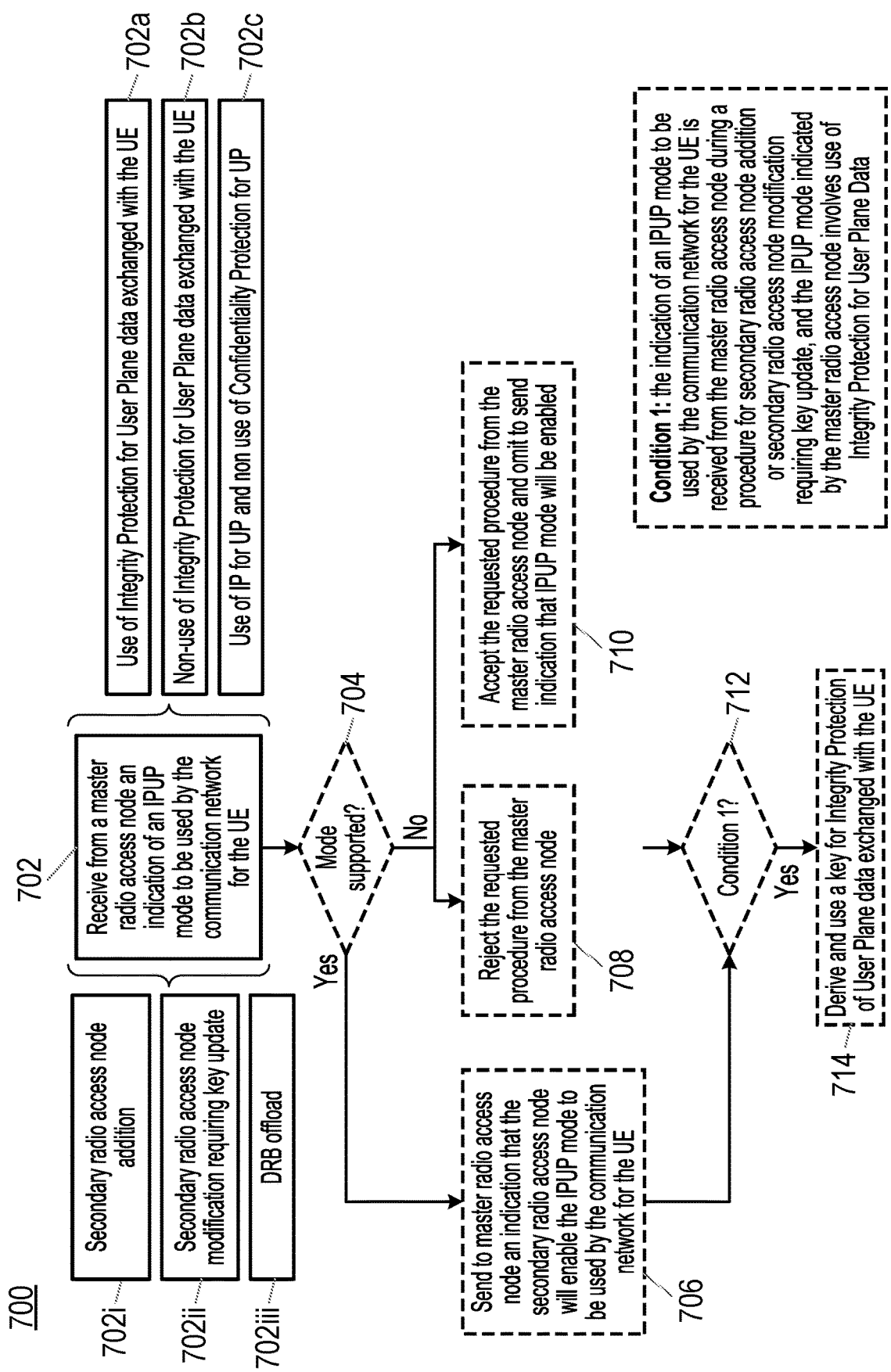
FIG. 7 is a flow chart illustrating process steps in another example of method for operating a radio access node.

FIG. 7 illustrates another example method 700 for operating a radio access node of a communication network according to the present disclosure. The communication network may for example comprise a fourth or fifth generation communication network. The method may be performed by an apparatus for operating a radio access node, which may be incorporated into the radio access node itself and/or may be hosting a suitable function for operating a radio access node, which may be a Virtualised Network Function. The radio access node may be an eNodeB or a gNodeB.

Referring to FIG. 7, the radio access node comprises a secondary radio access node, and the method comprises, in a first step 702, receiving from a master radio access node an indication of an IPUP mode to be used by the communication network for a UE. The IPUP mode comprises one of "use of Integrity Protection for User Plane data exchanged with the UE" 702*a*, "non-use of Integrity Protection for User Plane data exchanged with the UE" 702*b*, or "use of Integrity Protection for User Plane data, and non-use of Confidentiality Protection for User Plane data" 702*c*. The indication is received from the master radio access node during a procedure for at least one of secondary radio access node addition 702*i*, secondary radio access node modification requiring key update 702*ii*, or Data Radio Bearer, (DRB) offload 702*iii*, all within the context of dual connectivity. According to examples of the present disclosure, the step of receiving an IPUP mode may comprise receiving a maximum data rate of user plane data for which integrity protection may be applied.

If the IPUP mode indicated by the master radio access node involves use of Integrity Protection for User Plane Data, (that is modes "use of Integrity Protection for User Plane data exchanged with the UE" or "use of Integrity Protection for User Plane data, and non-use of Confidentiality Protection for User Plane data"), the indication of an IPUP mode to be used by the communication network for the UE may comprise an identifier for an integrity algorithm to be used for UP integrity protection. The identifier may be included only if the algorithm differs from that used to protect the Control Plane. In further examples, the secondary radio access node may assume that Integrity Protection of Control Plane data algorithms are also supported for User Plane.

If the secondary radio access node supports the indicated IPUP mode (step 704), the method may further comprise sending to the master radio access node an indication that the secondary radio access node will enable the IPUP mode to be used by the communication network for the UE in step 706.

If the secondary radio access node does not support the received indicated IPUP mode (step 704), the method may further comprise performing at least one of rejecting the requested procedure from the master radio access node at step 708 or accepting the requested procedure from the master radio access node and omitting to send to the master radio access node an indication that the secondary radio access node will enable the IPUP mode to be used by the communication network for the UE in step 710.

The method may further comprise, if the indication of an IPUP mode to be used by the communication network for the UE is received from the master radio access node during a procedure for secondary radio access node addition or secondary radio access node modification requiring key update, and if the IPUP mode indicated by the master radio access node involves use of Integrity Protection for User Plane Data (step 712), deriving and using a key for Integrity Protection of User Plane data exchanged with the UE at step 714.

It will be appreciated that certain of the steps outlined above with reference to FIG. 7 may be performed in a different order to that illustrated in the Figure.

Figure 8A:
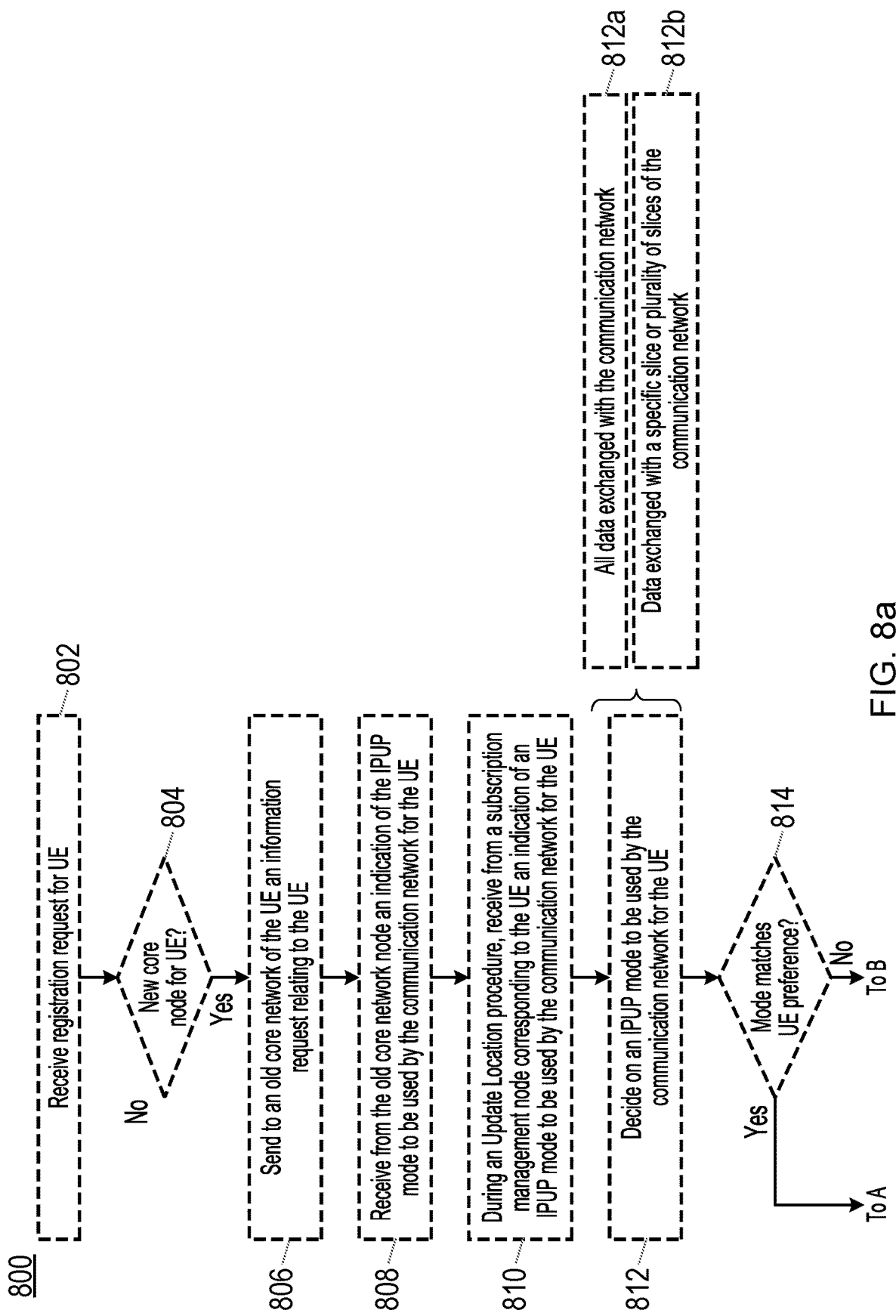
FIG. 8A is a flow chart illustrating process steps in a method for operating a core node in a communication network.
Figure 8B:
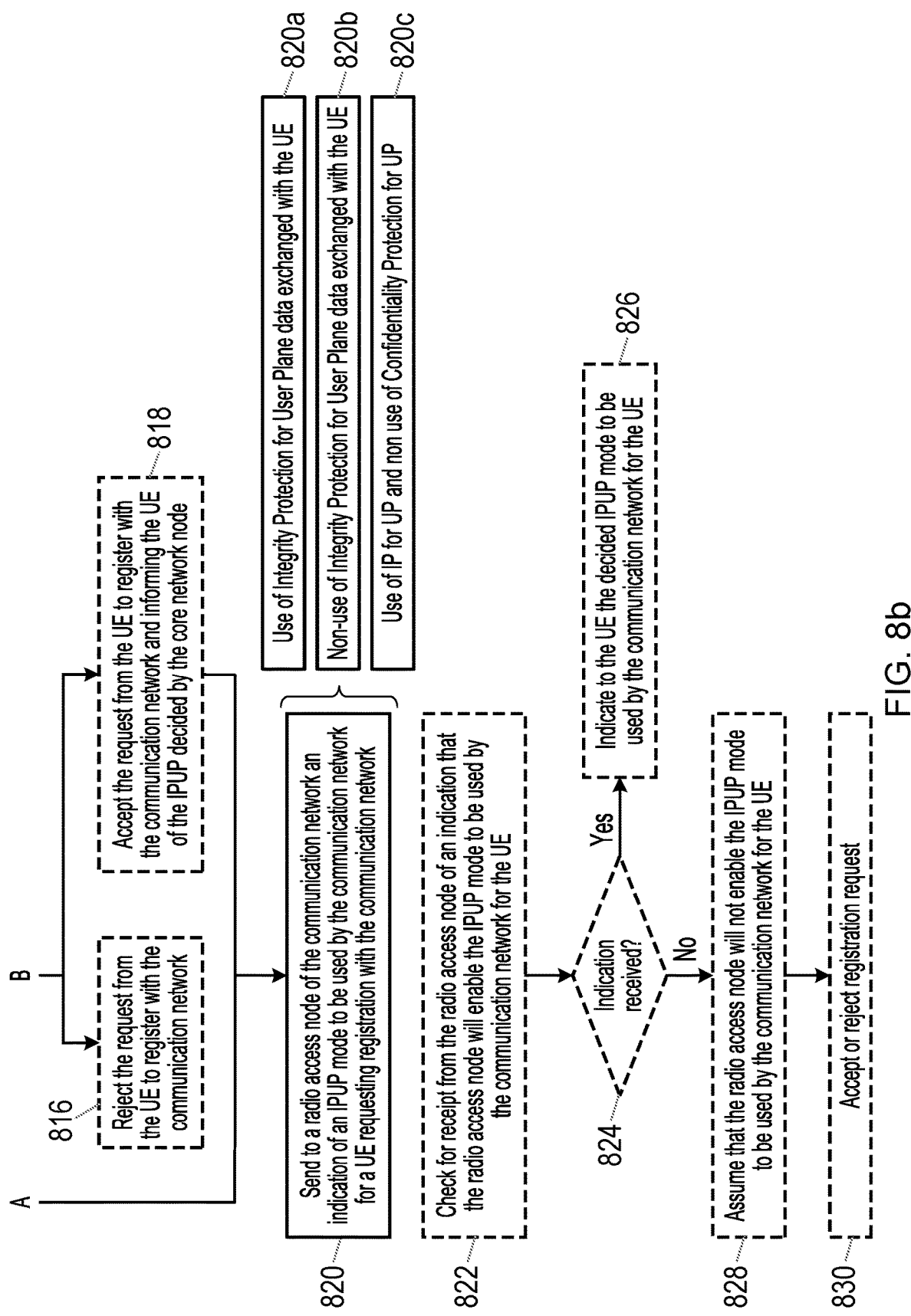
FIG. 8B is a flow chart illustrating process steps in a method for operating a core node in a communication network.

FIGS. 8A and 8B illustrate an example method 800 for operating a core node of a communication network according to the present disclosure. The communication network may for example comprise a fourth or fifth generation communication network. The method may be performed by an apparatus for operating a core node, which may be incorporated into the core node itself and/or may be hosting a suitable function for operating a core node, which may be a Virtualised Network Function. The core node may be an MME or an AMF.

Referring to FIG. 8A, the method may first comprise, in step 802, receiving a registration request for a UE. The method may further comprise, in step 804, checking whether the core node is a new core node for the UE. If so, the method may further comprise sending to an old core network of the UE an information request relating to the UE at step 806, and receiving from the old core network node an indication of the IPUP mode to be used by the communication network for the UE in step 808. According to examples of the present disclosure, the step 808 of receiving an IPUP mode may comprise receiving a maximum data rate of user plane data for which integrity protection may be applied.

In step 810, the method may further comprise, during an Update Location procedure, receiving from a subscription management node corresponding to the UE an indication of an IPUP mode to be used by the communication network for the UE. According to examples of the present disclosure, the step 810 of receiving an IPUP mode may comprise receiving a maximum data rate of user plane data for which integrity protection may be applied.

The method may further comprise, at step 812, deciding on an IPUP mode to be used by the communication network for the UE. The decision may be based on a policy hosted by the core network node and may take into account the indications received from an old core network node and/or a subscriber management node. The decided IPUP mode may apply to at least one of all data exchanged between the UE and the communication network 812*a*, or data exchanged between the UE and a specific slice or plurality of slices of the communication network 812*b*. The network slice or plurality of slices may be identified by slice type or slice identity.

The method may further comprise checking in step 814 whether the IPUP mode decided by the core network node matches a preference communicated by the UE for an IPUP mode to be used by the communication network for the UE. Referring to FIG. 8B, if the IPUP mode decided by the core network node does not match a preference communicated by the UE for an IPUP mode to be used by the communication network for the UE, the method may further comprise performing one of rejecting the request from the UE to register with the communication network at step 816 or accepting the request from the UE to register with the communication network and informing the UE of the IPUP decided by the core network node at step 818.

The method comprises, in step 820, sending to a radio access node of the communication network an indication of an IPUP mode to be used by the communication network for a UE requesting registration with the communication network. The IPUP mode comprises one of "use of Integrity Protection for User Plane data exchanged with the UE" 820*a*, "non-use of Integrity Protection for User Plane data exchanged with the UE" 820*b*, or "use of Integrity Protection for User Plane data, and non-use of Confidentiality Protection for User Plane data". The indication may include security capabilities and supported integrity algorithms for Integrity Protection of UP data. The indicated IPUP mode may be the mode decided by the core network node at step 812. According to examples of the present disclosure, the step 820 of sending an IPUP mode may comprise sending a maximum data rate of user plane data for which integrity protection may be applied.

The method may further comprise, at step 822, checking for receipt from the radio access node of the communication network of an indication that the radio access node of the communication network will enable the IPUP mode indicated to the radio access node of the communication network.

The method may further comprise indicating to the UE the decided IPUP mode to be used by the communication network for the UE in step 826. The sending of this indication may be made conditional upon receipt of the indication that the radio access node of the communication network will enable the IPUP mode indicated to the radio access node.

If an indication that the radio access node will enable the IPUP mode indicated to the radio access node is not received (step 824), the method may further comprise assuming that the radio access node will not enable the IPUP mode to be used by the communication network for the UE. Failure to receive the indication of enablement from the radio access node may be the result of a legacy radio access node or a radio access node that for any other reason does not understand the indication from the core node. The method may further comprise, in such a situation, either accepting or rejecting the registration request in step 830. The decision may be based on a policy hosted at the core node, which procedure may take account of a received UE preference and/or subscription information for the UE.

It will be appreciated that certain of the steps outlined above with reference to FIGS. 8A and 8B may be performed in a different order to that illustrated in the Figure.

Figure 9:
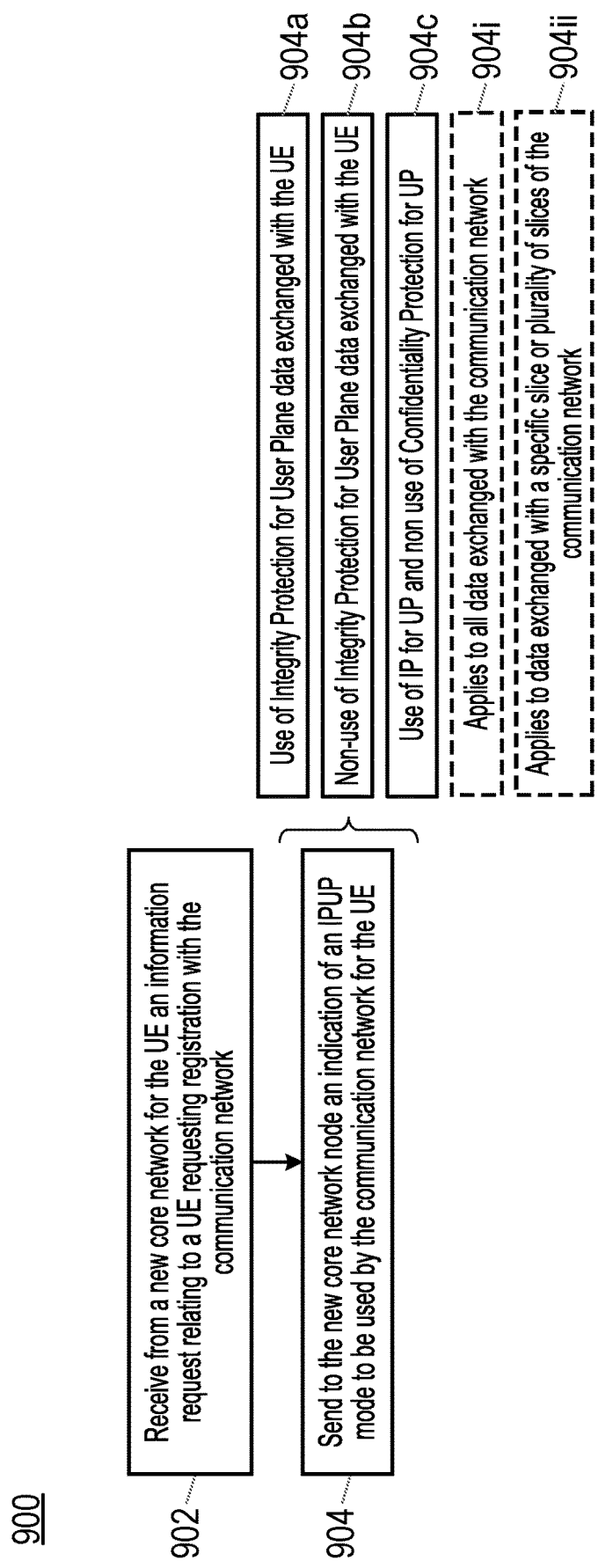
FIG. 9 is a flow chart illustrating process steps in another example of method for operating a core node.

FIG. 9 illustrates another example method 900 for operating a core node of a communication network according to the present disclosure. The communication network may for example comprise a fourth or fifth generation communication network. The method may be performed by an apparatus for operating a core node, which may be incorporated into the core node itself and/or may be hosting a suitable function for operating a core node, which may be a Virtualised Network Function. The core node may be an MME or an AMF.

Referring to FIG. 9, the core network node comprises an old core network node for a UE requesting registration with the communication network, and the method comprises receiving from a new core network for the UE an information request relating to the UE in step 902, and sending to the new core network node an indication of an IPUP mode to be used by the communication network for the UE in step 904. The IPUP mode comprises one of "use of Integrity Protection for User Plane data exchanged with the UE" 904*a*, "non-use of Integrity Protection for User Plane data exchanged with the UE" 904*b*, or "use of Integrity Protection for User Plane data, and non-use of Confidentiality Protection for User Plane data" 904*c*. The indicated IPUP mode may apply to at least one of all data exchanged between the UE and the communication network 904*i*, or data exchanged between the UE and a specific slice or plurality of slices of the communication network 904*ii*. According to examples of the present disclosure, the step 904 of sending an IPUP mode may comprise sending a maximum data rate of user plane data for which integrity protection may be applied.

Figure 10:
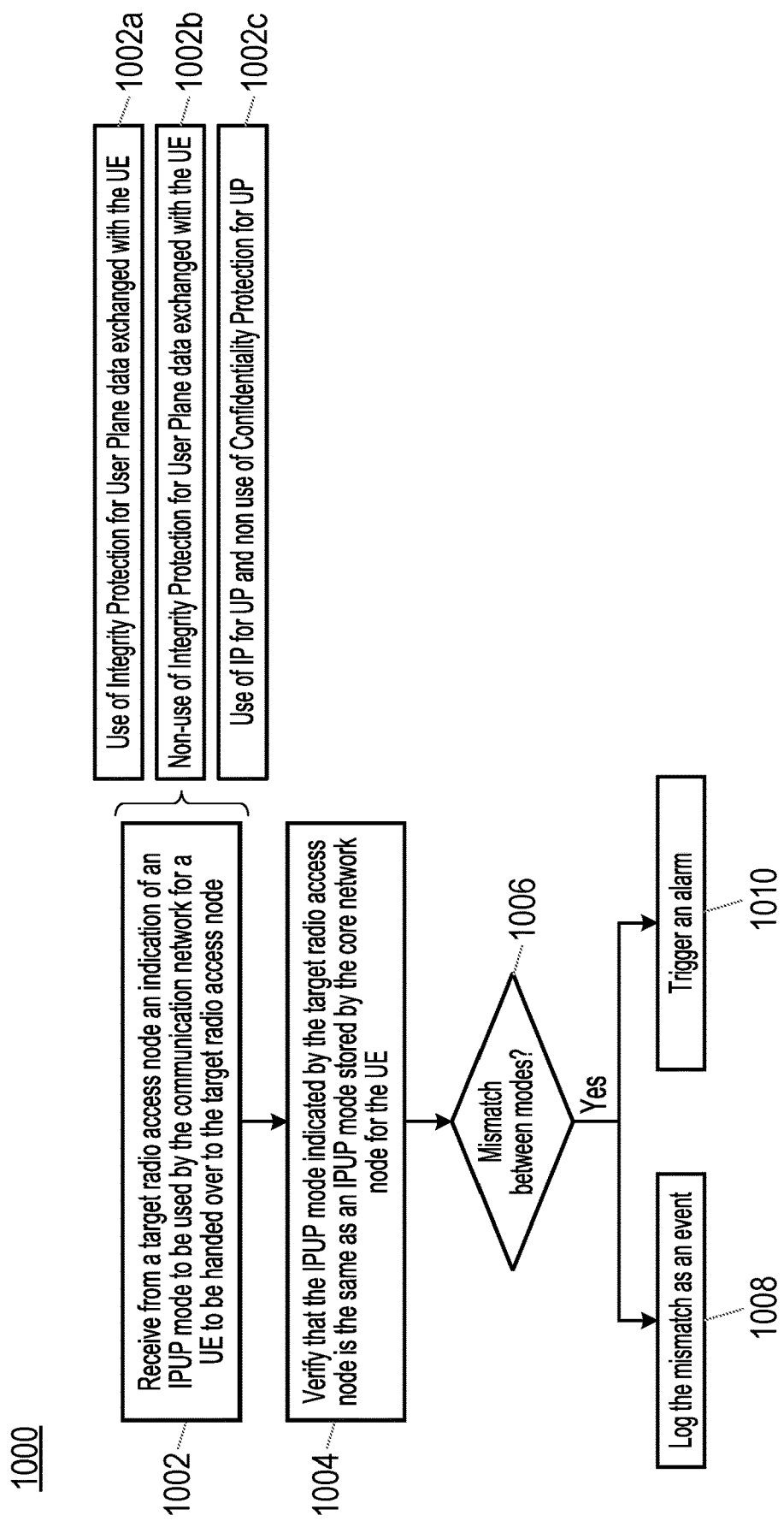
FIG. 10 is a flow chart illustrating process steps in another example of method for operating a core node.

FIG. 10 illustrates another example method 1000 for operating a core node of a communication network according to the present disclosure. The communication network may for example comprise a fourth or fifth generation communication network. The method may be performed by an apparatus for operating a core node, which may be incorporated into the core node itself and/or may be hosting a suitable function for operating a core node, which may be a Virtualised Network Function. The core node may be an MME or an AMF.

Referring to FIG. 10, the method comprises, in a first step 1002, receiving from a target radio access node an indication of an IPUP mode to be used by the communication network for a UE to be handed over to the target radio access node. The IPUP mode comprises one of "use of Integrity Protection for User Plane data exchanged with the UE" 1002*a*, "non-use of Integrity Protection for User Plane data exchanged with the UE" 1002*b*, or "use of Integrity Protection for User Plane data, and non-use of Confidentiality Protection for User Plane data" 1002*c*. According to examples of the present disclosure, the step 1002 of receiving an IPUP mode may comprise receiving a maximum data rate of user plane data for which integrity protection may be applied.

The method further comprises, in step 1004, verifying that the IPUP mode indicated by the target radio access node is the same as an IPUP mode stored by the core network node for the UE. In the event of a mismatch between the indicated and stored IPUP modes (step 1006), the method further comprises performing at least one of logging the mismatch as an event in step 1008 or triggering an alarm in step 1010.

Figure 11:
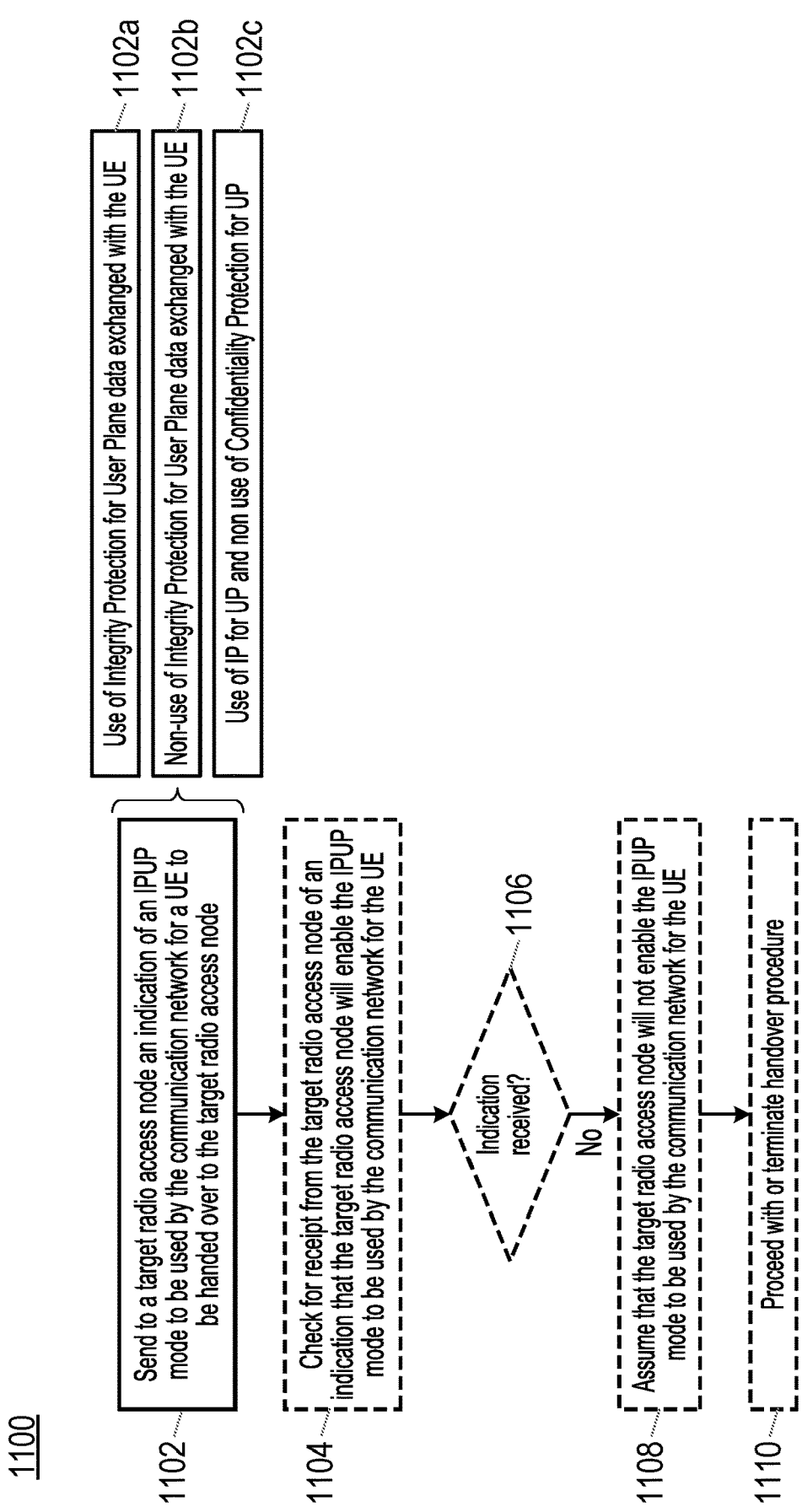
FIG. 11 is a flow chart illustrating process steps in another example of method for operating a core node.

FIG. 11 illustrates another example method 1100 for operating a core node of a communication network according to the present disclosure. The communication network may for example comprise a fourth or fifth generation communication network. The method may be performed by an apparatus for operating a core node, which may be incorporated into the core node itself and/or may be hosting a suitable function for operating a core node, which may be a Virtualised Network Function. The core node may be an MME or an AMF.

Referring to FIG. 11, the method comprises, in a first step 1102, sending to a target radio access node an indication of an IPUP mode to be used by the communication network for a UE to be handed over to the target radio access node. The IPUP mode comprises one of "use of Integrity Protection for User Plane data exchanged with the UE" 1102*a*, "non-use of Integrity Protection for User Plane data exchanged with the UE" 1102*b*, or "use of Integrity Protection for User Plane data, and non-use of Confidentiality Protection for User Plane data" 1102*c*. The indication may in some examples be sent in a handover request message. According to examples of the present disclosure, the step 1102 of sending an IPUP mode may comprise sending a maximum data rate of user plane data for which integrity protection may be applied.

The method may further comprise, in step 1104, checking for receipt from the target radio access node of an indication that the target radio access node will enable the IPUP mode to be used by the communication network for the UE. If an indication that the target radio access node will enable the IPUP mode indicated to the radio access node is not received (step 1106), the method may further comprise assuming that the target radio access node will not enable the IPUP mode to be used by the communication network for the UE. Failure to receive the indication of enablement from the target node may be the result of a legacy target node or a target node that for any other reason does not understand the indication from the core node. The method may further comprise, in such a situation, either proceeding with or terminating the handover procedure in step 1110. The decision to proceed with or terminate the handover procedure may be based on a policy hosted at the core node, which procedure may take account of a received UE preference and/or subscription information for the UE.

According to aspects of the present disclosure, there is provided a computer program comprising instructions which, when executed on at least one processor, cause the at least one processor to carry out a method according to any one of the preceding examples discussed with reference to FIGS. 2 to 11.

According to aspects of the present disclosure, there is provided a carrier containing a computer program as discussed above, wherein the carrier comprises one of an electronic signal, optical signal, radio signal or computer readable storage medium.

According to aspects of the present disclosure, there is provided a computer program product comprising non transitory computer readable media having stored thereon a computer program as discussed above.

Figures 12, 13:
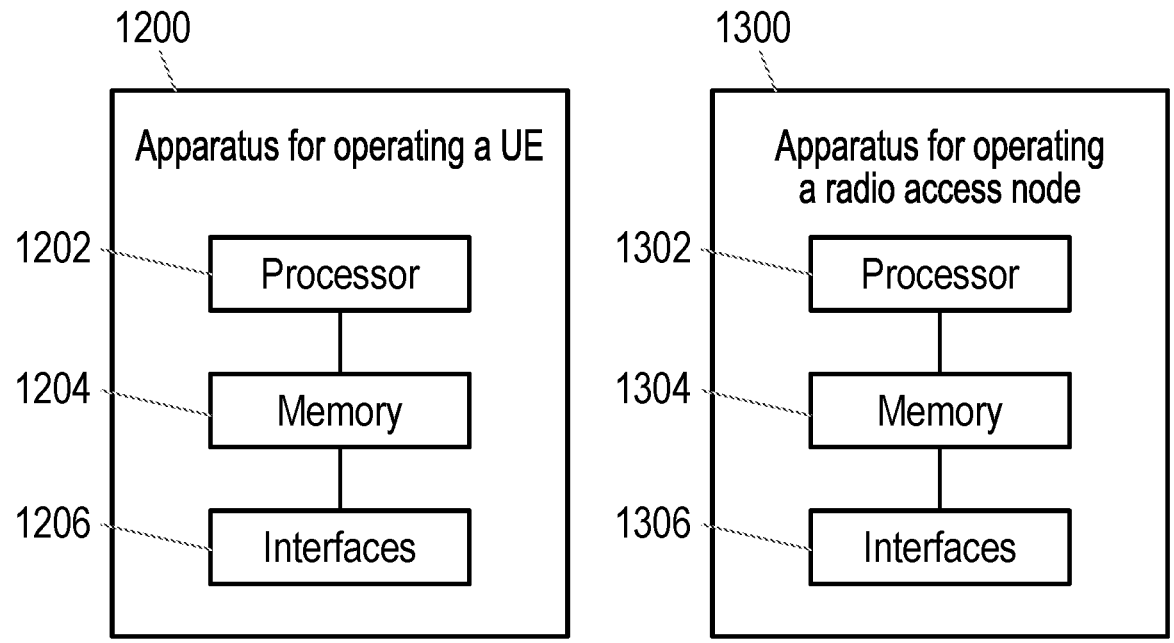
FIG. 12 is a block diagram illustrating functional units in an apparatus for operating a UE.
FIG. 13 is a block diagram illustrating functional units in an apparatus for operating a radio access node.

FIG. 12 illustrates a first example of an apparatus 1200 which may carry out methods for operating a UE as discussed above and as illustrated in FIGS. 2A to 2C. The apparatus may carry out the methods for example on receipt of suitable instructions from a computer program. Referring to FIG. 12, the apparatus comprises a processor 1202, a memory 1204 and interfaces 1206. The memory 1204 contains instructions executable by the processor 1202 such that the apparatus 1200 is operative to conduct some or all of the steps of the method for operating a UE described above and set out in the numbered claims below.

FIG. 13 illustrates a first example of an apparatus 1300 which may carry out methods for operating a radio access node as discussed above and as illustrated in FIGS. 3 to 7. The apparatus may carry out the methods for example on receipt of suitable instructions from a computer program. Referring to FIG. 13, the apparatus comprises a processor 1302, a memory 1304 and interfaces 1306. The memory 1304 contains instructions executable by the processor 1302 such that the apparatus 1300 is operative to conduct some or all of the steps of the methods for operating a radio access node described above and set out in the numbered claims below.

Figure 14:
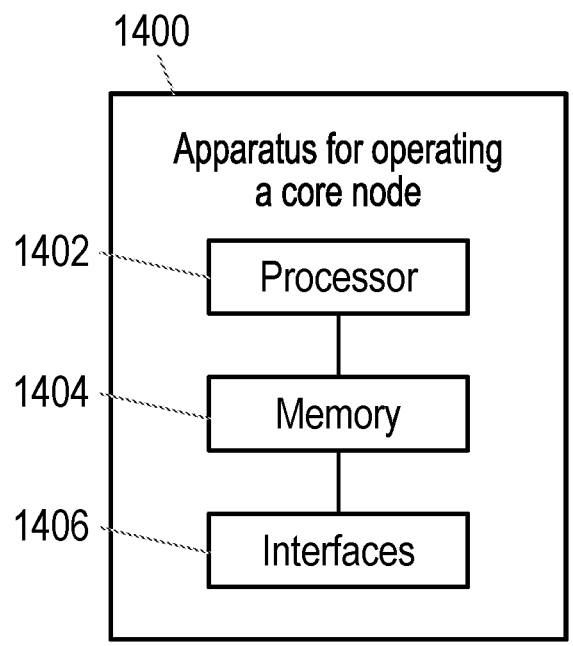
FIG. 14 is a block diagram illustrating functional units in an apparatus for operating a core node.

FIG. 14 illustrates a first example of an apparatus 1400 which may carry out methods for operating a core node as discussed above and as illustrated in FIGS. 8A to 11. The apparatus may carry out the methods for example on receipt of suitable instructions from a computer program. Referring to FIG. 14, the apparatus comprises a processor 1402, a memory 1404 and interfaces 1406. The memory 1404 contains instructions executable by the processor 1402 such that the apparatus 1400 is operative to conduct some or all of the steps of the methods for operating a core node described above and set out in the numbered claims below.

Figures 15, 16:
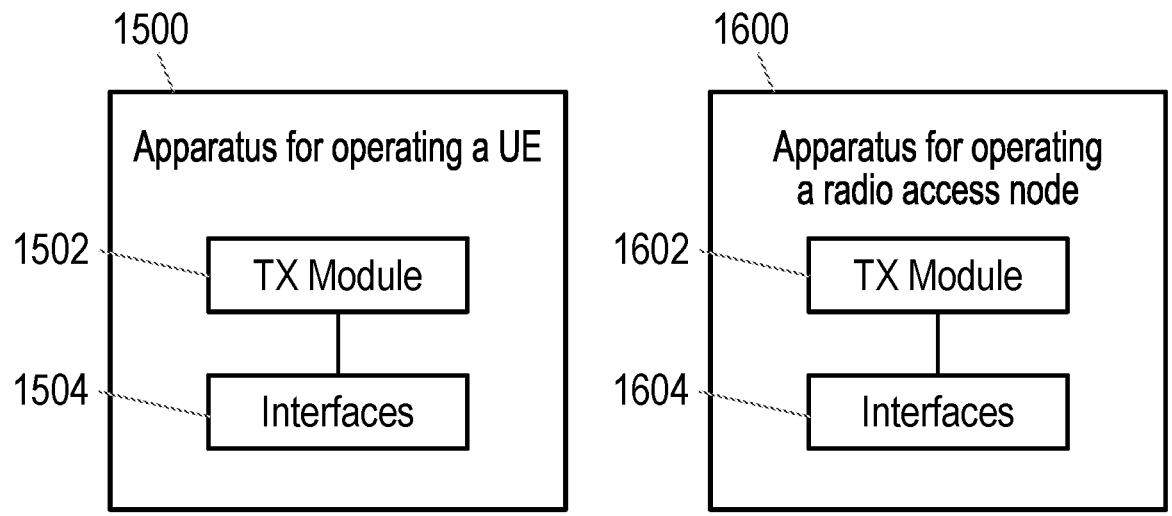
FIG. 15 is a block diagram illustrating functional units in another example of apparatus for operating a UE.
FIG. 16 is a block diagram illustrating functional units in another example of apparatus for operating a radio access node.

FIG. 15 illustrates an alternative example apparatus 1500, which may implement methods for operating a UE as discussed above and set out in the numbered claims below, for example on receipt of suitable instructions from a computer program. It will be appreciated that the modules illustrated in FIG. 15 may be realised in any appropriate combination of hardware and/or software. For example, the modules may comprise one or more processors and one or more memories containing instructions executable by the one or more processors. The modules may be integrated to any degree.

Referring to FIG. 15, the apparatus 1500 comprises a transmission module 1502 for indicating to the communication network an IPUP mode supported by the UE when requesting registration with the communication network, wherein the IPUP mode comprises one of use of Integrity Protection for User Plane data exchanged with the UE, non-use of Integrity Protection for User Plane data exchanged with the UE, or use of Integrity Protection for User Plane data, and non-use of Confidentiality Protection for User Plane data. The apparatus further comprises interfaces 1504.

Figure 17:
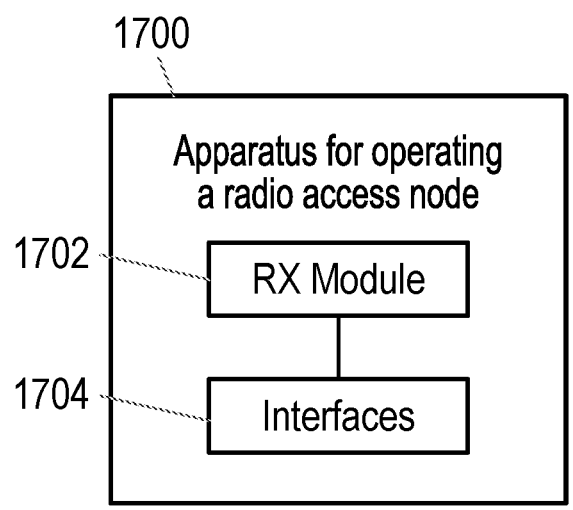
FIG. 17 is a block diagram illustrating functional units in another example of apparatus for operating a radio access node.

FIGS. 16 and 17 illustrate alternative examples of apparatus 1600, 1700 which may implement methods for operating a radio access node as discussed above and set out in the numbered claims below, for example on receipt of suitable instructions from a computer program. It will be appreciated that the modules illustrated in FIGS. 16 and 17 may be realised in any appropriate combination of hardware and/or software. For example, the modules may comprise one or more processors and one or more memories containing instructions executable by the one or more processors. The modules may be integrated to any degree.

Referring to FIG. 16, the apparatus 1600 comprises a transmission module 1602 and interfaces 1604. The radio access node may be a source radio access node and the transmission module 1602 may be for, during a procedure for handover of a UE from the source radio access node to a target radio access node, sending an indication of an IPUP mode to be used by the communication network for the UE, wherein the IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data. In further examples, the radio access node may be a master radio access node and the transmission module 1602 may be for sending to a secondary radio access node an indication of an IPUP mode to be used by the communication network for a UE, wherein the IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data. The indication may be sent to the secondary radio access node during a procedure for at least one of: secondary radio access node addition, secondary radio access node modification requiring key update, or Data Radio Bearer (DRB) offload.

Referring to FIG. 17, the apparatus 1700 comprises a receiving module 1702 and interfaces 1704. The receiving module may be for receiving, from a UE requesting registration with the communication network, an indication of an IPUP mode supported by the UE, wherein the IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data, and wherein the indication is received from the UE via the communication network.

In other examples, the radio access node may comprise a target radio access node and the receiving module 1702 may be for, during a procedure for handover of a UE from a source radio access node to the target radio access node, receiving an indication of an IPUP mode to be used by the communication network for the UE, wherein the IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data.

In other examples, the radio access node may comprise a secondary radio access node and the receiving module 1702 may be for receiving from a master radio access node an indication of an IPUP mode to be used by the communication network for a UE, wherein the IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data. The may be received from the master radio access node during a procedure for at least one of: secondary radio access node addition, secondary radio access node modification requiring key update, or DRB offload.

Figure 18:
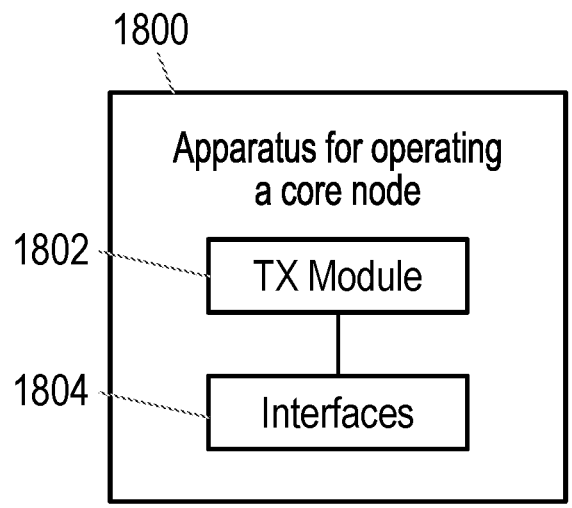
FIG. 18 is a block diagram illustrating functional units in another example of apparatus for operating a core node.
Figure 19:
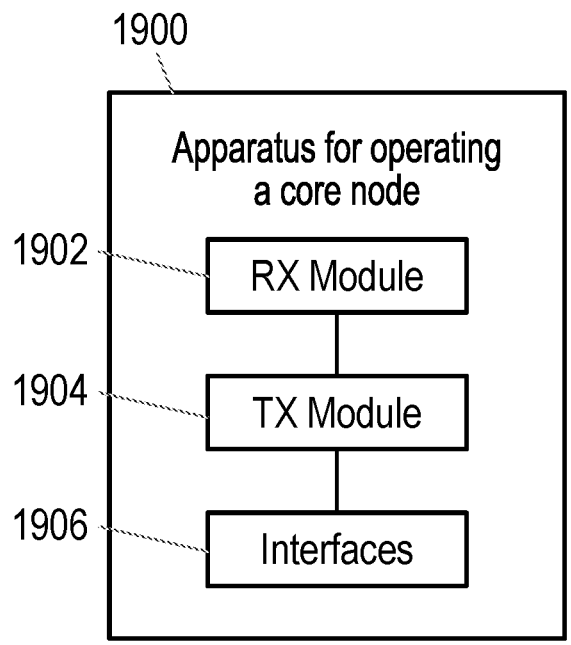
FIG. 19 is a block diagram illustrating functional units in another example of apparatus for operating a core node.
Figure 20:
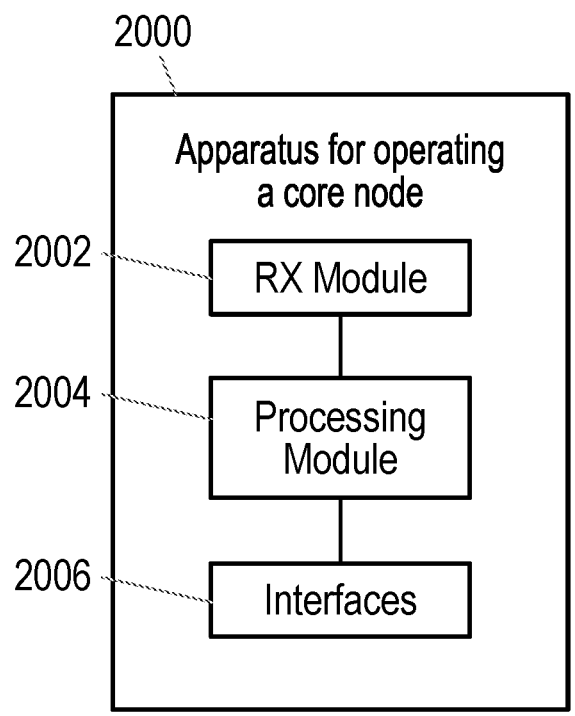
FIG. 20 is a block diagram illustrating functional units in another example of apparatus for operating a core node.

FIGS. 18 to 20 illustrate alternative examples of apparatus 1800, 1900, 2000 which may implement methods for operating a core node as discussed above and set out in the numbered claims below, for example on receipt of suitable instructions from a computer program. It will be appreciated that the modules illustrated in FIGS. 18 to 20 may be realised in any appropriate combination of hardware and/or software. For example, the modules may comprise one or more processors and one or more memories containing instructions executable by the one or more processors. The modules may be integrated to any degree.

Referring to FIG. 18, the apparatus 1800 comprises a transmission module 1802 and interfaces 1804. The transmission module may be for sending to a radio access node of a communication network an indication of an IPUP mode to be used by the communication network for a UE requesting registration with the communication network, wherein the IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data.

In other examples, the transmission module may be for sending to a target radio access node an indication of an IPUP mode to be used by the communication network for a UE to be handed over to the target radio access node, wherein the IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data.

Referring to FIG. 19, the apparatus 1900 comprises a receiving module 1902, a transmission module 1904 and interfaces 1906. The core network node comprises an old core network node for a UE requesting registration with the communication network. The receiving module 1902 is for receiving from a new core network for the UE an information request relating to the UE. The transmission module 1904 is for sending to the new core network node an indication of an IPUP mode to be used by the communication network for the UE, wherein the IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data.

Referring to FIG. 20, the apparatus 2000 comprises a receiving module 2002, a processing module 2004 and interfaces 2006. The receiving module 2002 is for receiving from a target radio access node an indication of an IPUP mode to be used by the communication network for a UE to be handed over to the target radio access node. The processing module is for verifying that the IPUP mode indicated by the target radio access node is the same as an IPUP mode stored by the core network node for the UE, and, in the event of a mismatch between the indicated and stored IPUP modes, performing at least one of: logging the mismatch as an event, or triggering an alarm. The IPUP mode comprises one of: use of Integrity Protection for User Plane data exchanged with the UE, non-use of Integrity Protection for User Plane data exchanged with the UE, or use of Integrity Protection for User Plane data, and non-use of Confidentiality Protection for User Plane data.

Example applications of methods according to the present disclosure are set out below within the context of communication network procedures including UE registration, handover, dual connectivity management etc. The example applications demonstrate how different examples of the methods set out above may together achieve the functionality of enabling Integrity Protection of User Plane data. It will be appreciated that the following examples are merely for the purpose of illustration and are not intended to limit the scope of the present disclosure in any way. The following examples are presented within the context of both LTE and 5G/Next Generation Networks.

Negotiation of the use of Integrity Protection of the User Plane in UE Registration Procedure The UE and communication network negotiate whether Integrity Protection of UP data sent between UE and base station shall be enabled or disabled. The UE indicates its support or otherwise for UP integrity protection. The UE may indicate as a capability a maximum data rate for integrity protection of UP data. For example, if the UE indicates 64 kbps as its maximum data rate, the network may be assumed to turn the UP integrity on only for data rates equal or lower than 64 kbps. Higher data rates would not use UP integrity. Indication of this capability could be used as the UE indication of support of UP integrity to the network. The UE may indicate its preference as to whether or not Integrity Protection for the UP should be used. The preference may apply to all data exchanged with the network may apply to a particular slice type (e.g. Network Slice Selection Assistance Information, NSSAI) or slice identifier (e.g. Data Network Name, DNN).

The following example is applicable to both 5G and 4G (EPC/LTE). In 4G (EPC/LTE) the Registration procedure described below would be replaced with an Attach procedure or a Tracking Area Update procedure. The new enhancements described in the steps below are applicable to EPC as very similar procedures are used in 4G (EPC) Registration The following Registration procedure developed for 5G in SA2 and illustrated in FIG. 21 is enhanced with negotiation of the use of integrity protection of UP, where the new enhancements in the Figure are shown in italic text.

Figure 21:
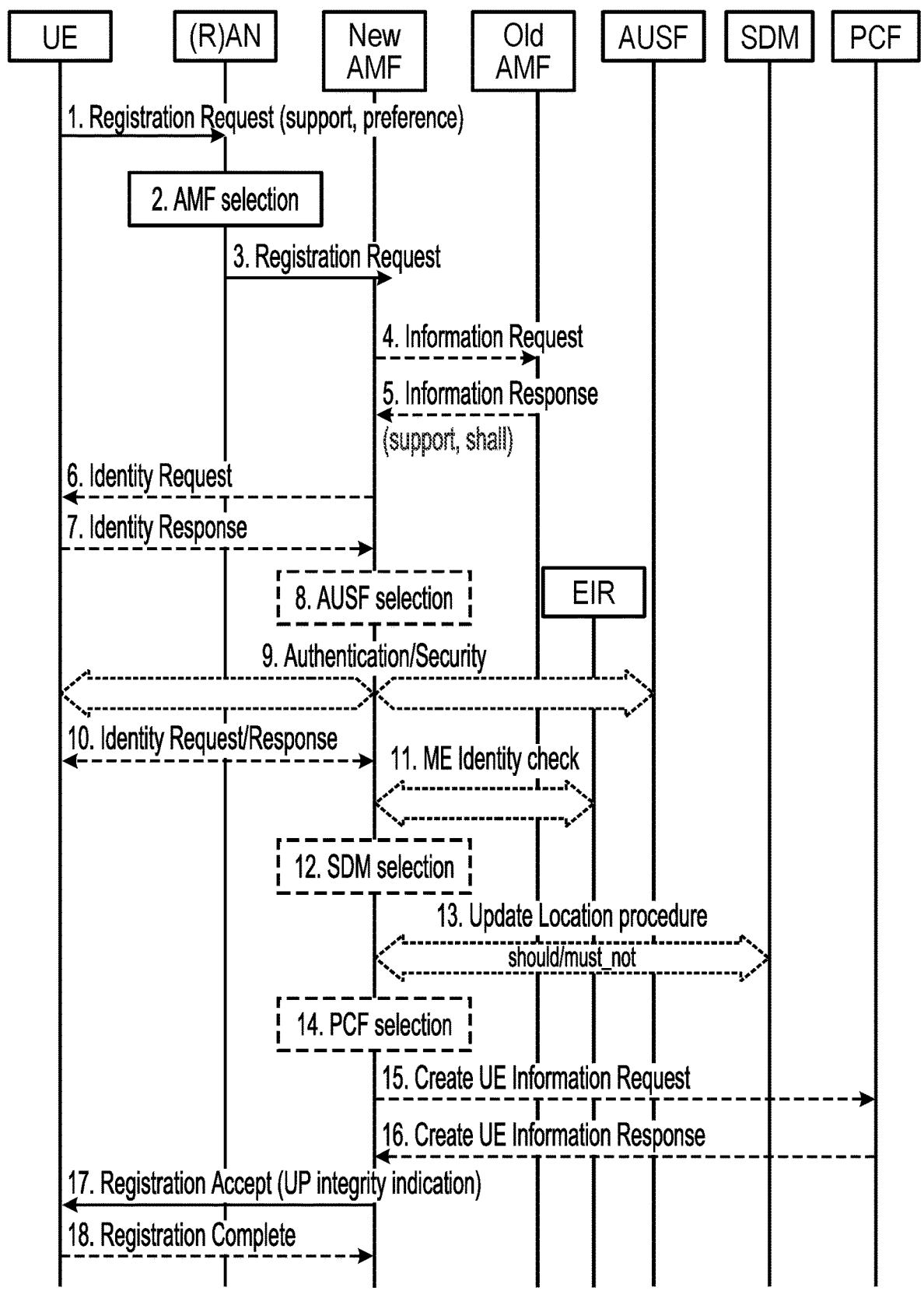
FIG. 21 is a signalling diagram illustrating a registration procedure for a UE.

The following terms are used in FIG. 21:
Support. UE supports UP integrity; this is an information element in UE 5G security capabilities.
Should/must_not: HN/SDM thinks UP integrity should be (or must not be) used. The "must not" option may be related to IoT devices having integrity protection terminated in HN (e.g. BEST like mechanism)
Shall: AMF policy requires that UP integrity shall be used
Maximum data rate for IP of UP: indication by UE of a maximum data rate for integrity protection of UP data. Note that this capability could be used as the UE indication of support of UP integrity to the network (i.e. the term Support defined above). But for this application its defined and shown as a separate indication.

With reference to steps 1 to 23 in FIG. 21:

1. UE to RAN: Registration Request (Registration type, Permanent ID or Temporary ID, Security parameters, NSSAI, indication of UE's support of UP integrity, and preference to use UP integrity or not).

The Registration type indicates if the UE wants to perform an 'initial registration' (i.e. the UE is in non-registered state) or a 'normal registration' (i.e. the UE is in registered state). If included, the Temporary ID indicates the last serving AMF. The Security parameters are used for Authentication and integrity protection. NSSAI indicates the Network Slice Selection Assistance Information (as defined in TS 23.501, TS 23.502 and TR 23.799).

The security parameters include the UE indication of supporting integrity protection of UP.

The UE may include an indication of its preference (which may be for all data or per network slice type or slice identifier) of whether to use UP integrity or not in the Registration Request message. For example, if the UE supports an IoT slice type, then the UE could indicate for that IoT slice type its preference is to use UP integrity. Or if the UE is authorized to access data network A (slice identifier), then the UE could indicate for that slice identifier its preference to use UP integrity. Or if the UE is an IoT UE, then the UE could indicate that all UP data is preferred to be integrity protected.

The UE may indicate a new capability for the maximum data rate for integrity protection of UP data. For example, if the UE indicates 64 kbps as its maximum data rate, the network is assumed to turn the UP integrity on only for data rates equal or lower than 64 kbps. Higher data rates would not use UP integrity.

2. If a Permanent ID is included or the Temporary ID does not indicate a valid AMF the RAN, based on RAT and NSSAI, if available, selects an AMF.

The RAN selects an AMF as described in TS 23.501, TS 23.502 and TR 23.799.

3. RAN to AMF: Registration Request (Registration type, Permanent ID or Temporary ID, Security parameters, NSSAI) and Location Information, Cell Identity, RAT type.

Location Information, Cell Identity and RAT type relates to the cell in which the UE is camping.

4. [conditional] new AMF to old AMF: Information Request (complete Registration Request)

If the UE's Temporary ID was included in the Registration Request and the serving AMF has changed since last registration, the new AMF may send Information Request to old AMF including the complete Registration Request IE to request the UE's Permanent ID and MM Context.

5. [conditional] old AMF to new AMF: Information Response (Permanent ID, MM Context)

Old AMF responds with Information Response to new AMF including the UE's Permanent ID and MM Context.

The MM context includes information if UP integrity shall be used with this UE. This information was decided by the old AMF based on the request from the HN/SDM. The UE specific UP integrity protection policy may be for all user plane data, or restricted to specific network slice type (e.g. Network Slice Selection Assistance Information, NSSAI) or restricted to specific slice identifier (e.g. Data Network Name, DNN). The MM context may also include the new UE capability for the maximum data rate for integrity protection of UP data 6. [conditional] AMF to UE: Identity Request ( )

If the Permanent ID is not provided by the UE nor retrieved from the old AMF the Identity Request procedure is initiated by AMF sending an Identity Request message to the UE.

7. [conditional] UE to AMF: Identity Response ( )

The UE responds with an Identity Response message including the Permanent ID.

8. If the Registration Request was not sent integrity protected or integrity protection is indicated as failed (step 5 Information Response), the AMF, based on Permanent ID, selects an AUSF.

The AMF selects an AUSF as described in TS 23.ABC [xx], clause X.

9. The AUSF may initiate authentication of the UE and NAS security functions if the Registration Request was not sent integrity protected or integrity protection is indicated as failed in step 5 (Information Response). If security is established, then AMF may fetch IMEI from the UE.

The authentication and security are performed as described in TS 23.502 and SA3 TR 33.799.

10. [conditional] AMF to UE: Identity Request ( )

If the ME identity was not provided by the UE nor retrieved from the old AMF the Identity Request procedure is initiated by AMF sending an Identity Request message to the UE to retrieve the ME identity.

11. Optionally the AMF initiates ME identity check.

The ME identity check is performed as described in TS 23.502.

12. If step 13 is to be performed, the AMF, based on the Permanent ID, selects an SDM.

The AMF selects an SDM as described in TS 23.502.

13. If the AMF has changed since the last registration, or if there is no valid subscription context for the UE in the AMF, or if the UE provides a permanent ID which doesn't refer to a valid context in the AMF, the AMF initiates the Update Location procedure. This will include that SDM initiates Cancel Location to old AMF, if any. The old AMF removes the MM context and notifies all possibly associated SMF(s).

The Update Location procedure is performed as described in TS 23.502.

As a part of the Update Location procedure, the SDM indicates if the UP should be (or must not be) integrity protected. This indication may be per UE (i.e. all UP data), per network slice type or network slice identifier. The AMF makes a policy decision if the UP integrity shall be used. This policy decision may be per UE (i.e. all UP data), per network slice type or network slice identifier.

If the policy in AMF requires UP integrity but the UE's preference is to not use UP integrity, then the network may reject the UE by sending a Registration Reject message.

If the policy in AMF requires UP integrity but the UE's preference is to not use UP integrity, then the network may accept the UE by sending a Registration Accept message including an indication to the UE that UP integrity will be taken into use. If the UE does not accept the network enabling UP integrity, then the UE may disconnect from the network.

If the policy in AMF requires no UP integrity but the UE's preference is to use UP integrity, then the network may reject the UE by sending a Registration Reject message.

If the policy in AMF requires no UP integrity but the UE's preference is to use UP integrity, then the network may accept the UE by sending a Registration Accept message including an indication to the UE that UP integrity will not be taken into use. If the UE does not accept the network disabling UP integrity, then the UE may disconnect from the network.

As all of the policy decisions may be per UE (i.e. all UP data) or UE exchanging data with a specific type of network slice or UE exchanging data with a specific network slice (e.g. a specific data network), combinations of previous policy decisions may exist.

14. Optionally the AMF, based on the Permanent ID, selects a PCF.

The AMF selects an PCF as described in TS 23.502.

15. [optional] AMF to PCF: UE Context Establishment Request

The AMF request the PCF to apply operator policies for the UE.

16. PCF to AMF: UE Context Establishment Acknowledged

The PCF acknowledges the UE Context Establishment Request message.

17. AMF to RAN: N2 Request (Registration Accept (Temporary ID, Registration area), UP integrity indication, UE capability for the maximum data rate for IP of UP)

The AMF sends a Registration Accept message to the UE indicating that the 'initial registration' has been accepted. Temporary ID is included if the AMF allocates a new Temporary ID.

If the AMF accepts to use UP integrity protection then the AMF will include an indication to the UE in the Registration Accept indicating that UP integrity will be taken into use. This indication may be for all UP data, or for data to be exchanged with a specific network slice type(s) or for data to be exchanged with a specific network slice identifier(s) (i.e. data network). If the AMF does not accept to use UP integrity protection then the AMF will include an indication to the UE in the Registration Accept indicating that UP integrity will not be taken into use. This indication may be for all user plane, or restricted to specific network slice type(s) or to network slice identifier(s).

If the AMF accepts to use UP integrity protection then the AMF will include an indication to the RAN in the N2 Request message indicating that UP integrity will be taken into use. This indication may be for all UP data, or for data to be exchanged with a specific network slice type(s) or for data to be exchanged with a specific network slice identifier(s) (i.e. data network). If the AMF does not accept to use UP integrity protection then the AMF will include an indication to the RAN in the N2 Request message indicating that UP integrity will not be taken into use. This indication may be for all user plane, or restricted to specific network slice type(s) or to network slice identifier(s).

If the AMF accepts to use UP integrity protection then the AMF may also include the UE capability for the maximum data rate for IP of UP to the RAN.

18. RAN to UE: AS Security Mode Command

The RAN sends an AS Security Mode Command message to the UE in order to establish the security between RAN and UE. RAN shall include the selected encryption algorithm and the selected integrity algorithm to the UE.

As a first option—OPTION 1: The RAN may indicate to the UE in AS Security Mode Command whether UP integrity for data is enabled or disabled. This can be indicated by listing the supported integrity algorithms for UP data, or as a general indication that UP integrity is supported (assuming that same algorithms that are used for control plane integrity protection is used for user plane integrity protection).

As a second option—OPTION 2: The RAN may indicate to the UE in RRCConnectionReconfiguration message whether UP integrity for data is enabled or disabled as described in step 22 below.

19. UE to RAN: AS Security Mode Complete

The UE sends an AS Security Mode Complete message to the RAN. Security for RRC signaling is activated. Security for UP data may be activated in this step for OPTION 1 or in RRCConnectionReconfiguration procedure as described in step 22 and step 23 for OPTION 2.

20. RAN to UE: Registration Accept (Temporary ID, Registration area)

The AMF sends a Registration Accept message to the UE indicating that the 'initial registration' has been accepted. Temporary ID is included if the AMF allocates a new Temporary ID.

21. [conditional] UE to AMF: Registration Complete ( )

The UE sends a Registration Complete message to the AMF to acknowledge if a new Temporary ID was assigned.

OPTION 2: 22. RAN to UE: RRCConnectionReconfiguration (per each unique DRB: encryption is enabled or disabled, integrity protection is enabled or disabled) RAN is activating or deactivating integrity protection per each unique DRB setup in RRCConnectionReconfiguration message.

OPTION 2: 23. UE to RAN: RRCConnectionReconfiguration Complete

The UE sends an RRCConnectionReconfiguration Complete message to the RAN. Security (integrity protection and/or encryption) for UP data is activated in this step.

Core Network indicates to RAN whether UP integrity protection shall be used or not It will be appreciated that the new enhancements described in the steps below, illustrated in FIG. 22 and indicated by italic text are applicable to both 5G and 4G (EPC/LTE). The Core Network indicates to the RAN whether UP integrity protection shall be used or not.

The following Registration procedure developed for 5G in SA2 is enhanced with support for indicating whether UP integrity protection shall be used or not.

Figure 22:
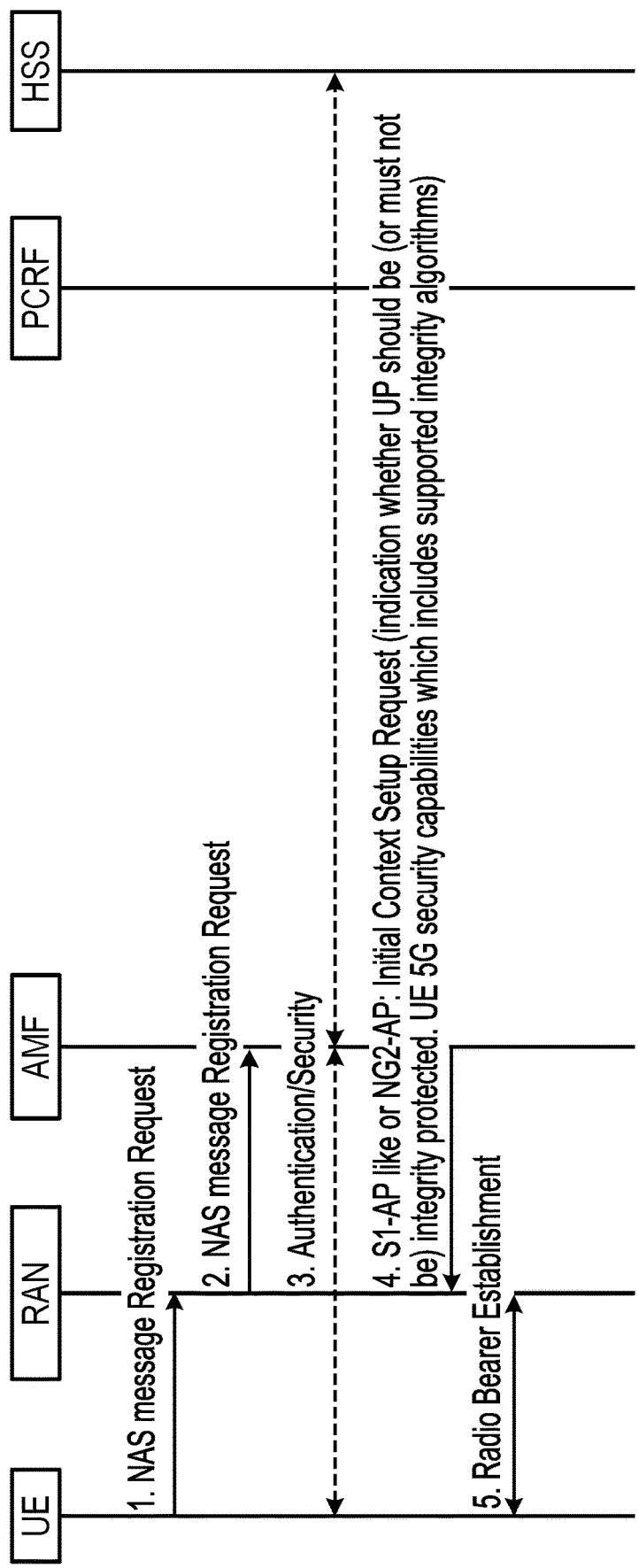
FIG. 22 is a signalling diagram illustrating a detail of a registration procedure for a UE.

With reference to step 4 in FIG. 22:

4: AMF indicates to RAN whether UP should be (or must not be) integrity protected between the UE and the RAN. The AMF also indicates the UE 5G security capabilities which includes supported integrity algorithms.

The AMF may also indicate to RAN the UE capability for the maximum data rate for integrity protection of UP. For example, if the UE indicates 64 kbps as its maximum data rate, the network is assumed to turn the UP integrity on only for data rates equal or lower than 64 kbps. Higher data rates would not use UP integrity.

The RAN base station may respond to the AMF with an indication that it will enable UP integrity protection if that is the indication received from the AMF. If the RAN base station does not support UP integrity protection, then it may reject or may accept but fail to send an indication that it will enable UP integrity protection, for example in the case of a legacy base station. The failure to receive an indication from the base station that UP integrity protection will be enabled may be interpreted by the RAN as meaning that UP integrity protection will not be enabled.

RAN indicates to UE that it does or does not support UP integrity protection

It will be appreciated that the new enhancements described in the steps below, illustrated in FIG. 23 and indicated by italic text are applicable to both 5G and 4G (EPC/LTE).

Figure 23:
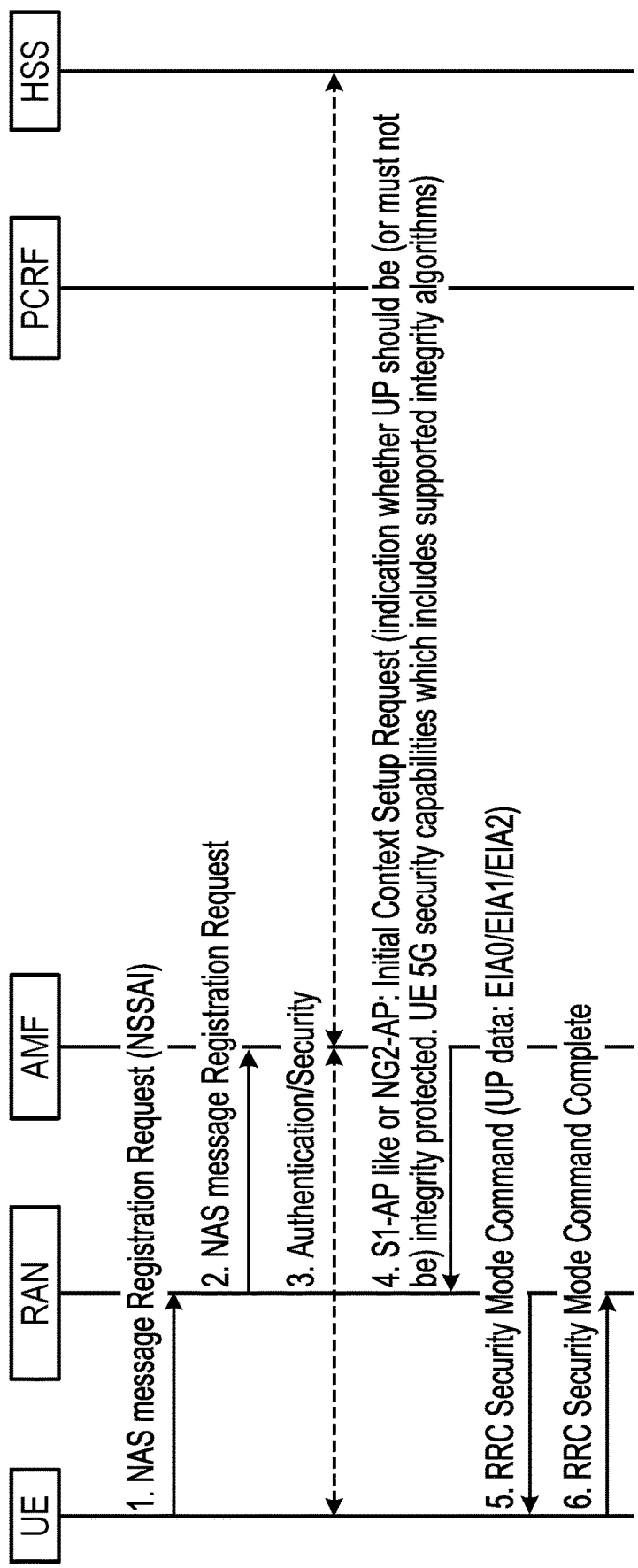
FIG. 23 is a signalling diagram illustrating another detail of a registration procedure for a UE.

With reference to steps 4 to 8 in FIG. 23:

4: AMF indicates to RAN whether UP should be (or must not be) integrity protected between UE and RAN. The AMF also indicates the UE 5G security capabilities which includes supported integrity algorithms.

The AMF may also in step 4 indicate to RAN the UE capability for the maximum data rate for integrity protection of UP. For example, if the UE indicates 64 kbps as its maximum data rate, the network is assumed to turn the UP integrity on only for data rates equal or lower than 64 kbps. Higher data rates would not use UP integrity.

5: RAN to UE: AS Security Mode Command

The RAN sends an AS Security Mode Command message to the UE in order to establish the security between RAN and UE. RAN shall include the selected encryption algorithm and the selected integrity algorithm to the UE.

As a first option—OPTION 1: The RAN may indicate to the UE in AS Security Mode Command whether UP integrity for data is enabled or disabled. This can be indicated by listing the supported integrity algorithms for UP data, or as a general indication that UP integrity is supported (assuming that same algorithms that are used for control plane integrity protection is used for user plane integrity protection).

As a second option—OPTION 2: The RAN may indicate to the UE in RRCConnectionReconfiguration message whether UP integrity for data is enabled or disabled as described in step 7 below.

6: UE to RAN: AS Security Mode Complete

The UE sends an AS Security Mode Complete message to the RAN. Security for RRC signaling is activated. Security for UP data may be activated in this step for OPTION 1 or in RRCConnectionReconfiguration procedure as described in step 8 and step 9 for OPTION 2.

OPTION 2: 7. RAN to UE: RRCConnectionReconfiguration (per each unique DRB: encryption is enabled or disabled, integrity protection is enabled or disabled)

RAN is activating or deactivating integrity protection per each unique DRB setup in RRCConnectionReconfiguration message.

OPTION 2: 8: UE to RAN: RRCConnectionReconfiguration Complete

The UE sends an RRCConnectionReconfiguration Complete message to the RAN. Security (integrity protection and/or encryption) for UP data is activated in this step.

Initial AS security context establishment

New enhancements described in the steps below are indicated by the use of italic text.

4G (EPC/LTE)

Each eNB shall be configured via network management with lists of algorithms which are allowed for usage. There shall be one list for integrity algorithms, and one for ciphering algorithms. These lists shall be ordered according to a priority decided by the operator. When AS security context is established in the eNB, the MME shall send the UE EPS security capabilities, and an indication if the UP integrity shall be turned on, and in some examples the UE capability for the maximum data rate for integrity protection of UP, to the eNB. The eNB shall choose the ciphering algorithm which has the highest priority from its configured list and is also present in the UE EPS security capabilities. The eNB shall choose the integrity algorithm which has the highest priority from its configured list and is also present in the UE EPS security capabilities.

There are two options:

Option 1: The chosen algorithms, and the indication if the UP integrity shall also be turned on, shall be indicated to the UE in the AS SMC. The ciphering algorithm is used for ciphering of the user plane and RRC traffic. The integrity algorithm is used for integrity protection of the RRC traffic, and, if applicable, for the integrity protection of user plane traffic between RN and DeNB.

Option 2: The chosen algorithms shall be indicated to the UE in the AS SMC. The indication if the UP integrity shall also be turned on shall be indicated to the UE in RRCConnectionReconfiguration message, The ciphering algorithm is used for ciphering of the user plane and RRC traffic. The integrity algorithm is used for integrity protection of the RRC traffic, and, if applicable, for the integrity protection of user plane traffic between UE and RAN.

5G

Each gNB shall be configured via network management with lists of algorithms which are allowed for usage. There shall be one list for integrity algorithms, and one for ciphering algorithms. These lists shall be ordered according to a priority decided by the operator. When AS security context is established in the gNB, the AMF shall send the UE EPS security capabilities, and an indication if the UP integrity shall be turned on, and in some examples the UE capability for the maximum data rate for integrity protection of UP to the eNB. The eNB shall choose the ciphering algorithm which has the highest priority from its configured list and is also present in the UE 5GS security capabilities. The gNB shall choose the integrity algorithm which has the highest priority from its configured list and is also present in the UE 5GS security capabilities.

There are two options:

Option 1: The chosen algorithms, and the indication if the UP integrity shall also be turned on, shall be indicated to the UE in the AS SMC. The ciphering algorithm is used for ciphering of the user plane and RRC traffic. The integrity algorithm is used for integrity protection of the RRC traffic, and, if applicable, for the integrity protection of user plane traffic between RN and DgNB.

Option 2: The chosen algorithms, shall be indicated to the UE in the AS SMC. The indication if the UP integrity shall also be turned on shall be indicated to the UE in RRCConnectionReconfiguration message, The ciphering algorithm is used for ciphering of the user plane and RRC traffic. The integrity algorithm is used for integrity protection of the RRC traffic, and, if applicable, for the integrity protection of user plane traffic between UE and RAN.

Handovers

New enhancements described in the steps below are indicated by the use of italic text.

X2-handover 4G (EPC/LTE)

At handover from a source eNB over X2 to a target eNB, the source eNB shall include the UE EPS security capabilities, and an indication if the UP integrity shall be turned on, and ciphering and integrity algorithms used in the source cell in the handover request message. The target eNB shall select the algorithm with highest priority from the UE EPS security capabilities according to the prioritized locally configured list of algorithms (this applies for both integrity and ciphering algorithms). The chosen algorithms, and the indication if the UP integrity shall also be turned on, shall be indicated to the UE in the handover command (i.e. in the RRCConnectionReconfiguration procedure in TS 36.331) if the target eNB selects different algorithms compared to the source eNB. If the UE does not receive any selection of integrity and ciphering algorithms it continues to use the same algorithms, and the UP integrity protection mode, as before the handover (see TS 36.331 [21]). In the path-switch message, the target eNB shall send the UE EPS security capabilities, the UE capability for the maximum data rate for integrity protection of UP and the indication if the UP integrity shall also be turned on, received from the source eNB to the MME. The MME shall verify that the UE EPS security capabilities, the UE capability for the maximum data rate for integrity protection of UP and the UP integrity protection mode, received from the eNB are the same as the UE EPS security capabilities, the UE capability for the maximum data rate for integrity protection of UP and the UP integrity protection mode, that the MME has stored. If there is a mismatch, the MME may log the event and may take additional measures, such as raising an alarm.

Transferring the ciphering and integrity algorithms used in the source cell to the target eNB in the handover request message is for the target eNB to decipher and integrity verify the RRCReestablishmentComplete message on SRB1 in the potential RRCConnectionRe-establishment procedure. The information is also used by the target eNB to decide if it is necessary to include a new selection of security algorithms in the handover command (RRCConnectionReconfiguration in TS 36.331).

Xn-handover

5G

At handover from a source gNB over Xn to a target gNB, the source gNB shall include the UE 5GS security capabilities, and an indication if the UP integrity shall be turned on, and ciphering and integrity algorithms used in the source cell in the handover request message. The target gNB shall select the algorithm with highest priority from the UE 5GS security capabilities according to the prioritized locally configured list of algorithms (this applies for both integrity and ciphering algorithms). The chosen algorithms, and the indication if the UP integrity shall also be turned on, shall be indicated to the UE in the RRCConnectionReconfiguration message (the handover command) if the target gNB selects different algorithms compared to the source gNB. If the UE does not receive any selection of integrity and ciphering algorithms it continues to use the same algorithms, and the UP integrity protection mode, as before the handover (see TS 36.331) [21]). In the path-switch message, the target gNB shall send the UE 5GS security capabilities, and the indication if the UP integrity shall also be turned on, and optionally the UE capability for the maximum data rate for integrity protection of UP, received from the source gNB to the AMF. The AMF shall verify that the UE 5GS security capabilities, and the UP integrity protection mode, and optionally the UE capability for the maximum data rate for integrity protection of UP, received from the gNB are the same as the UE 5GS security capabilities, and the UP integrity protection mode, and optionally the UE capability for the maximum data rate for integrity protection of UP, that the AMF has stored. If there is a mismatch, the AMF may log the event and may take additional measures, such as raising an alarm.

Transferring the ciphering and integrity algorithms used in the source cell to the target gNB in the handover request message is for the target gNB to decipher and integrity verify the RRCConnectionReestablishmentComplete message on SRB1 in the potential RRCConnectionRe-establishment procedure. The information is also used by the target gNB to decide if it is necessary to include a new selection of security algorithms in the handover command (RRCConnectionReconfiguration message).

The target base station may respond to the source base station with an indication that it will enable UP integrity protection if that is the indication received from the source base station. If the target base station does not support integrity protection of UP data and the indication from the source base station indicates that UP integrity shall be used then the target base station may either reject the handover request from the master base station by responding with an error code or accept the request but fail to send an indication that it will enable UP integrity protection, for example in the case of a legacy base station. The policy configured for the target node may determine the appropriate action. The failure to receive an indication from the target base station that UP integrity protection will be enabled may be interpreted by the source base station as meaning that UP integrity protection will not be enabled. If the target base station accepts the request but fails to send an indication that it will enable UP integrity protection, for example in the case of a legacy base station, then a policy configured in the source base station may determine whether the source base station should proceed with the procedure or terminate the connection with the target base station.

The description above applies to other combinations of base stations as well if they are connected to the same Next Generation Core network node. For example, the source base station could be a LTE eNB and the target base station could be a gNB in the description above. In the table below all different combinations are described.

TABLE 1

Architecture options for Xn-handover in NextGen

| Options | Source node | Target node | Core network |
| --- | --- | --- | --- |
| gNB-A and gNB-B connected to same NGC (in option 2 and option 4) | gNB-A | gNB-B | NextGen core |
| gNB and LTE eNB connected to same NGC (option 2 combined with option 5) (option 2 combined with option 7/7A) | gNB | LTE eNB | NextGen core |
| LTE eNB-A and LTE eNB-B connected to same NGC | LTE eNB-A | LTE eNB-B | NextGen core |

TABLE 1-continued

Architecture options for Xn-handover in NextGen

| Options | Source node | Target node | Core network |
|---|---|---|---|
| (in options 5 and option 7/7A) LTE eNB and gNB connected to same NGC (option 5 combined with option 2) (option 7/7A combined with option 5) | LTE eNB | gNB | NextGen core |

S1-Handover
4G (EPC/LTE)

At handover from a source eNB to a target eNB over S1 (possibly including an MME change and hence a transfer of the UE security capabilities, and the UP integrity protection mode, and optionally the UE capability for the maximum data rate for integrity protection of UP from source MME to target MME), the target MME shall send the UE EPS security capabilities, and the UP integrity protection mode, and optionally the UE capability for the maximum data rate for integrity protection of UP to the target eNB in the S1 AP HANDOVER REQUEST message. The target eNB shall select the algorithm with highest priority from the UE EPS security capabilities according to the prioritized locally configured list of algorithms (this applies for both integrity and ciphering algorithms). The chosen algorithms, and an indication if the UP integrity shall be turned on, shall be indicated to the UE in the RRCConnectionReconfiguration message (i.e. handover command) if the target eNB selects different algorithms compared to the source eNB. If the UE does not receive any selection of integrity and ciphering algorithms it continues to use the same algorithms, and UP integrity protection mode, as before the handover (see TS 36.331 [21]).

NG2-Handover
5G

At handover from a source gNB to a target gNB over NG2 (possibly including an AMF change and hence a transfer of the UE security capabilities, and the UP integrity protection mode, and optionally the UE capability for the maximum data rate for integrity protection of UP, from source AMF to target AMF), the target AMF shall send the UE 5GS security capabilities, and the UP integrity protection mode, and optionally the UE capability for the maximum data rate for integrity protection of UP, to the target gNB in the NG2 AP HANDOVER REQUEST message. The target gNB shall select the algorithm with highest priority from the UE 5GS security capabilities according to the prioritized locally configured list of algorithms (this applies for both integrity and ciphering algorithms). The chosen algorithms, and an indication if the UP integrity shall be turned on, shall be indicated to the UE in the RRCConnectionReconfiguration message (i.e. handover command) if the target gNB selects different algorithms compared to the source gNB. If the UE does not receive any selection of integrity and ciphering algorithms it continues to use the same algorithms, and UP integrity protection mode, as before the handover (see TS 36.331 [21]).

The description above applies to other combinations of base stations as well if they are connected to different Next Generation Core network node. For example, the source base station could be a LTE eNB and the target base station could be a gNB in the description above. In the table below all different combinations are described.

TABLE 2

Architecture options for NG2-like handover

| Source eNB node | Target eNB node | Source core network | Target core network |
|---|---|---|---|
| gNB-A | gNB-B | NextGen core A | NextGen core B |
| gNB-A | eLTE eNB-B | NextGen core A | NextGen core B |
| eLTE eNB-A | eLTE eNB-B | NextGen core A | NextGen core B |
| eLTE eNB-A | gNB-B | NextGen core A | NextGen core B |

Intra-eNB Handover
4G

It is not required to change the AS security algorithm or the UP integrity protection mode, in RRCConnectionReconfiguration message, during intra-eNB handover. If the UE does not receive any selection of new AS security algorithms in RRCConnectionReconfiguration message during an intra-eNB handover, the UE continues to use the same algorithms and the UP integrity protection mode, as before the handover (see TS 36.331 [21]).

Intra-gNB Handover and Intra-eNB Handover
5G

It is not required to change the AS security algorithm or the UP integrity protection mode, in RRCConnectionReconfiguration message, during intra-gNB handover. If the UE does not receive any selection of new AS security algorithms in RRCConnectionReconfiguration message during an intra-gNB handover, the UE continues to use the same algorithms and the UP integrity protection mode, as before the handover.

It is not required to change the AS security algorithm or the UP integrity protection mode, during intra-eNB handover. If the UE does not receive any selection of new AS security algorithms in RRCConnectionReconfiguration message during an intra-eNB handover, the UE continues to use the same algorithms and the UP integrity protection mode, as before the handover.

Dual Connectivity

It will be appreciated that the new enhancements described in the steps below, and indicated by the use of italic text, apply both to 4G and 5G.

Addition and modification of Data Radio Bearer (DRB) in Secondary eNB (SeNB)

When executing the SeNB Addition procedure (i.e. the initial offload of one or more radio bearers to the SeNB), or the SeNB Modification procedure requiring an update of S-$K_{eNB}$, the Master eNB (MeNB) shall derive an S-$K_{eNB}$ as defined in TS 33.401, clause E.2.4, which results in a fresh S-$K_{eNB}$. The MeNB shall forward the generated S-$K_{eNB}$ to the SeNB during the SeNB Addition procedure or SeNB Modification procedure requiring key update together with an indication if the UP integrity shall be turned on and optionally UE capability for the maximum data rate for integrity protection of UP.

TS 36.300 defines the SeNB Addition and SeNB Modification procedures.

If the MeNB has indicated that the UP integrity shall NOT be turned on:

The SeNB shall derive a key $K_{UPenc}$ from the received S-$K_{eNB}$ as defined in clause E.2.4 of the present specification and use it for all radio bearers that were being added.

At any point of time, the same $K_{UPenc}$ is used for encrypting all radio bearers between the SeNB and the UE. Once the $K_{UPenc}$ has been derived from the S-$K_{eNB}$, the SeNB and UE may delete the S-$K_{eNB}$.

If the MeNB has indicated that the UP integrity shall be turned on:

The SeNB shall derive a key $K_{UPint}$ from the received S-$K_{eNB}$ and use it for all radio bearers that were being added.

At any point of time, the same $K_{UPint}$ is used for integrity protecting all radio bearers between the SeNB and the UE.

Once the $K_{UPenc}$ and $K_{UPint}$ have been derived from the S-$K_{eNB}$, the SeNB and UE may delete the S-$K_{eNB}$.

The MeNB shall provide the value of the SCG Counter used in the derivation of the S-$K_{eNB}$ to the UE in the SeNB Addition procedure adding the radio bearer(s) in the UE. The UE shall derive the S-$K_{eNB}$ and $K_{UPenc}$ as described in TS 33.401, clause E.2.4. If the MeNB has indicated to the UE that the UP integrity shall be turned on, then UE shall derive $K_{UPint}$ as well.

When executing the procedure for adding subsequent radio bearer(s) to the same SeNB, the MeNB shall, for each new radio bearer, assign a radio bearer identity that has not previously been used since the last S-$K_{eNB}$ change.

If the MeNB cannot allocate an unused radio bearer identity for a new radio bearer in the SeNB, due to radio bearer identity space exhaustion, the MeNB shall increment the SCG Counter and compute a fresh S-$K_{eNB}$, and then shall perform a SeNB Modification procedure to update the S-$K_{eNB}$. The MeNB may choose to update the S-$K_{eNB}$ instead of assigning a new radio bearer identity even when the latter would have been possible.

If the SeNB receives a new S-$K_{eNB}$ from the MeNB during the SeNB Modification procedure, the SeNB shall use the $K_{UPenc}$ derived from the new S-$K_{eNB}$ as encryption key for all the radio bearer(s).

If the UE receives a new SCG Counter in SeNB Addition/Modification procedure, then the UE shall use the $K_{UPenc}$ derived from the new S-$K_{eNB}$, as the encryption key for all the radio bearer(s) established with the SeNB.

When the last radio bearer on the SeNB is released, the SeNB Release procedure is performed; the SeNB and the UE shall delete the $K_{UPenc}$. The SeNB and UE shall also delete the S-$K_{eNB}$, if it was not deleted earlier.

Activation of Encryption/Decryption

The DRB offload procedure with activation of encryption/decryption follows the steps outlined below and illustrated in FIG. 24.

1. The UE and the MeNB establish the RRC connection.

2. The MeNB decides to offload the DRB to the SeNB. The MeNB sends the request message for SCG Addition to the SeNB over the X2-C (Xn-C in 5G) to negotiate the available resources, configuration, an indication if the UP integrity shall be turned on and algorithms at the SeNB. The MeNB computes and delivers the S-$K_{eNB}$ to the SeNB as necessary. UE EPS security capability or UE 5GS security capability and the encryption algorithm used on the signalling radio bearers and the integrity algorithm used on the data radio bearers if UP integrity shall be turned on, should also be sent to SeNB.

Figure 24:
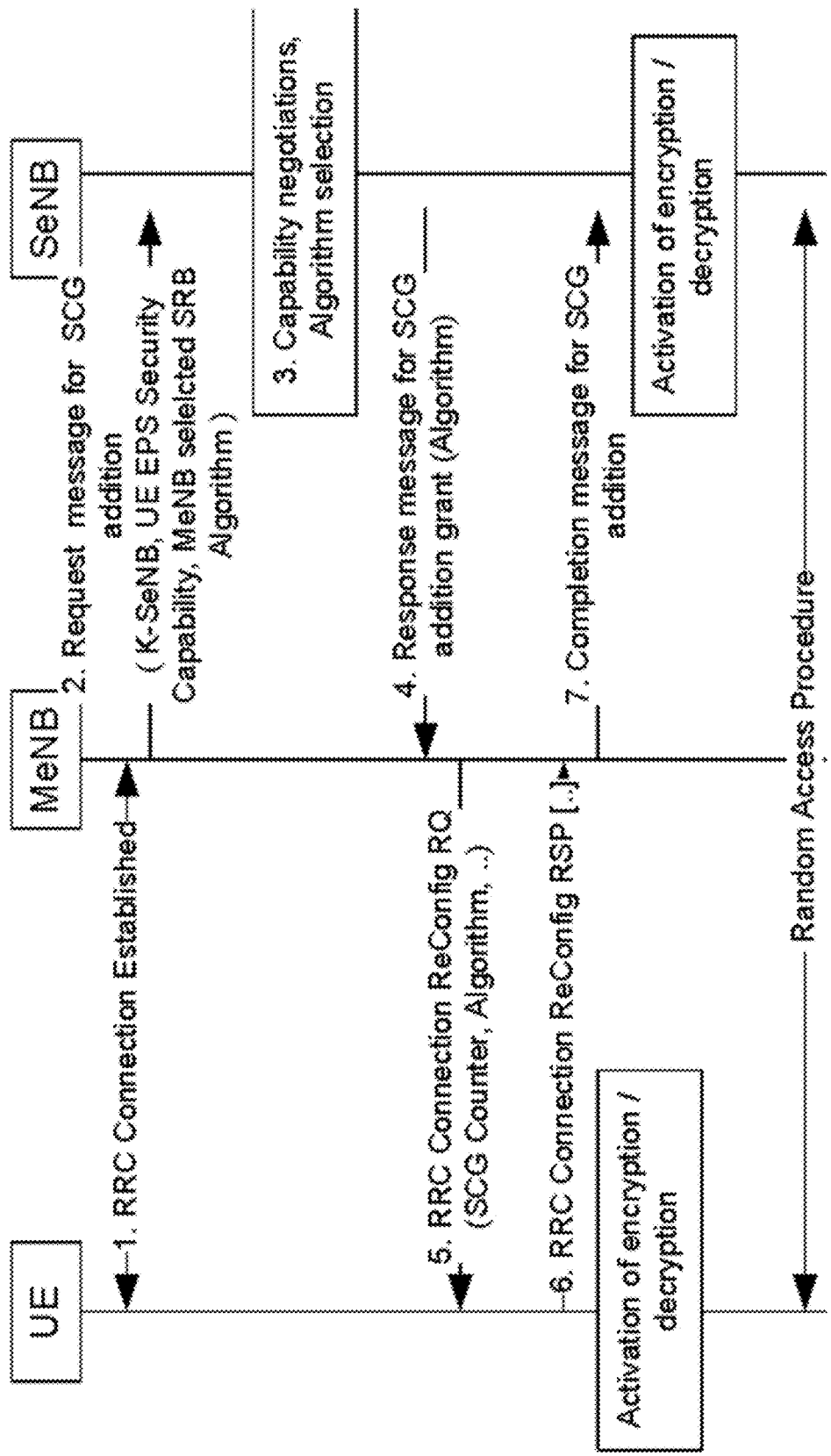
FIG. 24 is a signalling diagram illustrating secondary eNB encryption/decryption activation.

It will be understood that the UP integrity protection indication in step 2 is not shown in FIG. 24. UE 5GS security capability in step 2 is also not shown in FIG. 24.

3. The SeNB allocates the necessary resources and chooses the ciphering algorithm which has the highest priority from its configured list and is also present in the UE EPS security capability. The SeNB also chooses the integrity algorithm which has the highest priority from its configured list if UP integrity shall be turned on.

4. The SeNB sends the message for SCG Addition grant to the MeNB indicating availability of requested resources and the identifiers for the selected algorithm(s) (should it/they differ from the one selected by the MeNB in 2) to serve the requested DRB for the UE.

The SeNB may respond to the MeNB with an indication that it will enable UP integrity protection if that is the indication received from the MeNB. If the SeNB does not support integrity protection of UP data and the indication from the MeNB indicates that UP integrity shall be used then the SeNB may either reject the request from the MeNB to setup a bearer by responding with an error code or accept the request but fail to send an indication that it will enable UP integrity protection, for example in the case of a legacy base station. The policy configured for the SeNB may determine the appropriate action. The failure to receive an indication from the SeNB that UP integrity protection will be enabled may be interpreted by the MeNB as meaning that UP integrity protection will not be enabled. If the SeNB accepts the request but fails to send an indication that it will enable UP integrity protection, for example in the case of a legacy base station, then a policy configured in the MeNB may determine whether the MeNB should proceed with the procedure or terminate the connection with the SeNB.

It will be appreciated that it is not shown in step 4 of FIG. 24 that both the selected encryption algorithm and integrity algorithm are sent in step 4 if the SeNB enables UP integrity protection. If the SeNB does not support integrity protection of UP data and the indication from the MeNB indicates that UP integrity shall be used then the SeNB may reject the request and respond with an error code to the MeNB. This step is not shown in FIG. 24.

5. The MeNB sends the RRC Connection Reconfiguration Request to the UE instructing it to configure a new DRB for the SeNB. The MeNB may include an indication if the UP integrity shall be turned on. The MeNB shall include the SCG Counter parameter to indicate that the UE shall compute the S-$K_{eNB}$ for the SeNB and the $K_{UPenc}$ and optionally the $K_{UPint}$ associated with the assigned bearer. The MeNB forwards the UE configuration parameters (which could contain the algorithm identifiers received from the SeNB in step 4) to the UE. (See TS 33.401, section E.2.4.3 for further details).

As the message is sent over the RRC connection between the MeNB and the UE, it is integrity protected using the $K_{RRCint}$ of the MeNB. Hence the SCC cannot be tampered with, and the UE can assume that it is fresh.

6. The UE accepts the RRC Connection Reconfiguration Command and shall compute the S-$K_{eNB}$ for the SeNB. The UE shall also compute the $K_{UPenc}$ and optionally the $K_{UPint}$ (if the MeNB has included an indication that UP integrity shall be turned on) for the associated assigned DRB on the SeNB. The UE sends the RRC Reconfiguration Complete to the MeNB. The UE activates encryption/decryption once S-$K_{eNB}$ and $K_{UPenc}$ are derived. The UE activates integrity protection/integrity check once $K_{UPint}$ is derived.

7. MeNB sends the completion message for SCG Addition to the SeNB over the X2-C in 4G (Xn-C in 5G) to inform SeNB configuration result. On receipt of this message, SeNB may activate encryption/decryption and integrity protection/integrity check of UP data (only if UP integrity shall be used), with UE. If SeNB does not activate encryption/decryption and integrity protection/integrity check, with the UE at this stage, SeNB shall activate encryption/decryption and integrity protection/integrity check, upon receiving the Random Access request from the UE.

Negotiation of Security Algorithms

When establishing one or more DRBs for a UE at the SeNB, as shown on FIG. 24, the MeNB shall forward the UE EPS security capabilities/UE 5GS security capabilities associated with the UE, the identifier for the AS encryption algorithm and the identifier for the AS integrity algorithm, the MeNB selected for the UE for the SRBs to the SeNB in the X2 (4G) (Xn (5G)) request message for SCG SeNB Addition/Modification.

Upon receipt of this message, the SeNB shall identify the AS encryption algorithm with highest priority in the locally configured priority list of AS encryption algorithms that is also present in the received UE EPS security capabilities. If the so identified AS encryption algorithm is different from the one indicated in the received X2 request message for SCG Addition/Modification, the SeNB shall include an indicator for the locally identified AS encryption algorithm in the X2 response message for SCG Addition/Modification.

Upon receipt of this message, if the MeNB has indicated that the UP integrity shall be used, the SeNB shall identify the AS integrity algorithm with highest priority in the locally configured priority list of AS integrity algorithms that is also present in the received UE EPS security capabilities. If the so identified AS integrity algorithm is different from the one indicated in the received X2 (or Xn) request message for SCG Addition/Modification, the SeNB shall include an indicator for the locally identified AS integrity algorithm in the X2 (or Xn) response message for SCG Addition/Modification and also an indication that UP integrity shall be used (i.e. IPUP mode is enabled).

The MeNB shall forward the indication to the UE during the RRCConnectionReconfiguration procedure that establishes the SCG DRBs in the UE. If the UE does not receive any AS encryption algorithm indication in this RRCConnectionReconfiguration procedure, the UE shall use the same AS encryption algorithm for the SCG DRBs as it uses for the SRBs. Otherwise, the UE shall use the indicated encryption algorithm for the SCG DRBs.

The UE uses one encryption algorithm for encryption of SRB and any potential DRB(s) established with MeNB, and a same or different encryption algorithm for encryption of DRB(s) established with SeNB.

If the MeNB has indicated that the UP integrity shall be used and if the UE receives an indication that UP integrity shall be used (IPUP mode will be enabled) and if the UE does not receive any AS integrity algorithm indication in this RRCConnectionReconfiguration procedure, the UE shall use the same AS integrity algorithm for the SCG DRBs as it uses for the SRBs. Otherwise, the UE shall use the indicated integrity algorithm for the SCG DRBs.

The UE uses one integrity algorithm for integrity protection of SRB and any potential DRB(s) established with MeNB, and a same or different integrity algorithm for integrity protection of DRB(s) established with SeNB.

S-$K_{eNB}$ Update

S-$K_{eNB}$ Update Triggers

The system supports update of the S-$K_{eNB}$. The MeNB may update the S-$K_{eNB}$ for any reason by using the S-$K_{eNB}$ update procedure defined in clause E.2. 5.2 of TS 33.401. The SeNB shall request the MeNB to update the S-$K_{eNB}$ over the X2-C, when uplink or downlink PDCP COUNTs are about to wrap around for any of the DRBs.

If the MeNB re-keys its currently active KeNB in an AS security context the MeNB shall update any S-$K_{eNB}$ associated with that AS security context. This retains the two-hop security property for X2-handovers.

S-$K_{eNB}$ Update Procedure

If the MeNB receives a request for S-$K_{eNB}$ update from the SeNB or decides on its own to perform S-$K_{eNB}$ update (see TS 33.401, clause E.2.5.1), the MeNB shall compute a fresh 5-KeNB and increment the SCG Counter, as defined in TS 33.401, clause E.2.4. Then the MeNB shall perform a SeNB Modification procedure to deliver the fresh S-$K_{eNB}$ to the SeNB. The MeNB shall provide the value of the SCG Counter used in the derivation of the S-$K_{eNB}$ to the UE in an integrity protected RRC procedure. The UE shall derive the S-$K_{eNB}$ and $K_{UPenc}$ as described in TS 33.401, clause E.2.4. If the MeNB has indicated that the UP integrity shall be used, then the UE shall derive a $K_{UPint}$ as well.

Whenever the UE or SeNB start using a fresh S-$K_{eNB}$, they shall re-calculate the $K_{UPenc}$ from the fresh S-$K_{eNB}$. If UP integrity shall be used, then they shall re-calculate the $K_{UPint}$ from the fresh S-$K_{eNB}$ as well.

RAN Decision to use UP Integrity or Not

It will be appreciated that the new enhancements outlined below identified by italic text are applicable to both 5G and 4G (EPC/LTE).

The following options, in addition to those outlined above, exist for enabling and disabling UP integrity in RAN:

The RAN may decide to use UP integrity or not to use UP integrity, without being told by the core NW whether to use UP integrity or not.

The UE may inform AMF/MME in UE 5G security capabilities/UE EPS security capability that it supports e.g. integrity algorithms EIA0, EIA1 and EIA2 for UP during the normal UE security capability exchange in the NAS signaling as Registration procedure/Attach procedure/Routing Area Update procedure. (This process would apply to step 1 in FIG. 21.)

The AMF/MME may send the UE security capabilities to the eNB in the SLAP-UE-INITIAL-CONTEXT-SETUP message. (This procedure would apply to step 4 in FIG. 22.)

The eNB may have a local policy as to whether to activate UP integrity or not for UEs that support it. The policy configured in RAN may be per type of slice or per slice identifier but does not need to be such. The MME/AMF may inform the eNB about which slice type or slice identifier the UE is connecting to and then the eNB may take that information into account as well.

The AMF/MME may give the UE capability for the maximum data rate for integrity protection of UP to the eNB in the S1AP-UE-INITIAL-CONTEXT-SETUP message. (This would apply to step 4 in FIG. 23.)

Visibility and Configurability in the UE

UE preference to use UP Integrity or Not

A UE may be able to detect networks with sub par security and apply a user-configured policy how to react, for example only connecting to networks providing integrity protection for UP. This is beneficial for security for IoT devices where the subscriber trusts the operator, but requires stronger security than today's networks providers.

The user of the UE may dynamically configure and change the UE's preference of whether to use UP integrity or not in UE GUI (User Interface). It may be possible to configure the UE's preference of whether to use UP integrity or not per slice type, per specific slices, per cells, per area, etc.

For IoT devices without a GUI (User Interface) the UE's preference may be pre-configured on the USIM or in the ME.

When the registration procedure is finalized, the UE may indicate to the user whether UP integrity has been enabled or disabled by the network. This indication may be per type of slice, per specific slices, per cells, per area, etc.

It may be possible for the user to configure a policy in phone GUI whether to accept non-integrity protected UP traffic (e.g., at handovers) automatically without asking the user.

It may be possible for the user to be notified after HO to a new eNB that the new eNB does not support integrity protection and the user may be asked whether to continue the connection with the network or not.

It may be possible for the user to configure other PLMNs, or cells to choose in case the preferred PLMN, or cell is not using UP integrity protection.

Another option may be to have a new list on the USIM or in ME which could contain PLMN's or cells that support UP integrity protection. This list may be provided and configured by the operator of the Home PLMN to the UE over-the-air. The Home PLMN knows which operators the Home PLMN has roaming agreements with and which operators support UP integrity protection.

It may be possible to configure the UE to try to re-connect to a different eNB or cell of the same PLMN in case an eNB or cell does not activate integrity protection, in hope that the other eNB or cell is updated with UP integrity algorithms and support of UP integrity protection.

Yet another option is that UE or the application in the UE conveys the status of the UP integrity protection to the function or application in the operator's core network or third party network.

As discussed above, the aspects and examples of the present disclosure outlined above are applicable to 5G (Next Generation system), EPC/LTE, and other networks. The aspects and examples of the present disclosure outlined above are applicable to all types of UEs including smart phones, IoT devices, wearables etc. A summary of different aspects of the functionality which may be provided by the methods and procedures discussed above is set out below:

How the policy of applying integrity protection is handled in the network, e.g. how home network influences policy, how AMF/MME or gNB/eNB decides whether to apply integrity or not:

The UE indicates support or otherwise of UP integrity to the core network AMF/MME. The UE may also indicate its preference to use UP integrity or not, to the core network AMF/MME. The home network (SDM/HSS) may indicate to the serving network that UP integrity "shall" or "must not" be turned on. The visited network makes a policy decision as to whether or not UP integrity will be applied for the UE based on the indication received from the home network and the policy configured for the visited network (AMF/MME). The core network indicates to the UE in NAS layer, based on the policy decision, whether UP integrity shall be used or not. The core network (AMF/MME) informs the base station or RAN whether to use integrity protection of UP data or not.

Any of the policies and preferences mentioned above may be per UE (i.e. for all user plane data) or per slice type (for the UE) or per slice identity (for the UE). For example, the UE may indicate the preference to use UP integrity for all data, or per slice type or slice identity. The home network may indicate the preference for using UP integrity for all data, or per slice type or slice identity, and AMF/MME may make the policy decision per UE (for all UP data) or per slice type or slice identity.

How the UE reacts if it does not get the level of protection it wants (including the preference stored in HSS or negotiated):

A subscriber's initial or default preference for using integrity protection on UP may be stored in the SDM/HSS and in the UE. The AMF/MME in the serving network may obtain the said preference from SDM/HSS. The AMF/MME may inform the gNB/eNB about the UE's said preference. The gNB/eNB may then decide whether to use UP integrity protection based on the UE's said preference and possibly other information.

If the UE wants to change the above mentioned initial or default preference, the UE may send its current preference to the network (e.g. gNB/eNB or AMF/MME). The network may decide whether or not to replace the initial or default preference with the UE's current preference.

In either of the above mentioned cases, i.e. initial or default preference, or current preference, if the UE does not obtain desired UP integrity protection it may take a responsive action. The responsive action may be to continue without UP integrity protection, or to connect to another gNB/eNB/cell, or to refrain from using a certain application, or to notify some function/application in the operator's/third-party's network How the policy of applying integrity protection UP is handled in the base stations at X2-handover and Xn-handover:

In X2-handover or Xn-handover between two base stations, the source base station may need inform the target base station whether to enable integrity protection of UP data or not. This indication or reference may be sent on the Xn interface or the X2 interface from the source node to the target node.

The target base station may respond to the source base station with an indication that it will enable UP integrity protection if that is the indication received from the source base station. If the target base station does not support integrity protection of UP data and the indication from the source base station indicates that UP integrity shall be used then the target base station may either reject the handover by responding with an error code or accept the handover but fail to send an indication that it will enable UP integrity protection, for example in the case of a legacy base station. The policy configured for the target node may determine the appropriate action. If the target base station accepts the request but fails to send an indication that it will enable UP integrity protection, for example in the case of a legacy base station, then a policy configured in the source base station may determine whether the source base station should proceed with the procedure or terminate the connection with the target base station.

How the policy of applying integrity protection UP is handled in the base stations at dual connectivity:

In dual connectivity between two base stations, the master base station may inform the secondary base station whether to enable integrity protection of UP data or not. This indication or preference may be sent on the Xn interface or the X2 interface from the master base station to the secondary base station. The secondary base station may respond to the master base station with an indication that it will enable UP integrity protection if that is the indication received from the master base station. If the secondary base station does not support integrity protection of UP data and the indication from the master base station indicates that UP integrity shall be used then the secondary base station may either reject the request from the master base station to setup a bearer by responding with an error code or accept the request but fail to send an indication that it will enable UP integrity protection, for example in the case of a legacy base station. The policy configured for the secondary base station may determine the appropriate action. If the secondary base station accepts the request but fails to send an indication that it will enable UP integrity protection, then a policy configured in the master base station may determine whether the master base station should proceed with the procedure or terminate the connection with the secondary base station.

How the UE preference to use or not use UP integrity protection is determined in the UE and how the user is made aware of whether UP integrity protection has been enabled or disabled in the network:

The user of a UE may dynamically configure and change the UE's preference of whether to use UP integrity or not in UE GUI (User Interface). It may be possible to configure the UE's preference of whether to use UP integrity or not per slice type, per specific slices, per cells, per area, etc. When the registration procedure is finalized, then the UE may indicate to the user whether UP integrity has been enabled or disabled by the network. This indication could per type of slice, per specific slices, per cells, per area, etc.

For IoT devices without a GUI (User Interface) the UE's preference may be pre-configured on the USIM or in the ME.

In case integrity protection is disabled in the device (e.g. IoT device) a notification may be sent to another device by the UE or by the network. For example via SMS, Instant Messaging, email.

Device configuration may not necessarily be performed by the device itself. Device configuration may be performed remotely e.g. OMA DM by using for example SMS or email, initiated by an operator or a service provider.

How the UE finds a PLMN which supports UP integrity protection:

The UE may be able to detect networks with insufficient security and apply a user-configured policy how to react, e.g., only connecting to networks providing integrity protection for UP. This is beneficial for security for IoT devices where the subscriber trusts the operator, but requires stronger security than today's networks providers. It may be possible for the user or UE to configure other PLMNs to choose in case the preferred PLMN is not using UP integrity protection.

Another option may be to have a new list on the USIM or in ME which could contain PLMN's that support UP integrity protection. This list may be provided and configured by the operator of the Home PLMN to the UE over-the-air. The Home PLMN knows which operators the Home PLMN has roaming agreements with and which operators support UP integrity protection.

In further options, base stations may broadcast within their respective cells as part of system information whether the base station support UP integrity protection or not.

How the UE acts if it is subject to a handover to a gNB or an eNB which does not support UP integrity:

It may be possible for a user to configure a policy in UE GUI whether to accept non-integrity protected UP traffic (e.g., at handovers) automatically without asking the user. It may also be possible for the user to be notified after handover to a new gNB or eNB that the new gNB or eNB does not support integrity protection and the user may be asked whether to continue the connection with the network or not. It may be possible to configure the UE to try to re-connect to a different gNB or eNB of the same PLMN in case a gNB or eNB does not activate integrity protection, in hope that the other gNB or eNB is updated with UP integrity algorithms and support of UP integrity protection.

In case integrity protection is disabled in the device (e.g. IoT device) a notification may be sent to another device by the UE or by the network. For example via SMS, Instant Messaging, email etc.

How the gNB/eNB decides whether to apply and use UP integrity or not:

The core network (AMF/MME) may inform the base station or RAN whether to use integrity protection of UP data or not. This indication or reference could be sent on the NG2 interface in 5G and S1 interface in 4G between the core network and the base station (RAN). The UE 5GS security capabilities may be sent together with the indication or reference on the NG2 interface. It may also be the case that the gNB or eNB has a local policy whether to activate UP integrity or not for UE's that support it (based on UE 5GS security capabilities).

Aspects and examples of the present disclosure may thus enable a UE, home network, and visited network to indicate and negotiate the use of UP integrity in a secure way.

A base station may be informed by the core network whether it should enable integrity protection of UP data or not. Another option may be that the RAN could decide to use UP integrity or not to use UP integrity, without being told by the core NW whether to use UP integrity or not.

In Xn handover or X2-handover between two base stations, the target base station may be informed by the source base station whether to enable integrity protection of UP data or not. The target base station may enable UP integrity for the UE that is handed over.

In dual connectivity between two base stations, the master base station may inform the secondary base station whether to enable integrity protection of UP data or not. This indication or reference may be sent on the Xn interface or the X2 interface from the master base station to the secondary base station. The secondary base station may enable UP integrity for the bearer offloaded from the master base station.

It is an advantage that the user of a UE may dynamically configure and change the UE's preference as to whether to use UP integrity or not in the UE GUI (User Interface). It may be possible to configure the UE's preference of whether or not to use UP integrity for all data, or per slice type or per slice identifier.

When the registration procedure is finalized, then the UE may indicate to the user whether UP integrity has been enabled or disabled by the network. This indication may be for all data, or per type of slice, or per slice identifier.

The UE may be able to detect networks with sub-par security and apply a user-configured policy how to react, for example only connecting to networks providing integrity protection for UP. This is beneficial for security for IoT devices where the subscriber trusts the operator, but requires stronger security than today's networks providers.

It may be possible for the user to configure a policy in phone GUI whether to accept non-integrity protected UP traffic (e.g., at handovers) automatically without asking the user.

It may be possible for the user to configure other PLMNs to choose in case the preferred PLMN is not using UP integrity protection.

It may be possible for the Home operator to configure other PLMNs to choose in case the preferred PLMN is not using UP integrity protection. A list may be provided and configured by the operator of the Home PLMN to the UE over-the-air.

It may also be possible for the user to be notified after handover to a new gNB or eNB that the new gNB or eNB does not support integrity protection and the user may be asked whether to continue the connection with the network or not.

It may be possible to configure the UE to try to re-connect to a different gNB or eNB of the same PLMN in case a gNB or eNB does not activate integrity protection in hope that the other gNB or eNB is updated with UP integrity algorithms and support of UP integrity protection.

The gNB or eNB may have a local policy whether to activate UP integrity or not for UE's that support it (based on UE 5GS security capabilities).

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The following are certain enumerated embodiments further illustrating various aspects the disclosed subject matter.

1. A method for operating a User Equipment, UE, which UE is configured to connect to a communication network, the method comprising: indicating to the communication network an Integrity Protection for User Plane, IPUP, mode supported by the UE when requesting registration with the communication network; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

2. A method according to item 1, further comprising: indicating to the communication network a UE preference as to the IPUP mode to be used by the communication network for the UE.

3. A method according to item 2, wherein the indicated UE preference applies to at least one of: all data exchanged with the communication network; or data exchanged with a specific slice or plurality of slices of the communication network.

4. A method according to any one of the preceding items, further comprising: receiving from the communication network an indication of an IPUP mode that shall be used by the communication network for the UE.

5. A method according to item 4, wherein the indication applies to at least one of: all data exchanged with the communication network; or data exchanged with a specific slice or plurality of slices of the communication network.

6. A method according to item 4 or 5, further comprising: informing a user of the UE of the IPUP mode to be used by the communication network for the UE.

7. A method according to any one of items 4 to 6, further comprising: if the IPUP mode indicated by the communication network does not match a UE preference as to which IPUP mode should be used by the communication network for the UE, performing at least one of: refusing connection to the network; disconnecting from the network; informing a user of the UE that the IPUP mode indicated by the communication network does not match a UE preference as to which IPUP mode should be used by the communication network for the UE.

8. A method according to item 7, further comprising: if the UE performs at least one of refusing connection to the network or disconnecting from the network, performing at least one of: requesting registration with the communication network via a different radio access node of the communication network; or requesting registration with a different communication network.

9. A method according to item 8, further comprising: consulting a list including at least one of a radio access node or a communication network that supports Integrity Protection for User Plane data; and selecting from the list at least one of a radio access node of the communication network or a different communication network for requesting registration.

10. A method according to item 9, wherein the list is configured in a memory of the UE.

11. A method according to item 9, wherein the list is received over a radio link.

12. A method according to any one of the preceding items, further comprising: receiving a message from a target radio access node of the communication network during a procedure for handover of the UE from a source radio access node to the target radio access node, the message including an indication that the target radio access node will use a different IPUP mode for the UE to that used by the source radio access node.

13. A method according to item 12, further comprising: if the indication from the target radio access node is that the IPUP mode to be used by the communication network via the target radio access node does not match a UE preference as to which IPUP mode should be used by the communication network for the UE, performing at least one of: disconnecting from the network; accepting the handover and informing a user of the UE of the IPUP mode to be used by the communication network via the target radio access node; or seeking handover to a different radio access node of the communication network.

14. A method according to any one of the preceding items, further comprising, receiving from a radio access node of the communication network, during a procedure for secondary radio access node addition, secondary radio access node modification requiring key update, or Data Radio Bearer offload, an indication of the IPUP mode to be used by the communication network for the UE; and, if the indicated IPUP mode involves use of Integrity Protection for User Plane Data, deriving and using a key for Integrity Protection of User Plane data.

15. A method according to item 14, wherein the indication of the IPUP mode to be used by the communication network for the UE is received with an RRC Reconfiguration Request.

16. A method for operating a radio access node of a communication network, the method comprising: receiving, from a User Equipment, UE, requesting registration with the communication network, an indication of an Integrity Protection for User Plane, IPUP, mode supported by the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data; and wherein the indication is received from the UE via the communication network.

17. A method according to item 16, further comprising: receiving from the UE a UE preference as to the IPUP mode to be used by the communication network for the UE.

18. A method according to item 17, wherein the indicated UE preference applies to at least one of: all data exchanged with the communication network; or data exchanged with a specific slice or plurality of slices of the communication network.

19. A method according to any one of items 16 to 18, further comprising: receiving from a core node of the communication network an indication of an IPUP mode to be used by the communication network for the UE.

20. A method according to item 19, further comprising: if the radio access node supports the indicated IPUP mode, sending to the core node an indication that the radio access node will enable the IPUP mode to be used by the communication network for the UE.

21. A method according to item 19 or 20, further comprising: if the indicated IPUP mode received from the core node of the communication network is not supported by the radio access node, performing at least one of: rejecting the request for registration received from the UE; or omitting to send to the core node an indication that the radio access node will enable the IPUP mode to be used by the communication network for the UE.

22. A method according to any one of items 16 to 21, further comprising: sending to the UE an indication of an IPUP mode to be used by the communication network for the UE.

23. A method according to item 22, wherein, if the IPUP mode to be used by the communication network for the UE involves use of Integrity Protection for User Plane Data, the indication of an IPUP mode to be used by the communication network for the UE comprises an identifier of an algorithm for Integrity Protection of UP data.

24. A method according to item 22 or 23, when dependent on item 19, wherein the IPUP mode indicated by the radio access node to the UE is the IPUP mode received from the core node of the communication network.

25. A method according to item 22 or 23, wherein the IPUP mode indicated to the UE is selected by the radio access node in accordance with a policy hosted at the radio access node.

26. A method for operating a radio access node of a communication network, the radio access node comprising a source radio access node, the method comprising: during a procedure for handover of a User Equipment, UE, from the source radio access node to a target radio access node, sending an indication of an Integrity Protection for User Plane, IPUP, mode to be used by the communication network for the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

27. A method according to item 26, further comprising: checking for receipt from the target radio access node of an indication that the target radio access node will enable the IPUP mode to be used by the communication network for the UE.

28. A method according to item 27, further comprising: if an indication that the target radio access node will enable the IPUP mode to be used by the communication network for the UE is not received, assuming that the target radio access node will not enable the IPUP mode to be used by the communication network for the UE.

29. A method for operating a radio access node of a communication network, the radio access node comprising a target radio access node, the method comprising: during a procedure for handover of a User Equipment, UE, from a source radio access node to the target radio access node, receiving an indication of an Integrity Protection for User Plane, IPUP, mode to be used by the communication network for the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

30. A method according to item 29, wherein the indication of an IPUP mode to be used by the communication network for the UE is received from at least one of: the source radio access node; or a core node of the communication network.

31. A method according to item 29 or 30, further comprising: deciding whether or not to use the indicated IPUP mode; and if it is decided not to use the indicated IPUP mode, sending to the UE an indication that the target radio access node will use a different IPUP mode for the UE to that used by the source radio access node.

32. A method according to any one of items 29 to 31, wherein the indication of an IPUP mode to be used by the communication network for the UE is received from the source radio access node, the method further comprising: sending to a core node of the communication network an indication of the IPUP mode received from the source radio access node.

33. A method according to any one of items 29 to 32, further comprising: if the target radio access node supports the indicated IPUP mode, sending to at least one of the source radio access node or a core node of the communication network an indication that the target radio access node will enable the IPUP mode to be used by the communication network for the UE.

34. A method according to any one of items 29 to 33, further comprising: if the target radio access node does not support the received indicated IPUP mode, performing at one of: rejecting handover of the UE; or accepting handover of the UE and omitting to send an indication that the target radio access node will enable the IPUP mode to be used by the communication network for the UE.

35. A method for operating a radio access node of a communication network, the radio access node comprising a master radio access node, the method comprising: sending to a secondary radio access node an indication of an Integrity Protection for User Plane, IPUP, mode to be used by the communication network for a UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data, and wherein the indication is sent to the secondary radio access node during a procedure for at least one of: secondary radio access node addition; secondary radio access node modification requiring key update; Data Radio Bearer, DRB offload.

36. A method according to item 35, wherein, if the IPUP mode indicated to the secondary radio access node involves use of Integrity Protection for User Plane Data, the indication of an IPUP mode to be used by the communication network for the UE comprises a list of supported algorithms for Integrity Protection of UP data.

37. A method according to item 35 or 36, further comprising: checking for receipt from the secondary radio access node of an indication that the secondary radio access node will enable the IPUP mode to be used by the communication network for the UE.

38. A method according to item 37, further comprising: if an indication that the secondary radio access node will enable the IPUP mode to be used by the communication network for the UE is not received, assuming that the secondary radio access node will not enable the IPUP mode to be used by the communication network for the UE.

39. A method according to any one of items 35 to 38, further comprising, if the indication of an IPUP mode to be used by the communication network for the UE is sent to the secondary radio access node during a DRB offload procedure: sending to the UE an RRC Reconfiguration Request including an indication of the IPUP mode to be used by the communication network for the UE.

40. A method according to item 39, wherein the RRC Reconfiguration Request includes a selected integrity algorithm identifier to be used for UP integrity protection.

41. A method for operating a radio access node of a communication network, the radio access node comprising a secondary radio access node, the method comprising: receiving from a master radio access node an indication of an Integrity Protection for User Plane, IPUP, mode to be used by the communication network for a UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data, and wherein the indication is received from the master radio access node during a procedure for at least one of: secondary radio access node addition; secondary radio access node modification requiring key update; Data Radio Bearer, DRB offload.

42. A method according to item 41, wherein, if the IPUP mode indicated by the master radio access node involves use of Integrity Protection for User Plane Data, the indication of an IPUP mode to be used by the communication network for the UE comprises an identifier for an integrity algorithm to be used for UP integrity protection.

43. A method according to item 41 or 42, further comprising: if the secondary radio access node supports the indicated IPUP mode, sending to the master radio access node an indication that the secondary radio access node will enable the IPUP mode to be used by the communication network for the UE.

44. A method according to any one of items 41 to 43, further comprising: if the secondary radio access node does not support the received indicated IPUP mode, performing at least one of: rejecting the requested procedure from the master radio access node; or accepting the requested procedure from the master radio access node and omitting to send to the master radio access node an indication that the secondary radio access node will enable the IPUP mode to be used by the communication network for the UE.

45. A method according to any one of items 41 to 44, further comprising: if the indication of an IPUP mode to be used by the communication network for the UE is received from the master radio access node during a procedure for secondary radio access node addition or secondary radio access node modification requiring key update, and if the IPUP mode indicated by the master radio access node involves use of Integrity Protection for User Plane Data, deriving and using a key for Integrity Protection of User Plane data exchanged with the UE.

46. A method for operating a core node in a communication network, the method comprising: sending to a radio access node of the communication network an indication of an Integrity Protection for User Plane, IPUP, mode to be used by the communication network for a User Equipment, UE, requesting registration with the communication network; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

47. A method according to item 46, further comprising: checking for receipt from the radio access node of the communication network of an indication that the radio access node of the communication network will enable the IPUP mode indicated to the radio access node of the communication network.

48. A method according to item 47, further comprising: if an indication that the radio access node will enable the IPUP mode indicated to the radio access node is not received, assuming that the radio access node will not enable the IPUP mode to be used by the communication network for the UE.

49. A method according to any one of items 46 to 48, wherein the core network node is a new core network node for the UE, the method further comprising: sending to an old core network of the UE an information request relating to the UE; and receiving from the old core network node an indication of the IPUP mode to be used by the communication network for the UE.

50. A method according to item 49, further comprising: during an Update Location procedure, receiving from a subscription management node corresponding to the UE an indication of an IPUP mode to be used by the communication network for the UE.

51. A method according to items 49 or 50, further comprising: deciding on an IPUP mode to be used by the communication network for the UE.

52. A method according to item 51, further comprising: if the IPUP mode decided by the core network node does not match a preference communicated by the UE for an IPUP mode to be used by the communication network for the UE, performing one of: rejecting the request from the UE to register with the communication network; or accepting the request from the UE to register with the communication network and informing the UE of the IPUP decided by the core network node.

53. A method according to item 51 or 52, wherein the decided IPUP mode applies to at least one of: all data exchanged between the UE and the communication network; or data exchanged between the UE and a specific slice or plurality of slices of the communication network.

54. A method according to any one of items 51 to 53, further comprising: indicating to the UE the decided IPUP mode to be used by the communication network for the UE.

55. A method for operating a core node in a communication network, the core network node comprising an old core network node for a User Equipment, UE, requesting registration with the communication network, the method comprising: receiving from a new core network for the UE an information request relating to the UE; and sending to the new core network node an indication of an Integrity Protection for User Plane, IPUP, mode to be used by the communication network for the UE, wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

56. A method according to item 55, wherein the indicated IPUP mode applies to at least one of: all data exchanged between the UE and the communication network; or data exchanged between the UE and a specific slice or plurality of slices of the communication network.

57. A method for operating a core node in a communication network, the method comprising: receiving from a target radio access node an indication of an Integrity Protection for User Plane, IPUP, mode to be used by the communication network for a User Equipment, UE, to be handed over to the target radio access node; verifying that the IPUP mode indicated by the target radio access node is the same as an IPUP mode stored by the core network node for the UE; and in the event of a mismatch between the indicated and stored IPUP modes, performing at least one of: logging the mismatch as an event; or triggering an alarm; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

58. A method for operating a core node in a communication network, the method comprising: sending to a target radio access node an indication of an Integrity Protection for User Plane, IPUP, mode to be used by the communication network for a User Equipment, UE, to be handed over to the target radio access node; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

59. A method according to item 56, further comprising: checking for receipt from the target radio access node of an indication that the target radio access node will enable the IPUP mode to be used by the communication network for the UE.

60. A computer program comprising instructions which, when executed on at least one processor, cause the at least one processor to carry out a method according to any one of the preceding items.

61. A carrier containing a computer program according to item 60, wherein the carrier comprises one of an electronic signal, optical signal, radio signal or computer readable storage medium.

62. A computer program product comprising non transitory computer readable media having stored thereon a computer program according to item 60.

63. Apparatus for operating a User Equipment, UE, which UE is configured to connect to a communication network, the apparatus comprising a processor and a memory, the memory containing instructions executable by the processor such that the apparatus is operable to: indicate to the communication network an Integrity Protection for User Plane, IPUP, mode supported by the UE when requesting registration with the communication network; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

64. Apparatus for operating a radio access node of a communication network, the apparatus comprising a processor and a memory, the memory containing instructions executable by the processor such that the apparatus is operable to: receive, from a User Equipment, UE, requesting registration with the communication network, an indication of an Integrity Protection for User Plane, IPUP, mode supported by the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data; and wherein the indication is received from the UE via the communication network.

65. Apparatus for operating a radio access node of a communication network, the radio access node comprising a source radio access node, the apparatus comprising a processor and a memory, the memory containing instructions executable by the processor such that the apparatus is operable to: during a procedure for handover of a User Equipment, UE, from the source radio access node to a target radio access node, send an indication of an Integrity Protection for User Plane, IPUP, mode to be used by the communication network for the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

66. Apparatus for operating a radio access node of a communication network, the radio access node comprising a target radio access node, the apparatus comprising a processor and a memory, the memory containing instructions executable by the processor such that the apparatus is operable to: during a procedure for handover of a User Equipment, UE, from a source radio access node to the target radio access node, receive an indication of an Integrity Protection for User Plane, IPUP, mode to be used by the communication network for the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

67. Apparatus for operating a radio access node of a communication network, the radio access node comprising a master radio access node, the apparatus comprising a processor and a memory, the memory containing instructions executable by the processor such that the apparatus is operable to: send to a secondary radio access node an indication of an Integrity Protection for User Plane, IPUP, mode to be used by the communication network for a UE; wherein the IPUP mode comprises one of: use of Integrity Protection for User Plane data exchanged with the UE;

non-use of Integrity Protection for User Plane data exchanged with the UE; or use of Integrity Protection for User Plane data, and non-use of Confidentiality Protection for User Plane data, and wherein the indication is sent to the secondary radio access node during a procedure for at least one of: secondary radio access node addition; secondary radio access node modification requiring key update; Data Radio Bearer, DRB offload.

68. Apparatus for operating a radio access node of a communication network, the radio access node comprising a secondary radio access node, the apparatus comprising a processor and a memory, the memory containing instructions executable by the processor such that the apparatus is operable to: receive from a master radio access node an indication of an Integrity Protection for User Plane, IPUP, mode to be used by the communication network for a UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data, and wherein the indication is received from the master radio access node during a procedure for at least one of: secondary radio access node addition; secondary radio access node modification requiring key update; Data Radio Bearer, DRB offload.

69. Apparatus for operating a core node in a communication network, the apparatus comprising a processor and a memory, the memory containing instructions executable by the processor such that the apparatus is operable to: send to a radio access node of the communication network an indication of an Integrity Protection for User Plane, IPUP, mode to be used by the communication network for a User Equipment, UE, requesting registration with the communication network; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

70. Apparatus for operating a core node in a communication network, the core network node comprising an old core network node for a User Equipment, UE, requesting registration with the communication network, the apparatus comprising a processor and a memory, the memory containing instructions executable by the processor such that the apparatus is operable to: receive from a new core network node for the UE an information request relating to the UE; and send to the new core network node an indication of an Integrity Protection for User Plane, IPUP, mode to be used by the communication network for the UE, wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

71. Apparatus for operating a core node in a communication network, the apparatus comprising a processor and a memory, the memory containing instructions executable by the processor such that the apparatus is operable to: receive from a target radio access node an indication of an Integrity Protection for User Plane, IPUP, mode to be used by the communication network for a User Equipment, UE, to be handed over to the target radio access node; verify that the IPUP mode indicated by the target radio access node is the same as an IPUP mode stored by the core network node for the UE; and in the event of a mismatch between the indicated and stored IPUP modes, performing at least one of: log the mismatch as an event; or trigger an alarm; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

72. Apparatus for operating a core node in a communication network, the apparatus comprising a processor and a memory, the memory containing instructions executable by the processor such that the apparatus is operable to: send to a target radio access node an indication of an Integrity Protection for User Plane, IPUP, mode to be used by the communication network for a User Equipment, UE, to be handed over to the target radio access node; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

73. Apparatus for operating a User Equipment, UE, which UE is configured to connect to a communication network, the apparatus configured to: indicate to the communication network an Integrity Protection for User Plane, IPUP, mode supported by the UE when requesting registration with the communication network; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

74. Apparatus for operating a radio access node of a communication network, the apparatus configured to: receive, from a User Equipment, UE, requesting registration with the communication network, an indication of an Integrity Protection for User Plane, IPUP, mode supported by the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data; and wherein the indication is received from the UE via the communication network.

75. Apparatus for operating a radio access node of a communication network, the radio access node comprising a source radio access node, the apparatus configured to: during a procedure for handover of a User Equipment, UE, from the source radio access node to a target radio access node, send an indication of an Integrity Protection for User Plane, IPUP, mode to be used by the communication network for the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

76. Apparatus for operating a radio access node of a communication network, the radio access node comprising a target radio access node, the apparatus configured to: during a procedure for handover of a User Equipment, UE, from a source radio access node to the target radio access node, receive an indication of an Integrity Protection for User Plane, IPUP, mode to be used by the communication network for the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

77. Apparatus for operating a radio access node of a communication network, the radio access node comprising a master radio access node, the apparatus configured to: send to a secondary radio access node an indication of an Integrity Protection for User Plane, IPUP, mode to be used by the communication network for a UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data, and wherein the indication is sent to the secondary radio access node during a procedure for at least one of: secondary radio access node addition; secondary radio access node modification requiring key update; Data Radio Bearer, DRB offload.

78. Apparatus for operating a radio access node of a communication network, the radio access node comprising a secondary radio access node, the apparatus configured to: receive from a master radio access node an indication of an Integrity Protection for User Plane, IPUP, mode to be used by the communication network for a UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data, and wherein the indication is received from the master radio access node during a procedure for at least one of: secondary radio access node addition; secondary radio access node modification requiring key update; Data Radio Bearer, DRB offload.

79. Apparatus for operating a core node in a communication network, the apparatus configured to: send to a radio access node of the communication network an indication of an Integrity Protection for User Plane, IPUP, mode to be used by the communication network for a User Equipment, UE, requesting registration with the communication network; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

80. Apparatus for operating a core node in a communication network, the core network node comprising an old core network node for a User Equipment, UE, requesting registration with the communication network, the apparatus configured to: receive from a new core network for the UE an information request relating to the UE; and send to the new core network node an indication of an Integrity Protection for User Plane, IPUP, mode to be used by the communication network for the UE, wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

81. Apparatus for operating a core node in a communication network, the apparatus configured to: receive from a target radio access node an indication of an Integrity Protection for User Plane, IPUP, mode to be used by the communication network for a User Equipment, UE, to be handed over to the target radio access node; verify that the IPUP mode indicated by the target radio access node is the same as an IPUP mode stored by the core network node for the UE; and in the event of a mismatch between the indicated and stored IPUP modes, performing at least one of: log the mismatch as an event; or trigger an alarm; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

82. Apparatus for operating a core node in a communication network, the apparatus configured to: send to a target radio access node an indication of an Integrity Protection for User Plane, IPUP, mode to be used by the communication network for a User Equipment, UE, to be handed over to the target radio access node; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

83. Apparatus for operating a User Equipment, UE, which UE is configured to connect to a communication network, the apparatus comprising: a transmission module for indicating to the communication network an Integrity Protection for User Plane, IPUP, mode supported by the UE when requesting registration with the communication network; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

84. Apparatus for operating a radio access node of a communication network, the apparatus comprising: a receiving module for receiving, from a User Equipment, UE, requesting registration with the communication network, an indication of an Integrity Protection for User Plane, IPUP, mode supported by the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data; and wherein the indication is received from the UE via the communication network.

85. Apparatus for operating a radio access node of a communication network, the radio access node comprising a source radio access node, the apparatus comprising: a transmission module for, during a procedure for handover of a User Equipment, UE, from the source radio access node to a target radio access node, sending an indication of an Integrity Protection for User Plane, IPUP, mode to be used by the communication network for the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

86. Apparatus for operating a radio access node of a communication network, the radio access node comprising a target radio access node, the apparatus comprising: a receiving module for, during a procedure for handover of a User Equipment, UE, from a source radio access node to the target radio access node, receiving an indication of an Integrity Protection for User Plane, IPUP, mode to be used by the communication network for the UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

87. Apparatus for operating a radio access node of a communication network, the radio access node comprising a master radio access node, the apparatus comprising: a transmission module for sending to a secondary radio access node an indication of an Integrity Protection for User Plane, IPUP, mode to be used by the communication network for a UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data, and wherein the indication is sent to the secondary radio access node during a procedure for at least one of: secondary radio access node addition; secondary radio access node modification requiring key update; Data Radio Bearer, DRB offload.

88. Apparatus for operating a radio access node of a communication network, the radio access node comprising a secondary radio access node, the apparatus comprising: a receiving module for receiving from a master radio access node an indication of an Integrity Protection for User Plane, IPUP, mode to be used by the communication network for a UE; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data, and wherein the indication is received from the master radio access node during a procedure for at least one of: secondary radio access node addition; secondary radio access node modification requiring key update; Data Radio Bearer, DRB offload.

89. Apparatus for operating a core node in a communication network, the apparatus comprising: a transmission module for sending to a radio access node of the communication network an indication of an Integrity Protection for User Plane, IPUP, mode to be used by the communication network for a User Equipment, UE, requesting registration with the communication network; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

90. Apparatus for operating a core node in a communication network, the core network node comprising an old core network node for a User Equipment, UE, requesting registration with the communication network, the apparatus comprising: a receiving module for receiving from a new core network for the UE an information request relating to the UE; and a transmission module for sending to the new core network node an indication of an Integrity Protection for User Plane, IPUP, mode to be used by the communication network for the UE, wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

91. Apparatus for operating a core node in a communication network, the apparatus comprising: a receiving module for receiving from a target radio access node an indication of an Integrity Protection for User Plane, IPUP, mode to be used by the communication network for a User Equipment, UE, to be handed over to the target radio access node; and a processing module for verifying that the IPUP mode indicated by the target radio access node is the same as an IPUP mode stored by the core network node for the UE; and in the event of a mismatch between the indicated and stored IPUP modes, performing at least one of: logging the mismatch as an event; or triggering an alarm; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

92. Apparatus for operating a core node in a communication network, the apparatus comprising: a transmission module for sending to a target radio access node an indication of an Integrity Protection for User Plane, IPUP, mode to be used by the communication network for a User Equipment, UE, to be handed over to the target radio access node; wherein the IPUP mode comprises one of: use of Integrity Protection for User Plane data exchanged with the UE; non-use of Integrity Protection for User Plane data exchanged with the UE; or use of Integrity Protection for User Plane data, and non-use of Confidentiality Protection for User Plane data.

The invention claimed is:

1. A method for operating a radio access node of a communication network, the radio access node comprising a source radio access node, the method comprising:
during a procedure for handover of a user equipment (UE) from the source radio access node to a target radio access node, sending an indication of an Integrity Protection for User Plane (IPUP) mode to be used by the communication network for the UE, wherein the IPUP mode comprises one of:
use of Integrity Protection for User Plane data exchanged with the UE,
non-use of Integrity Protection for User Plane data exchanged with the UE, or
use of Integrity Protection for User Plane data and non-use of Confidentiality Protection for User Plane data.

2. The method of claim 1, further comprising:
checking for receipt from the target radio access node of an indication that the target radio access node will enable the IPUP mode to be used by the communication network for the UE.

3. The method of claim 1, wherein
sending the indication of the IPUP mode comprises transmitting a message comprising the indication of the IPUP mode and maximum data rate information indicating a maximum data rate up to which the UE can support user plane (UP) integrity protection.

4. A method for operating a radio access node of a communication network, the radio access node comprising a target radio access node, the method comprising:
during a procedure for handover of a user equipment (UE) from a source radio access node to the target radio access node, receiving an indication of an Integrity Protection for User Plane, IPUP, mode to be used by the communication network for the UE, wherein the IPUP mode comprises one of:
use of Integrity Protection for User Plane data exchanged with the UE,
non-use of Integrity Protection for User Plane data exchanged with the UE, or
use of Integrity Protection for User Plane data and non-use of Confidentiality Protection for User Plane data.

5. The method of claim 4, wherein
the indication of the IPUP mode to be used by the communication network for the UE is received from the source radio access node and/or core node of the communication network, and
receiving the indication of the IPUP mode comprises receiving a message comprising the indication of the IPUP mode and maximum data rate information indicating a maximum data rate up to which the UE can support user plane (UP) integrity protection.

6. The method of claim 4, further comprising:
deciding whether or not to use the indicated IPUP mode; and
if it is decided not to use the indicated IPUP mode, sending to the UE an indication that the target radio access node will use a different IPUP mode for the UE to that used by the source radio access node.

7. The method of claim 4, wherein the indication of an IPUP mode to be used by the communication network for the UE is received from the source radio access node, the method further comprising:
sending to a core node of the communication network an indication of the IPUP mode received from the source radio access node.

8. The method of claim 4, further comprising:
if the target radio access node supports the indicated IPUP mode, sending to at least one of the source radio access node or a core node of the communication network an indication that the target radio access node will enable the IPUP mode to be used by the communication network for the UE.

9. The method of claim 4, further comprising:
if the target radio access node does not support the received indicated IPUP mode, performing at one of:
rejecting handover of the UE; or
accepting handover of the UE and omitting to send an indication that the target radio access node will enable the IPUP mode to be used by the communication network for the UE.

10. A method for operating a radio access node of a communication network, the radio access node comprising a master radio access node, the method comprising:
sending to a secondary radio access node an indication of an Integrity Protection for User Plane (IPUP) mode to be used by the communication network for a UE, wherein the IPUP mode comprises one of:
use of Integrity Protection for User Plane data exchanged with the UE;
non-use of Integrity Protection for User Plane data exchanged with the UE; or
use of Integrity Protection for User Plane data and non-use of Confidentiality Protection for User Plane data, and wherein
the indication is sent to the secondary radio access node during a procedure for at least one of:
secondary radio access node addition,
secondary radio access node modification requiring key update, or
Data Radio Bearer offload.

11. The method of claim 10, wherein, if the IPUP mode indicated to the secondary radio access node involves use of Integrity Protection for User Plane Data, the indication of an IPUP mode to be used by the communication network for the UE comprises a list of supported algorithms for Integrity Protection of UP data.

12. The method of claim 10, further comprising:
checking for receipt from the secondary radio access node of an indication that the secondary radio access node will enable the IPUP mode to be used by the communication network for the UE.

13. The method of claim 10,
wherein
sending the indication of the IPUP mode comprises transmitting a message comprising the indication of the IPUP mode and maximum data rate information indicating a maximum data rate up to which the UE can support user plane (UP) integrity protection.

14. The method of claim 10, further comprising, if the indication of an IPUP mode to be used by the communication network for the UE is sent to the secondary radio access node during a data radio bearer (DRB) offload procedure:
sending to the UE an RRC Reconfiguration Request including an indication of the IPUP mode to be used by the communication network for the UE.

15. The method of claim 14, wherein the RRC Reconfiguration Request includes a selected integrity algorithm identifier to be used for user plane (UP) integrity protection.

16. A method for operating a radio access node of a communication network, the radio access node comprising a secondary radio access node, the method comprising:
receiving from a master radio access node an indication of an Integrity Protection for User Plane (IPUP) mode to be used by the communication network for a UE, wherein the IPUP mode comprises one of:
use of Integrity Protection for User Plane data exchanged with the UE,
non-use of Integrity Protection for User Plane data exchanged with the UE, or
use of Integrity Protection for User Plane data and non-use of Confidentiality Protection for User Plane data, and wherein
the indication is received from the master radio access node during a procedure for at least one of:
secondary radio access node addition,
secondary radio access node modification requiring key update, or
Data Radio Bearer offload.

17. The method of claim 16, wherein, if the IPUP mode indicated by the master radio access node involves use of Integrity Protection for User Plane Data, the indication of an IPUP mode to be used by the communication network for the UE comprises an identifier for an integrity algorithm to be used for UP integrity protection.

18. The method of claim 16, further comprising:
if the secondary radio access node supports the indicated IPUP mode, sending to the master radio access node an indication that the secondary radio access node will enable the IPUP mode to be used by the communication network for the UE.

19. The method of claim 16, further comprising:
if the secondary radio access node does not support the received indicated IPUP mode, performing at least one of:
rejecting the requested procedure from the master radio access node; or
accepting the requested procedure from the master radio access node and omitting to send to the master radio access node an indication that the secondary radio access node will enable the IPUP mode to be used by the communication network for the UE.

20. The method of claim 16, further comprising:
if the indication of an IPUP mode to be used by the communication network for the UE is received from the master radio access node during a procedure for secondary radio access node addition or secondary radio access node modification requiring key update, and if the IPUP mode indicated by the master radio access node involves use of Integrity Protection for User Plane Data, deriving and using a key for Integrity Protection of User Plane data exchanged with the UE.

21. The method of claim 16, wherein receiving the indication of the IPUP mode comprises receiving a message comprising the indication of the IPUP mode and maximum data rate information indicating a maximum data rate up to which the UE can support user plane (UP) integrity protection.

22. A method for operating a core node in a communication network, the method comprising:
receiving from a target radio access node an indication of an Integrity Protection for User Plane (IPUP) mode to be used by the communication network for a user equipment (UE) to be handed over to the target radio access node;
verifying that the IPUP mode indicated by the target radio access node is the same as an IPUP mode stored by the core network node for the UE; and
in an event of a mismatch between the indicated and stored IPUP modes, performing at least one of: logging the mismatch or triggering an alarm, wherein the IPUP mode comprises one of:
use of Integrity Protection for User Plane data exchanged with the UE,
non-use of Integrity Protection for User Plane data exchanged with the UE, or
use of Integrity Protection for User Plane data and non-use of Confidentiality Protection for User Plane data.

23. The method of claim 22, wherein receiving the indication of the IPUP mode comprises receiving a message comprising the indication of the IPUP mode and maximum data rate information indicating a maximum data rate up to which the UE can support user plane (UP) integrity protection.

24. A method for operating a core node in a communication network, the method comprising:
sending to a target radio access node an indication of an Integrity Protection for User Plane (IPUP) mode to be used by the communication network for a user equipment (UE) to be handed over to the target radio access node, wherein the IPUP mode comprises one of:
use of Integrity Protection for User Plane data exchanged with the UE,
non-use of Integrity Protection for User Plane data exchanged with the UE, or
use of Integrity Protection for User Plane data and non-use of Confidentiality Protection for User Plane data.

25. The method of claim 24, further comprising:
checking for receipt from the target radio access node of an indication that the target radio access node will enable the IPUP mode to be used by the communication network for the UE.

26. The method of claim 24, wherein sending the indication of the IPUP mode comprises transmitting a message comprising the indication of the IPUP mode and maximum data rate information indicating a maximum data rate up to which the UE can support user plane (UP) integrity protection.

* * * * *

UNITED STATES PATENT AND TRADEMARK OFFICE
CERTIFICATE OF CORRECTION

Page 1 of 3

PATENT NO. : 12,022,293 B2
APPLICATION NO. : 18/095607
DATED : June 25, 2024
INVENTOR(S) : Wifvesson et al.

It is certified that error appears in the above-identified patent and that said Letters Patent is hereby corrected as shown below:

On the Title Page

On Page 2, in Item (56), under "OTHER PUBLICATIONS", in Column 2, Line 31, delete "Claue 6" and insert -- Clause 6 --, therefor.

In the Drawings

In Fig. 24, Sheet 21 of 21, delete "selelcted" and insert -- selected --, therefor.

In Fig. 24, Sheet 21 of 21, delete "(K-SeNB," and insert -- (S-$K_{eNB}$, --, therefor.

In the Specification

In Column 16, Line 7, delete "Service" and insert -- Server --, therefor

In Column 16, Line 14, delete "(Access Management" and insert -- (Access and Mobility Management --, therefor.

In Column 16, Line 31, delete "whether" and insert -- of whether --, therefor.

In Column 16, Line 40, delete "(User" and insert -- (Graphical User --, therefor.

In Column 16, Line 50, delete "how" and insert -- on how --, therefor.

In Column 16, Line 59, delete "PLMN's" and insert -- PLMNs --, therefor.

In Column 18, Line 36, delete "next" and insert -- Next --, therefor.

In Column 18, Line 58, delete "user'[s" and insert -- user's --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 12,022,293 B2

In Column 21, Line 19, delete "Access Management Function (AMF )" and insert -- Access and Mobility Management Function (AMF) --, therefor.

In Column 21, Line 45, delete "only of" and insert -- only if --, therefor.

In Column 22, Line 66, delete "502b"," and insert -- 502b, --, therefor.

In Column 31, Line 24, delete "The" and insert -- They --, therefor.

In Column 32, Line 62, delete "(EPC)" and insert -- (EPC). --, therefor.

In Column 33, Line 2, delete "Support." and insert -- Support: --, therefor.

In Column 33, Line 7, delete "mechanism)" and insert -- mechanism). --, therefor.

In Column 33, Line 8, delete "used" and insert -- used. --, therefor.

In Column 33, Line 58, delete "Request)" and insert -- Request). --, therefor.

In Column 33, Line 65, delete "Context)" and insert -- Context). --, therefor.

In Column 34, Line 11, delete "data" and insert -- data. --, therefor.

In Column 35, Line 33, delete "UP)" and insert -- UP). --, therefor.

In Column 37, Line 5, delete "protection" and insert -- protection. --, therefor.

In Column 37, Line 43, delete "2: 7." and insert -- 2: 7: --, therefor.

In Column 38, Line 17, delete "message," and insert -- message. --, therefor.

In Column 38, Line 50, delete "message," and insert -- message. --, therefor.

In Column 39, Line 51, delete "TS 36.331)" and insert -- TS 36.331 --, therefor.

In Column 41, Line 23, delete "51" and insert -- S1 --, therefor.

In Column 45, Line 12, delete "shown on" and insert -- shown in --, therefor.

In Column 46, Line 8, delete "KeNB" and insert -- $K_{eNB}$ --, therefor.

In Column 46, Line 16, delete "5-KeNB" and insert -- $S-K_{eNB}$ --, therefor.

In Column 46, Line 45, delete "SLAP-UE" and insert -- S1AP-UE --, therefor.

In Column 46, Line 60, delete "sub par" and insert -- sub-par --, therefor.

CERTIFICATE OF CORRECTION (continued)
U.S. Pat. No. 12,022,293 B2

In Column 46, Line 61, delete "how" and insert -- on how --, therefor.

In Column 47, Line 1, delete "(User" and insert -- (Graphical User --, therefor.

In Column 47, Line 5, delete "(User" and insert -- (Graphical User --, therefor.

In Column 48, Line 8, delete "HS S" and insert -- HSS --, therefor.

In Column 48, Line 30, delete "network" and insert -- network. --, therefor.

In Column 48, Line 35, delete "need" and insert -- need to --, therefor.

In Column 49, Line 22, delete "(User" and insert -- (Graphical User --, therefor.

In Column 49, Line 27, delete "could" and insert -- could be --, therefor.

In Column 49, Line 29, delete "(User" and insert -- (Graphical User --, therefor.

In Column 49, Line 43, delete "how" and insert -- on how --, therefor.

In Column 50, Line 21, delete "whether" and insert -- of whether --, therefor.

In Column 50, Line 47, delete "(User" and insert -- (Graphical User --, therefor.

In Column 50, Line 56, delete "how" and insert -- on how --, therefor.

In Column 51, Line 16, delete "whether" and insert -- of whether --, therefor.

In Column 51, Line 41, delete "aspects" and insert -- aspects of --, therefor.

In Column 52, Line 55, delete "comprising," and insert -- comprising: --, therefor.

In the Claims

In Column 66, Line 7, in Claim 13, delete "wherein" and insert the same at Line 6, after "claim 10," as a continuation sub-point.